United States Patent
Yang et al.

(10) Patent No.: US 9,582,222 B2
(45) Date of Patent: Feb. 28, 2017

(54) PRE-CACHE SIMILARITY-BASED DELTA COMPRESSION FOR USE IN A DATA STORAGE SYSTEM

(75) Inventors: Qing Yang, Saunderstown, RI (US); Jin Ren, Boxborough, MA (US)

(73) Assignee: WESTERN DIGITAL TECHNOLOGIES, INC., Irvine, CA (US)

(*) Notice: Subject to any disclaimer, the term of this patent is extended or adjusted under 35 U.S.C. 154(b) by 1238 days.

(21) Appl. No.: 13/366,846

(22) Filed: Feb. 6, 2012

(65) Prior Publication Data

US 2012/0137061 A1    May 31, 2012

Related U.S. Application Data

(63) Continuation-in-part of application No. 12/762,993, filed on Apr. 19, 2010, now Pat. No. 9,176,883.
(Continued)

(51) Int. Cl.
*G06F 3/06* (2006.01)
*G06F 12/08* (2016.01)

(52) U.S. Cl.
CPC ............ *G06F 3/0659* (2013.01); *G06F 3/068* (2013.01); *G06F 3/0611* (2013.01);
(Continued)

(58) Field of Classification Search
CPC ...... G06F 3/0659; G06F 3/0616; G06F 3/068; G06F 3/0611; G06F 12/0866;
(Continued)

(56) References Cited

U.S. PATENT DOCUMENTS 5,353,430 A    10/1994  Lautzenheiser
5,379,393 A    1/1995   Yang
(Continued)

FOREIGN PATENT DOCUMENTS

WO    2012109145 A2    8/2012
WO    2012109145 A3    11/2012

OTHER PUBLICATIONS

Gupta et al., "Difference engine: Harnessing memory redundancy in virtual machines", In Proc. of 8th USENIX Symposium on Operating Systems Design and Implementation, 2008,14 pages.*
(Continued)

*Primary Examiner* — Michael Alsip
(74) *Attorney, Agent, or Firm* — Wilmer Cutler Pickering Hale and Dorr LLP

(57) ABSTRACT

A data storage caching architecture supports using native local memory such as host-based RAM, and if available, Solid State Disk (SSD) memory for storing pre-cache delta-compression based delta, reference, and independent data by exploiting content locality, temporal locality, and spatial locality of data accesses to primary (e.g. disk-based) storage. The architecture makes excellent use of the physical properties of the different types of memory available (fast r/w RAM, low cost fast read SSD, etc) by applying algorithms to determine what types of data to store in each type of memory. Algorithms include similarity detection, delta compression, least popularly used cache management, conservative insertion and promotion cache replacement, and the like.

20 Claims, 38 Drawing Sheets

Related U.S. Application Data

(60) Provisional application No. 61/441,976, filed on Feb. 11, 2011, provisional application No. 61/447,208, filed on Feb. 28, 2011, provisional application No. 61/497,549, filed on Jun. 16, 2011, provisional application No. 61/174,166, filed on Apr. 30, 2009.

(52) U.S. Cl.
CPC .......... *G06F 3/0613* (2013.01); *G06F 3/0616* (2013.01); *G06F 12/0866* (2013.01); *G06F 12/0897* (2013.01); *G06F 2212/214* (2013.01); *G06F 2212/311* (2013.01); *G06F 2212/312* (2013.01); *G06F 2212/401* (2013.01); *Y02B 60/1225* (2013.01)

(58) Field of Classification Search
CPC ............. G06F 3/0613; G06F 2212/312; G06F 2212/214; G06F 12/0897; G06F 2212/311; G06F 2212/401; Y02B 60/1225
See application file for complete search history.

(56) References Cited

U.S. PATENT DOCUMENTS

| | | | |
|---|---|---|---|
| 5,754,888 A | 5/1998 | Yang et al. | |
| 6,216,199 B1 | 4/2001 | DeKoning et al. | |
| 6,243,795 B1 | 6/2001 | Yang et al. | |
| 6,789,156 B1 | 9/2004 | Waldspurger | |
| 7,457,980 B2 | 11/2008 | Yang et al. | |
| 7,730,347 B1 | 6/2010 | Yang | |
| 8,549,222 B1 | 10/2013 | Kleiman et al. | |
| 2003/0098987 A1 | 5/2003 | Fiske | |
| 2006/0218498 A1 | 9/2006 | Henderson et al. | |
| 2007/0008330 A1 | 1/2007 | Xu | |
| 2007/0124552 A1 | 5/2007 | Chen | |
| 2008/0005489 A1 | 1/2008 | Watkins et al. | |
| 2010/0042776 A1 | 2/2010 | Seo et al. | |
| 2010/0088459 A1 | 4/2010 | Arya et al. | |
| 2010/0281208 A1 | 11/2010 | Yang | |
| 2012/0137059 A1 | 5/2012 | Yang et al. | |
| 2012/0137061 A1 | 5/2012 | Yang et al. | |
| 2012/0144098 A1 | 6/2012 | Yang et al. | |
| 2012/0144099 A1 | 6/2012 | Yang et al. | |

OTHER PUBLICATIONS

U.S. Appl. No. 12/762,993, filed Apr. 19, 2010, Pending.
U.S. Appl. No. 13/615,422, filed Sep. 13, 2012, Pending.
AMD, ATI RadeonTM HD 4800 Series Graphics, 8 http://www.amd.com/la/products/desktop/graphics/ati-radeon-hd-4000/hd-4800/Pages/atiradeon-hd-4800-overview.aspx, 1 page. [accessed Aug. 30, 2013].
Bansal et al., "CAR: Clock with Adaptive Replacement", Proceedings of the 9 Third USENIX Conference on File and Storage Technologies, San Francisco, CA, USA, Mar. 31-Apr. 2, 2004, 15 pages.
Bellard, "QEMU, a Fast and Portable Dynamic Translator", Proceedings of 10 the 2005 USENIX Annual Technical Conference, Anaheim, CA, USA, Apr. 10-15, 2005, pp. 41-46.
Bityutskiy, "JFFS3 design issues", http://www.linux-mtd.infradead.org/tech/JFFS3design.pdf (accessed May 2, 2013), Version 0.32 (draft), Nov. 27, 2005, 36 pages.
Boboila et al., "Write Endurance in Flash Drives: Measurements and Analysis," Proceedings of the 8th USENIX Conference on File and Storage Technologies, (FAST'10) San Jose, California, 14 pages (2010).
Borthakur, "The Hadoop Distributed File System: Architecture and Design", The Apache Software Foundation, http://hadoop.apache.org/docs/r0.18.0/hdfs_design.pdf(accessed on May 6, 2013), 14 pages (2007).
Breitinger et al., "FRASH: A framework to test algorithms of similarity hashing," 13th annual Digital Forensics Research Conference, pp. S50-S58 (2013).
Calder et al., "Selective Value Prediction", Proceedings of the 26th International Symposium on Computer Architecture (ISCA'99), 11 pages (1999).
Cecchet et al., "Performance and scalability of EJB applications", Proceedings of the 17th ACM Conference on Object-oriented programming, systems, languages, and applications, New York, NY, USA, 10 pages (2002).
Claburn, "Google Plans to Use Intel SSD Storage in Servers," www.informationweek.com/storage/systems/google-plans-to-use-intel-ssd-storage-in/207602745 (accessed online May 2, 2013), 3 pages (2008).
Clements et al., "Decentralized Deduplication in SAN Cluster File Systems," Proceedings of the 2009 conference on USENIX Annual technical conference (USENIX'09). USENIX Association, Berkeley, CA, USA, 14 pages (2009).
Corbato, "A Paging Experiment with the Multics System", Chapter 19, In Honor of P.M. Morse, pp. 217-228, MIT Press, 1969. Also as MIT Project MAC Report MAC-M-384, May 1968.
Debnath et al., "ChunkStash: Speeding up Inline Storage Deduplication using Flash Memory," Proceedings of the 2010 USENIX Annual Technical Conference, Boston, Massachusetts, 15 pages (2010).
"Dell Poweredge 1950 server specification sheet" http://www.dell.com/downloads/emea/products/pedge/en/PE1950Spec_Sheet_Quad.pdf 2 pages (2006).
Dirik et al., "The Performance of PC Solid-State Disks (SSDs) as a Function of Bandwidth, Concurrency, Device Architecture, and System Organization," ISCA'09, Austin, Texas, USA, pp. 279-289 (2009).
Dougliset al., "Application-specific Delta-encoding via Resemblance Detection," USENIX 2003 Annual Technical Conference, San Antonio, Texas, 14 pages (2003).
Forman et al., "Efficient Detection of Large Scale Redundancy in Enterprise File Systems," SIGOPS Oper. Syst. Rev. 43, 9 pages (2009).
Fusion-10, "ioDrive Data Sheet", http://www.fusionio.com/load/-media-/24dr4d/docslibrary/FIO_DS_ioDrive.pdf, 1 page (2013).
Gabbay et al., "Can Program Profiling Support Value Prediction?" Proceedings of the 30th annual ACM/IEEE international symposium on Microarchitecture, 12 pages (1997).
Gomez et al., "Characterizing Temporal Locality in 1/0 Workload," Proceedings of the 2002 International Symposium on Performance Evaluation of Computer and Telecommunications Systems (SPECTS 2002), San Diego, California, 11 pages (2002).
Grupp, "Characterizing Flash Memory: Anomalies, Observations, and Applications," MICR0'09, New York, NY, USA, 10 pages (2009).
Heintze, "Scalable Document Fingerprinting (Extended Abstract)," Proc. USENIX Workshop on Electronic Commerce, 10 pages (1996).
Hsu et al., "The automatic improvement of locality in storage systems," ACM Transactions on Computer Systems 23:4 pp. 424-473 (2005).
Hu et al., "DCD—Disk Caching Disk: A New Approach for Boosting 1/0 Performance," Proceedings of the 23rd Annual International Symposium on Computer Architecture (ISCA'96), Philadelphia, PA, 11 pages (1996).
Huang et al., "Exploiting Basic Block Value Locality with Block Reuse," Proceedings of the Fifth International Symposium on High-Performance Computer Architecture, pp. 1-25 (1998).
Intel, "What is an Intel® Solid-State Drive, Overview," http://web.archive.org/web/20100724065039/http:1/www.intel.com/design/flash/nand/overview.htm [accessed on Sep. 3, 2013], 2 pages (2010).
International Preliminary Report on Patentability and Written Opinion for International Patent Application No. PCT/US2012/023972, mailed Aug. 22, 2013 (5 pages).

(56) References Cited

OTHER PUBLICATIONS

Jaleel et al., "High Performance Cache Replacement Using Re-Reference Interval Prediction (RRIP)," International Symposium on Computer Architecture (ISCA), Saint-Malo, France, 12 pages (2010).
Jiang et al., "CLOCK-Pro: An Effective Improvement of the CLOCK Replacement," Proceedings of the USENIX Annual Technical Conference, pp. 323-336 (2005).
Jiang et al., "DULO: An Effective Buffer Cache Management Scheme to Exploit Both," FAST'05: 4th USENIX Conference on File and Storage Technologies, pp. 101-114 (2005).
Jiang, "LIRS: An Efficient Low Inter-reference Recency Set Replacement Policy to Improve Buffer Cache Performance," Proceedings of the 2002 ACM SIGMETRICS international conference on Measurement and modeling of computer systems (SIGMETRICS '02), New York, NY, USA, pp. 31-42 (2002).
Joglekar, "A Scalable and High Performance Software iSCSI Implementation," FAST'05, Proceedings of the 4th USENIX Conference on File and Storage Technologies, pp. 267-280 (2005).
Johnson et al., "20: A Low Overhead High Performance Buffer Management eplacement Algorithm", Proceedings of the 20th VLDB Conference, Santiago, Chile, pp. 439-450 (1994).
Josephson et al., "DFS: A File System for Virtualized Flash Storage," FAST'10: Proc. of the Eighth USENIX Conf. on File and Storage Technologies, 15 pages (2010).
Koller et al., "I/O Deduplication: Utilizing Content Similarity to Improve I/0 Performance," ACM Transactions on Storage (TOS), vol. 6 Issue 3, Article No. 13, pp. 1-14 (2010).
Kopytov, A System Performance Benchmark, SysBench, http://sysbench.sourceforge.net/index.html (accessed Jul. 30, 2013), 2 pages (2004).
Kounavis et al., "A Systematic Approach to Building High Performance Software-based CRC Generators," Proceedings of the 10th IEEE Symposium on Computers and Communications (ISCC 2005), pp. 855-862 (2005).
Kruus et al., "Bimodal Content Defined Chunking for Backup Streams," FAST'10 Proceedings of the 8th USENIX conference on File and storage technologies, 14 pages (2010).
Lee et al., "LRFU: A Spectrum of Policies that Subsumes the Least Recently Used and Least Frequently Used Policies," IEEE Transactions on Computers, 50:12 pp. 1352-1361 (2001).
Lee et al., "A Case for Flash Memory SSD in Enterprise Database Applications Applications," Proc. ACM SIGMOD International Conference on Management of Data (SIGMOD), Vancouver, BC, Canada, pp. 1075-1086 (2008).
Lee et al., "Design of Flash-Based DBMS: An In-Page Logging Approach," Proceeding of the ACM/SIGMOD, Beijing. China, 12 pages (2007).
Li et al., "Theory and Application of b-Bit Minwise Hashing," Communications of the ACM (2008) 9 pages (2011).
Low, "Connectix RAM Doubler Information," http://www.lowtek.com/maxram/rd.html (accessed online May 2, 2013), 2 pages (1996).
Makatos et al., "Using Transparent Compression to Improve SSD-based I/0 Caches," EuroSys'10, Paris, France, 14 pages (2010).
Manber, "Finding Similar Files in a Large File System," Proceedings of the USENIX Winter Technical Conference, https://www.usenix.org/legacy/publications/library/proceedings/sf94/full_papers/manber.finding [accessed Aug. 30, 2013], 11 pages (1994).
Manber et al., "Glimpse: A tool to search through entire file systems," Proceedings of the USENIX Winter Technical Conference, https://www.usenix.org/legacy/publications/library/proceedings/sf94/full_papers/manber.glimpse, 11 pages (1994).
Manning, "YAFFS: Yet Another Flash File System," http://web.archive.org/web/20041204092124/http:l/www.aleph 1.co.uk/yaffs/ [accessed Aug. 30, 2013], 2 pages (2004).
Megiddo et al., "ARC: A Self-Tuning, Low Overhead Replacement Cache," Proceedings of FAST'03: 2nd USENIX Conference on File and Storage Technologies, San Francisco, CA, USA, pp. 115-130 (2003).

"Mira", web.archive.org/web/20 1 01121 081223/htlp://sourceforge.net/apps/mediawiki/mira-assembler/index.php?title=Main_Page [accessed Jul. 30, 2013], 3 pages (2010).
Morrey, III, "Content-Based Block Caching," 14th NASA Goddard, 23rd IEEE (MSST2006) Conference on Mass Storage Systems and Technologies, May 15-18, 2006, http:l/storageconference.biz/2006/Papers/2006-028-Morrey.pdf (accessed May 3, 2013), College Park, Maryland, 13 pages (2006).
Narayanan et al., "Migrating Server Storage to SSDs: Snalysis of Tradeoffs," EuroSys'09, Proceedings of the 4th ACM European Conference on Computer systems, Nuremberg, Germany, pp. 145-158 (2009).
Nath et al., "FlashDB: Dynamic Self-tuning Database for NAND Flash," Proceedings of the 6th International Conference on Information Processing in Sensor Networks (IPSN'07), Cambridge, Massachusetts, USA, 10 pages (2007).
NCBI, "SRX012992," http://www.ncbi.nlm.nih.gov/sra/?term=srx012992 1 page (accessed Jul. 30, 2013).
Nicola et al., "Analysis of the Generalized Clock Buffer Replacement Scheme for Database Transaction Processing," Performance Evaluation Review, vol. 20, No. 1/Proceedings of the ACM Sigmetrics & Performance Conference '92 pp. 35-46 (1992).
Oliveira et al., "Blutopia: Stackable Storage for Cluster Management," 2007 IEEE International Conference on Cluster Computing, pp. 293-302 (2007).
O'Neil et al., "The LRU-K Page Replacement Algorithm for Database Disk Buffering," Proceedings of SIGMOD-93, pp. 297-306 (1993).
Owens et al., "A Survey of General-Purpose Computation on Graphics Hardware," Computer Graphics Forum, 26:1, pp. 80-113 (2007).
Poelker et al., "Using Data De-Duplication to Lighten the Load," Chapter 13 in Storage Area Networks for Dummies, 2nd Edition, 23 pages (2009).
Qureshi et al., "Adaptive Insertion Policies for High Performance Caching," ISCA'07, San Diego, CA, USA, 11 pages (2007).
Ren et al., "A New Buffer Cache Design Exploiting both Temporal and Content Localities," Proceedings of the 30th IEEE International Conference on Distributed Computing Systems (ICDCS), Genoa, Italy, pp. 273-282 (2010).
Ren et al., "I-CASH: Intelligently Coupled Array of SSD and HOD," IEEE 17th International Symposium on High Performance Computer Architecture (HPCA), San Antonio, TX, pp. 278-289 (2011).
Robinson et al., "Data cache management using frequency-based replacement," SIGMETRICS '90, Proceedings of the 1990 ACM SIGMETRICS Conference on Measurement and Modeling of Computer Systems, pp. 134-142 (1990).
Rosenblum et al., "The Design and Implementation of a Log-Structured File System," ACM Transactions on Computer Systems, 10:1, pp. 26-52 (1992).
Seiler et al., "Larrabee: A Many-Core x86 Architecture for Visual Computing," ACM Transactions on Graphics, vol. 27, No. 3, Article 18, 16 pages (2008).
Soundararajan et al., "Extending SSD Lifetimes with Disk-Based Write Caches," FAST'10 Proceedings of the 8th USENIX conference on File and storage technologies, 14 pages (2010).
Sun et al., "A Hybrid Solid-State Storage Architecture for the Performance, Energy, Consumption, and Lifetime Improvement," Proc. of 16th IEEE International Symposium on High-Performance Computer Architecture, 12 pages (2010).
"TPC BenchmarkTM C," Standard Specification, Revision 5.5, Transaction Processing Performance Council (TPC), http://www.tpc.org/tpcc/spec/tpcc_v5.5.pdf, 125 pages (2005).
Ungureanu et al., "HydraFS: A High-Throughput File System for the HYDRAstor Content-Addressable Storage System," 8th USENIX Conference on File and Storage Technologies, 14 pages (2010).
Wu et al., "eNVy: A Non-Volatile, Main Memory Storage System," Proc. of 6th International Conference on Architectural Support for Programming Languages and Operating Systems, 12 pages (1994).
Xie et al., "SAIL: Self-Adaptive File Teallocation on Hybrid Disk Arrays," HiPC 2008, LNCS 5374, pp. 529-540 (2008).

(56) References Cited

OTHER PUBLICATIONS

Xie et al., "PIPP: Promotion/Insertion Pseudo-Partitioning of Multi-Core Shared Caches," Proceedings of the 36th ACM/IEEE International Symposium on Computer Architecture (ISCA'09), Austin, Texas, USA, 10 pages (2009).
Yang, "Introducing a New Cache Design into Vector Computers," IEEE Transactions on Computers, 42:2, 24 pages (1993).
Yang et al., "TRAP-Array: A Disk Array Architecture Providing Timely Recovery to Any Point-in-time," Proceedings of the 33rd annual international symposium on Computer Architecture (ISCA'06) IEEE Computer Society, Washington, DC, USA, 12 pages (2006).
Zhang, et al., "Frequent Value Locality and Value-Centric Data Cache Design", ASPLOS IX Proceedings of the Ninth International Conference on Architectural Support for Programming Languages and Operating Systems, ACM SIGARCH, 28(5):150-159, Dec. 2000, 12 pages.
Zhou et al., "Second-Level Buffer Cache Management," IEEE Transactions on Parallel and Distributed Systems, 15:7, pp. 1-15 (2004).
Zhu et al., "Avoiding the Disk Bottleneck in the Data Domain Deduplication File System," FAST'08 Proc. of the 6th USENIX Conference on File and Storage Technologies, San Jose, CA, pp. 269-282 (2008).
Zinman, "Simulating Stress for your Exchange 2003 Hardware using LoadSim 2003," http://www.msexchange.org/articles-tutorials/exchange-server-2003/tools/Simulating-Stress-Exchange-2003-LoadSim.html, 15 pages (2004).
Agrawal et al., "Design Tradeoffs for SSD Performance", USENIX '08, USENIX Annual Technical Conference, 2008, pp. 57-70.
Ajtai et al., "Compactly Encoding Unstructured Inputs with Differential Compression", Journal of the ACM, vol. 49, No. 3, May 2002, pp. 318-367.
Bairavasundaram et al., "X-Ray: A Non-Invasive Exclusive Caching Mechanism for RAIDs", Proceedings of the 31st Annual International Symposium on Computer Architecture (ISCA '04), Jun. 2004, 36 pages.
Bhadkamkar et al., "BORG: Block-reORGanization for Self-optimizing Storage Systems", USENIX Association, 7th USENIX Conference on File and Storage Technologies, 2009, pp. 183-196.
Birrell et al., "A Design for High-Performance Flash Disks", Microsoft Research, vol. 41, No. 2, Apr. 2007, pp. 88-93.
Broder, Andrei Z., "Identifying and Filtering Near-Duplicate Documents", Proceedings of the 11th Annual Symposium on Combinatorial Pattern Matching, © Springer-Verlag Berlin Heidelberg, 2000, pp. 1-10.
Broder, Andrei Z., "On the resemblance and containment of documents", IEEE, 1998, pp. 21-29.
Bucy et al., "The DiskSim Simulation Environment Version 4.0 Reference Manual", Parallel Data Laboratory, Carnegie Mellon University, May 2008, 94 pages.
Carrera et al., "Conserving Disk Energy in Network Servers", ACM 17th annual international conference on Supercomputing, Presented by Hsu Hao Chen, 2006, 20 pages.
Carrera et al., "Conserving Disk Energy in Network Servers", ICS'03, Copyright 2003 ACM, Jun. 23-26, 2003, pp. 86-97.
Chang et al., "Efficient Management for Large-Scale Flash-Memory Storage Systems with Resource Conservation", ACM Transactions on Storage, vol. 1, No. 4, Nov. 2005, pp. 381-418.
Chen et al., "Managing Server Energy and Operational Costs in Hosting Centers", SIGMETRICS'05, Copyright 2005 ACM, Jun. 6-10, 2005, 12 pages.
Chu et al., "Green Storage II: Metrics and Measurement", Storage Networking Industry Association (SNIA), http://www.snia.org/sites/default/education/tutorials/2008/fall/green_storage/PatrickChuGreen_Storage_Metrics_final.pdf, 2008, 31 pages.
Commike, Alan, "Maximizing GPGPU computing for embedded systems", http://mil-embedded.com/articles/maximizing-gpgpu-computing-embedded-systems/, Feb. 10, 2009, 6 pages.
Cooke, Jim, "Flash Memory Technology Direction", Microsoft WinHec, 2007, 61 pages.
Curry et al., "Using GPUs to Enable Highly Reliable Embedded Storage", High Performance Embedded Computing (HPEC) Workshop, Sep. 23-25, 2008, 16 pages.
Curry et al., "Using GPUs to Enable Highly Reliable Embedded Storage", http://www.II. mit.edu/HPEC/agendas/proc08/Day2/18-Day2-Session3-Curry-abstract.pdf, 2008, 2 pages.
Douglis, Fred, "The Compression Cache: Using On-line Compression to Extend Physical Memory", 1993 Winter USENIX Conference, Jan. 1993, pp. 1-16.
Flouris et al., "Clotho: Transparent Data Versioning at the Block I/O Level", NASA/IEEE MSST 2004, Apr. 13-16, 2004, pp. 1-32.
Gal et al., "A Transactional Flash File System for Microcontrollers", USENIX Association, USENIX Annual Technical Conference, Jun. 24, 2005, 13 pages.
Gupta et al., "Difference engine: Harnessing memory redundancy in virtual machines", In Proc. of 8th USENIX Symposium on Operating Systems Design and Implementation, 2008, 14 pages.
"Power Consumption and Thermal Output (BTU) Information for GVS9000 and Nomadic Products", Grand Vitesse Systems 2008, http://www.gvsnet.com/spec.html, 2008, 3 pages.
Hensbergen et al., "Blutopia Stackable Storage for Cluster Management", IBM Research, IEEE Cluster 2007, Sep. 19, 2007, pp. 1-26.
Houston, Mike, "General Purpose Computation on Graphics Processors (GPGPU)", Stanford University Graphics Lab, http://graphics.stanford.edu/"mhouston/public_talks/R520-mhouston.pdf, 2005, pp. 1-38.
Hsu et al., "The Automatic Improvement of Locality in Storage Systems", Computer Science Division (EECS), Report No. UCB/CSD-03-1264, Jul. 2003, 44 pages.
Jiang et al., "Coordinated Multilevel Buffer Cache Management with Consistent Access Locality Quantification", IEEE Transactions on Computers, vol. 56, No. 1, Jan. 2007, pp. 95-108.
Jo et al., "FAB: Flash-Aware Buffer Management Policy for Portable Media Players", vol. 52, No. 2, IEEE Transactions on Consumer Electronics, May 2006, pp. 485-493.
Kawaguchi et al., "A Flash-Memory Based File System", TCON'95 Proceedings of the USENIX 1995 Technical Conference Proceedings, 1995, 10 pages.
Kgil, Taeho, "FlashCache: A NAND Flash Memory File Cache for Low Power Web Servers", CASES'06, Copyright 2006 ACM, Oct. 23-25, 2006, pp. 103-112.
Kgil et al., "Improving NAND Flash Based Disk Caches", International Symposium on Computer Architecture, IEEE Computer Society, 2008, pp. 327-338.
Kim et al., "BPLRU: A Buffer Management Scheme for Improving Random Writes in Flash Storage", USENIX Association, FAST '08: 6th USENIX Conference on File and Storage Technologies, 2008, 14 pages.
Kim, Jesung, "A Space-Efficient Flash Translation Layer for Compactflash Systems", IEEE Transactions on Consumer Electronics, vol. 48, No. 2, May 2002, pp. 366-375.
Klein, Dean A., "The Future of Memory and Storage: Closing the Gap", Microsoft WinHEC, 2007, 41 pages.
Koltsidas et al., "Flashing Up the Storage Layer", VLDB Endowment, ACM, Aug. 24-30, 2008, 12 pages.
Kulkarni et al., "Redundancy Elimination Within Large Collections of Files", USENIX 2004 Annual Technical Conference, 2004, 27 pages.
Lee, Hsien-Hsin S., "Larrabee: A Many-Core x86 Architecture for Visual Computing from Intel", School of Electrical and Computer Engineering, Georgia Institute of Technology, 2008, pp. 1-23.
Lee et al., "A Case for Flash Memory SSD in Enterprise Database Applications Applications", Arizona Computer Science Department, ACM SIGMOD, Jun. 2008, pp. 1-27.
Lee et al., "Design of Flash-Based DBMS: An In-Page Logging Approach Approach", Arizona Computer Science Department, ACM SIGMOD, 2007, pp. 1-19.
Li et al., "EERAID: Energy Efficient Redundant and Inexpensive Disk Array", In 11th Proceedings of ACM SIGOPS European Workshop, 2004, pp. 1-6.

(56) References Cited

OTHER PUBLICATIONS

Li et al., "Second-Tier Cache Management Using Write Hints", USENIX Association, FAST '05: 4th USENIX Conference on File and Storage Technologies, 2005, pp. 115-128.
Li et al., "C-Miner: Mining Block Correlations in Storage Systems", In Proceedings of the 3rd USENIX Symposium on File and Storage Technologies (FAST '04), 2004, 37 pages.
Liguori et al., "Experiences with Content Addressable Storage and Virtual Disks", In Proceedings of the Workshop on I/O Virtualization (WIOV'08), 2008, 6 pages.
Lim et al., "An Efficient NAND Flash File System for Flash Memory Storage", IEEE Transactions on Computers, vol. 55, No. 7, Published by the IEEE Computer Society, Jul. 2006, pp. 1-7.
Manber et al., "GLIMPSE: A Tool to Search Through Entire File Systems", To appear in the 1994 Winter USENIX Technical Conference, Oct. 1993, 11 pages.
Manning, Charles, "YAFFS: the NAND-specific flash file system-Introductory Article", posted on Jul. 26, 2006 by Wookey in InternalsInformation, Originally published at Linuxdevices.org, Sep. 20, 2002, 3 pages.
Matthews et al., "Intel Turbo Memory-Nonvolatile disk caches in the storage hierarchy of mainstream computer systems", ACM Transactions on Storage, vol. 4, No. 2, Article 4, May 2008, 28 pages.
Morrey, III, Charles B., "Peabody: The Time Travelling Disk", Proceedings of the 20th IEEE/11th NASA Goddard Conference on Mass Storage Systems and Technologies (MSS'03), 2003, 13 pages.
Narayanan et al., "Migrating enterprise storage to SSDs: analysis of tradeoffs", Microsoft Research Ltd. Technical Report MSR-TR-2008-169, Nov. 11, 2008, pp. 1-12.
Nath et al., "Design Tradeoffs in Applying Content Addressable Storage to Enterprise-scale Systems Based on Virtual Machines", Proceedings of the 2006 USENIX Annual Technical Conference (USENIX '06), May-Jun. 2006, 14 pages.
Norvag et al., "Log-Only Temporal Object Storage", IEEE, Published in the Proceedings of DEXA'97, Sep. 1-2, 1997, 6 pages.
"NVIDIA CUDA Compute Unified Device Architecture", CUDA Programming Guide Version 1.1, NVIDIA Corporation, www.nvidia.com, Nov. 29, 2007, 143 pages.
Ohara et al., "IBM Research Report, Real-Time Mutual-Information-Based Linear Registration on the Cell Broadband Engine Processor", IBM Research Division, RC24138, Dec. 13, 2006, 5 pages.
Owens et al., "A Survey of General-Purpose Computation on Graphics Hardware", The Eurographics Association, State of the Art Reports, Aug. 2005, pp. 21-51.
Park, Seon-Yeong, "CFLRU: A Replacement Algorithm for Flash Memory", CASES'06, Copyright 2006 ACM, Oct. 23-25, 2006, pp. 234-241.
Patterson et al., "A Case for Redundant Arrays of Inexpensive Disks (RAID)", Copyright 1988 ACM, 1988, pp. 109-116.
International Application Serial No. PCT/US2012/023972, International Search Report and Written Opinion mailed Aug. 30, 2012, 8 pages.
Prvulovic et al., "Split Temporal/Spatial Cache: A Survey and Reevaluation of Performance", In Newsletter of Technical Committee on Computer Architecture, IEEE Computer Society, Jul. 1999, pp. 1-10.
Quinlan et al., "Venti: a new approach to archival storage", Proceedings of the FAST 2002 Conference on File and Storage Technologies, USENIX Association, Jan. 28-30, 2002, 13 pages.

Reimer et al., "Opening Black Boxes: Using Semantic Information to Combat Virtual Machine Image Sprawl", VEE '08, Copyright 2008 ACM, Mar. 5-7, 2008, pp. 111-120.
Rhea et al., "Fast, Inexpensive Content-Addressed Storage in Foundation", Proceedings of the 2008 USENIX Annual Technical Conference, 2008, pp. 1-14.
Ruemmler et al., "UNIX disk access patterns", 1993 Winter USENIX, © Copyright Hewlett-Packard Company, Jan. 25-29, 1993, pp. 405-420.
"Samsung CEO: NAND Flash Will Replace Hard Drives", Posted by Mike Slocombe, Sep. 14, 2005, 2 pages.
Segal et al., "A Performance-Oriented Data Parallel Virtual Machine for GPUs", Copyright 2006 ATI Technologies, Inc., 2006, 6 pages.
Silberstein et al., "Efficient Computation of Sum-products on GPUs Through Software-Managed Cache", ICS'08, Copyright 2008 ACM, Jun. 7-12, 2008, 10 pages.
Sivathanu et al., "Database-Aware Semantically-Smart Storage", FAST'05 Proceedings of the 4th conference on USENIX Conference on File and Storage Technologies, vol. 4, 2005, 14 pages.
Syndacast, "Quantum3D Introduces Industry-Leading Graphics Accelerator XMC: Sentirs 5140", http://pr.syndacast.com/gb/press-releases/1572-quantum3d-introduces-industry-leading-graphics-accelerator-xmc-sentirs-5140.html, May 6, 2008, 2 pages.
Tridgell, Andrew, "Efficient Algorithms for Sorting and Synchronization", A thesis submitted for the degree of Doctor of Philosophy at The Australian National University, Feb. 1999, 115 pages.
Tuduce et al., "Adaptive Main Memory Compression", USENIX Association, 2005 USENIX Annual Technical Conference, 2005, pp. 237-250.
Volkov et al., "Benchmarking GPUs to Tune Dense Linear Algebra", SC '08 Proceedings of the 2008 ACM/IEEE conference on Supercomputing Article No. 31, Nov. 2008, 11 pages.
Waldspurger, Carl A., "Memory Resource Management in Vmware Esx Server", In Proc. Fifth Symposium on Operating Systems Design and Implementation (OSDI '02), Dec. 2002, 14 pages.
Wilson, Paul R., "The Case for Compressed Caching in Virtual Memory Systems", In Proceedings of the 1999 USENIX Annual Technical Conference, 1999, 16 pages.
Wong, Theodore M., "My cache or yours? Making storage more exclusive", USENIX Annual Technical Conference (USENIX 2002), Jun. 10-15, 2002, pp. 161-175.
Woodhouse, David, "JFFS : The Journalling Flash File System", Ottawa Linux Symposium (July), http://sources.redhat.com/jffs2/jffs2.pdf, 2001, 12 pages.
Xiao et al., "Promise of Embedded System with GPU in Artificial Leg Control: Enabling Time-frequency Feature Extraction from Electromyography", Engineering in Medicine and Biology Society, 2009. EMBC 2009, Annual International Conference of the IEEE, Sep. 3-6, 2009, 4 pages.
Yadgar et al., "Karma: Know-it-All Replacement for a Multilevel cAche", USENIX Association, FAST '07: 5th USENIX Conference on File and Storage Technologies, 2007, pp. 169-184.
Yang et al., "A Novel Cache Design for Vector Processing", Computer Architecture, 1992 Proceedings., The 19th Annual International Symposium, 1992, pp. 1-23.
Yoder, Alan G., "Technologies for Green Storage", Storage Networking Industry Association (SNIA), 2008, 48 pages.
Zhou et al., "Second-Level Buffer Cache Management", IEEE Transactions on Parallel and Distributed Systems, vol. 15, No. 6, Jun. 2004, pp. 505-519.
Zhu et al., "Hibernator: Helping Disk Arrays Sleep through the Winter", SOSP'05, Copyright 2005 ACM, Oct. 23-26, 2005, pp. 177-190.

\* cited by examiner

PRE-CACHE SIMILARITY-BASED DELTA COMPRESSION FOR USE IN A DATA STORAGE SYSTEM

CROSS-REFERENCE TO RELATED APPLICATIONS

This application claims the benefit of the following provisional applications, each of which is hereby incorporated herein by reference in its entirety:

U.S. Ser. No. 61/441,976 entitled Intelligently Coupled Array of SSD and HDD, filed Feb. 11, 2011; U.S. Ser. No. 61/447,208 entitled Effective Page Classification and Delta Encoding AND Buffer Cache—Temporal and Content Localities, filed Feb. 28, 2011; and U.S. Ser. No. 61/497,549 entitled Conservative Insertion and Promotion Cache Replacement Algorithm, filed Jun. 16, 2011.

This application is a continuation-in-part of U.S. patent application Ser. No. 12/762,993 entitled System and Method for Data Storage, filed Apr. 19, 2010, which is hereby incorporated herein by reference in its entirety.

U.S. patent application Ser. No. 12/762,993 claims priority to U.S. provisional patent application Ser. No. 61/174,166 entitled System and Method for Data Storage, filed Apr. 30, 2009, which is hereby incorporated herein by reference in its entirety.

BACKGROUND

Field

The present invention relates to data caching techniques, and more particularly to similarity-based delta compression caching techniques.

Description of the Related Art

While data storage capacity and central processing unit (CPU) processing power have experienced rapid growth in the past, improvement in data bandwidth and access times of disk input/output (I/O) systems have not kept pace. As a result, there is an ever-widening speed gap between CPU and disk I/O systems. Disk arrays can improve overall I/O throughput, but random access latency is still very high because of mechanical operations involved. Large buffers and deep cache hierarchy can improve latency but the resulting access time reduction is very limited.

SUMMARY

Recent developments of flash memory-based solid-state drives (SSDs) have been very promising, with rapid increases in capacity and decreases in cost. Because SSDs are based on semi-conductor technology, they may provide great advantages including enabling high-speed random reads, low power consumption, compact size, shock resistance, and the like. However, limitations that result from the physical properties of SSDs include write and erase times that are very slow compared to read times, and a significantly limited number of write/erase cycles before failure of a block.

The above physical properties and operational characteristics of SSDs present unique challenges in designing an SSD-based mass storage hierarchy. Therefore, we disclose herein cache management methods and systems that can address these unique challenges by effectively managing an SSD-based storage hierarchy to provide higher I/O performance, lower cost, longer durability, and higher data reliability.

Also, while the capacity of disk drives grows rapidly, their electromechanical parts have held down the improvement of their performance. Caching plays a critical role in modern systems, the cache bridging the gap between a disk drive and the main memory. Applying content locality techniques to cache design may provide a significant improvement in performance, particularly when combined with the techniques for SSD use and optimization described herein. Content locality refers to the characteristic that many data blocks in a data storage system may share similar or even the same content.

The recent advancement of machine virtualization has made content locality even stronger. In a virtual machine environment, each guest virtual machine is allocated a virtual disk image for storing a guest operating system, application code, and data. In a virtualized system with several guest machines, each allocated virtual disk image may store the same operating system and at least a portion of the application code may be the same. As a result, a significantly high percentage of data blocks in a data storage system that supports virtual disk images share similar or the same content. For better resource utilization, lower power consumption, easy management, and strong process isolation, data center servers may serve hundreds of virtual machines to provide service to thousands of computers and mobile devices. This may result in much more data redundancy than would be present when running a single OS on a data center server. Therefore cache management techniques, methods, and systems described herein may find significant benefit in data center virtualization (e.g. cloud computing/storage).

Because large files and collections of files may show strong content locality due to large amounts of data redundancy, the cache techniques, methods, and systems described herein may help eliminate storing redundant data through the efficient use of compression algorithms and delta encoding. Delta encoding exploits the concept that many data blocks can be represented as small patches/deltas with respect to one or more reference pages.

Other methods and systems described herein may exploit content locality in optimizing SSD storage design. Pages stored on SSD may be classified into three different categories—delta, reference, and independent pages—to make best use of high read performance of the SSD and to minimize write operations. Such page classification and storage may be referred to herein as "DRIPStore".

An SSD-based storage hierarchy may also take advantage of high performance, low cost multi-core graphics processing units (GPU) and CPUs that may be capable of supercomputing performance at very low cost. Current technology GPUs may draw very little power while delivering performance levels of hundreds of GFLOPS which may make it possible to do on-the-fly computation for disk I/O operations. Next-generation mobile GPUs are expected to nearly double this performance with a similar power envelope.

Various embodiments described herein present a new data storage architecture for higher performance, extended operating life for solid-state memory elements, lower power consumption, improved reliability, and reduced cost. The new architecture may also exploit emerging semi-conductor technologies. Embodiments described herein may include SSD storage, RAM, and optionally primary storage and an intelligent processing unit. Generally, the SSD may store seldom changed and mostly read data (e.g. reference blocks) and the RAM may store deltas (or patches) of data blocks of active I/Os with respect to reference data blocks stored in the SSD. The RAM may also store most recently/frequently accessed independent blocks (blocks that are not represented by a delta/reference block combination). In such an embodiment, a host processor may perform the techniques and methods described herein, including without limitation similarity detection, delta derivations upon I/O writes, combination of deltas with reference blocks in response to I/O reads, quantifying content popularities of blocks, managing cache by exploiting temporal/spatial/content localities, and other necessary functions for interfacing the storage to the host. In embodiments that include primary storage, the SSD and the primary storage may also be coupled by a high speed GPU/CPU/MCU that performs the techniques and methods described herein, including without limitation similarity detection, delta derivations upon I/O writes, combination of deltas with reference blocks in response to I/O reads, quantifying content popularities of blocks, managing cache by exploiting temporal/spatial/content localities, and other necessary functions for interfacing the storage to the host. For this embodiment, the SSD may store seldom changed and mostly read data (e.g. reference blocks) and the primary storage and/or the RAM may store delta blocks that are made up of many deltas as described above. The HDD and/or RAM may also store most recently/frequently accessed independent block. Embodiments of the invention may take advantage of various technologies including: 1) fast read performance of SSD, 2) host accessible RAM, 3) supercomputing speed of GPU/CPU, and 4) reliable/durable/sequential write performance of HDD. By applying the methods and systems described herein that include optional primary storage (e.g. HDD), an HDD data block can contain a large number of small deltas with respect to reference blocks. As a result, one HDD block read operation accesses enough data to satisfy multiple conventional primary storage I/O operations, thereby improving disk I/O performance greatly by replacing the slow access times of HDDs with high speed computation of suitable GPU/CPUs. In addition, random writes to SSD may be reduced, increasing life time for SSD. In other embodiments that may not include primary storage and/or the above mentioned GPU/CPU, the need for HDD block accesses may also be reduced by generating data the HDD block data through combining deltas stored in RAM and reference blocks stored in RAM or SSD.

By further exploiting content locality, temporal locality, and spatial locality of data, a new data storage architecture manages a two-component cache consisting of RAM and SSD. The new data storage architecture may cache reference blocks (e.g. read-mostly data blocks with popular content), deltas, compact delta blocks that may contain large numbers of deltas, and independent blocks that show strong temporal and/or spatial locality. Writes to SSD are reduced by data placement algorithms that ensure that data written into SSD may be characterized as popular, read-mostly, compressed, and generally hot.

The methods and systems described herein may also provide significant improvements in compression and/or de-duplication of data for cache management and may include: line speed, software-based low CPU-overhead, block level, pre-cache similarity-based delta compression— for use in a data storage system—that is based on using multiple signatures to determine block similarity. Additional compression and/or de-duplication techniques, methods, and systems for use in a data storage system are described herein. These may include line speed, software-based, low CPU-overhead, block level, pre-cache similarity-based delta compression that uses heatmap analysis of signatures for determining reference blocks.

Additionally, methods, techniques and systems described herein may leverage data placement in a data storage/cache architecture that includes multiple types of memory, including: storing most popular blocks of data as reference blocks in RAM or in an SSD and representing similar, associated blocks as a delta from a reference block and storing that delta in another type of memory.

This disclosure may also include methods for delta compression that enable bandwidth and/or storage savings including: calculating sub-signatures of each data block to determine if multiple blocks share sub-signatures, and storing the most popular block as a reference block and storing the delta for other associated blocks.

Other methods and systems described herein may combine caching with content locality techniques that may include caching selected data based on content locality. A variant of such methods and systems may include caching selected data based on content locality and at least one of temporal and spatial locality. Caching decisions may be made by dynamically determining content popularity of data blocks in addition to recency and frequency of their accesses.

Other methods and systems described herein may include use of application-dependent content locality to deliver improvements in data storage system performance. Application dependent methods and systems may facilitate determining when to move a data block from RAM to another type of memory based on application data characteristics in a system that is enabled to determine data placement based on content locality. Additionally, this may include automatic tuning of a data storage system (e.g. cache management, SSD and HDD utilization, etc.) that may take into consideration content locality and application-specific characteristics.

Yet other methods and systems described herein may address content locality with pre-fetching in a storage system with data placement based on content locality, including pre-fetching reference blocks based on known application needs.

Another method and system described herein may address product configuration, such as an environment having a host server running an application with RAM on it with attached storage and an SSD, by providing a device driver that performs pre-cache compression and places data based on content locality.

Herein also may be disclosed methods and systems for variants of the above including without limitation, disk-only configurations, SSD-only configurations, and hybrid systems that may include only SSD and RAM. A disk-only configuration may include a disk storage system with block level, line speed, pre-cache data compression and caching based on content locality. An SSD-only configuration may include an SSD storage system with block level, line speed, pre-cache data compression and caching based on content locality. Also, a hybrid system may include a hybrid storage system that includes attaching SSD to expand RAM and using SSD to hold reference blocks, with block level, line speed, pre-cache data compression and caching based on content locality.

In an embodiment of the present invention, the method of content locality-based caching includes processing data pertaining to a data storage system with a processor to determine the content locality of the data and cache a portion of the processed data. The data associated with the data storage system may be a pre-cache data. Caching may include caching a first portion of the processed data in an SSD. The cached first portion of the processed data in the SSD may comprise reference blocks, delta blocks, and independent blocks. Further, caching may include caching a first portion of the processed data in a RAM. The first portion of the processed data cached in the RAM comprises delta blocks and independent blocks. Further, caching may include caching a first portion of the processed data in an HDD. The first portion of the processed data cached in the HDD comprises delta blocks and independent blocks.

In an embodiment of the present invention, a method may include processing a data block in a data storage system with a processor to produce signatures, determining similarity of the data block to at least one reference data block using at least a portion of the signatures, and generating cache data representing differences between the data block and at least one reference data block. Producing the signatures may include generating a hash value for every two or more consecutive bytes of the data block. Determining similarity may include comparing signature occurrence data for the data block to signature occurrence data for the reference block. Determining similarity may also include generating a wavelet transform for each data block, comparing sub-signatures and wavelet transform coefficients of the wavelet transform for at least one data block and at least one reference block, and producing a histogram of a portion of the signatures. The reference block may comprise a block of data for which calculated signature popularity exceeds a threshold, which may be a reference block popularity threshold. Generating the cache data may include generating a delta block that may include differences between data blocks, at least one reference block, and meta data to map each data block to at least one reference block. The delta blocks define the differences between data blocks, at least one reference block, and meta data to map each data block to at least one reference block.

In an embodiment of the present invention, a method may include processing data blocks with a processor to produce signatures that facilitate determining similarity of the data blocks in a data storage system, calculating (with the processor) a signature heat map of a portion of the signatures to facilitate determining a reference block for similarity-based delta compression of pre-cache data, and generating (with the processor) cache data representing differences between a portion of the data blocks and the determined reference block. Generating the cache data may be based on similarity-based delta compression of data before it may be stored. Producing the signatures may include generating a hash value for every two or more consecutive bytes of a data block. The reference block may comprise a block of data for which calculated signature popularity exceeds a threshold, which may be a reference block popularity threshold. Generating cache data may include generating a delta block that includes differences between the data blocks, at least one reference block, and meta data to map each data block to at least one reference block. The signature heat map may be a two-dimensional array of signature-related data, wherein a first dimension is the number of possible signature values and a second dimension is a number of sub-signatures or a number of active input/output (I/O) accesses associated with each possible signature value during a period of time. The method may further comprise storing the reference block in an SSD, a RAM or an HDD portion of a cache memory of the data storage system. The method may further comprise storing in an SSD or a RAM or an HDD portion of a cache memory of the data storage system a delta block comprising cache data that represents difference between pre-cache data blocks and the determined reference block.

In an embodiment of the present invention, a method of storing data in a cache memory of a data storage system capable of similarity-based delta compression may comprise receiving at least one of a reference block, a packed delta block, an independent block, and a frequently accessed block; and storing at least one of the received reference block, the packed delta block, the independent block, and the frequently accessed block in an SSD portion of the cache memory. The reference block may comprise data, a portion of which is common to data blocks. The packed delta block may comprise a data representing differences between data blocks and at least one reference block. The method may further comprise storing at least one of the received reference block, the packed delta block, the independent block, and the frequently accessed block in a RAM portion of the cache memory.

In an embodiment of the present invention, a method of data placement in a cache data storage system may comprise receiving reference blocks of data, storing the reference blocks in a first portion of the cache data storage system, receiving data that represents a delta of a data block from at least one of the stored reference blocks, and storing as a delta block the data that represents the delta of the data block in a second portion of the cache data storage system that does not comprise SSD memory. The reference block may comprise a block of data for which calculated signature popularity exceeds a threshold, which may be a reference block popularity threshold. The first portion of the cache data storage system may comprise an SSD or a RAM memory. The second portion of the cache data storage system may comprise a RAM memory or a disk memory. The delta block may include data that represents deltas of data blocks. The reference blocks may facilitate similarity-based delta compression. Storing the reference blocks comprises storing the most popular reference blocks, which may include blocks containing signatures that exceed at least one of a frequency of occurrence threshold and recency of access threshold among data blocks.

In an embodiment of the present invention, a method of content locality-based caching may comprise receiving data that is associated with a data storage system with a processor, processing the data with the processor to determine its content locality, processing the data with the processor to determine its temporal locality, and caching a portion of the processed data based on its determined content and temporal locality. The data that may be associated with the data storage system is the pre-cache data. Caching may include caching the first portion of the processed data in an SSD memory. The first portion of the processed data may comprise reference blocks, delta blocks, or independent blocks. Caching may also include caching the first portion of the processed data in a RAM or an HDD memory. The first portion of the processed data may comprise delta blocks, or independent blocks.

In an embodiment of the present invention, a method of content locality-based caching may comprise receiving data that is associated with a data storage system with a processor, processing the data with the processor to determine its content locality, processing the data with the processor to determine its spatial locality, and caching a portion of the processed data based on its determined content and spatial locality. The data that may be associated with the data storage system is pre-cache data. Caching may comprise caching a first portion of the processed data in an SSD memory. The first portion of the processed data may comprise reference blocks, delta blocks, or independent blocks. The caching may comprise caching a first portion of the processed data in a RAM or in a HDD memory. The first portion of the processed data may comprise delta blocks or independent blocks.

In an embodiment of the present invention, a method of content locality-based caching may comprise receiving data pertaining to a data storage system with a processor, processing the data with the processor to determine its content locality, spatial locality, and temporal locality, and caching a portion of the processed data based on its determined content, spatial, and temporal locality. The data pertaining to data storage system may be pre-cache data. The caching may comprise caching the first portion of the processed data in an SSD memory. The first portion of the processed data may comprise reference blocks, delta blocks, or independent blocks. The caching may comprise caching a first portion of the processed data in a RAM or an HDD memory. The first portion of the processed data may comprise delta blocks or independent blocks.

In an embodiment of the present invention, a method may comprise processing data blocks with a processor to produce popularity sub-signatures that facilitate determining similarity of the data blocks, comparing the popularity sub-signatures to determine a most popular data block, storing the most popular data block as a reference block, and storing deltas for other data blocks that represent differences from the reference block. The producing popularity sub-signatures may comprise generating sub-signatures for data blocks in a data storage system. Comparing the popularity sub-signatures may include identifying a subset for each data block comprising at least one sub-signature that occurs more frequently than other sub-signatures of the sub-signatures for each of the data blocks, determining the sub-signatures that occur most frequently across the data blocks, and determining the popularity across the data blocks of each sub-signature in each subset. The subset for each data block may include more than one sub-signature.

In an embodiment of the present invention, a method of lossless compression-based caching may comprise receiving data pertaining to a data storage system with a processor, and compressing the data with the processor by applying a similarity-based delta compression algorithm to facilitate making more of the received data available to the processor in a cache of the data storage system than would be made available without compression.

In an embodiment of the present invention, a method of locality-based caching of application-dependent content may comprise receiving cached data associated with an application executing on a processor, processing the data with the processor to determine its content locality, analyzing the data with the processor to identify application-specific characteristics of the data, and identifying a cached portion of the data to be moved from a RAM portion of a cache to another type of memory based on the determined content-locality and identified application-specific characteristics.

In an embodiment of the present invention, a method may comprise accessing a data storage system with a processor to determine data placement based on content locality, and pre-fetch reference blocks associated with an application being executed by the processor based on an assessment of data needs of the application.

In an embodiment of the present invention, a method of facilitating pre-cache data compression may comprise deploying a device driver that performs pre-cache compression and data placement based on content locality, wherein the data can be placed in at least one of a RAM, an SSD, and a mass storage.

In an embodiment of the present invention, a method of content locality-based data storage may comprise taking a data block in a data storage system including a cache storage and a mass storage, processing the data block with a processor to determine its content locality, generating compressed cache data representing the data block, and caching a portion of the processed data based on its determined content locality. The cache storage may be a RAM and the mass storage may be a disk or an SSD. Further, at least one of the cache storage and the mass storage may comprise an SSD and the mass storage may further comprise a disk.

In an embodiment of the present invention, a method may comprise taking a data block in a hybrid data storage system including a cache storage and a mass storage, wherein the cache storage comprises a RAM and an SSD; processing the data block with a processor to determine its content locality, storing in the SSD reference blocks selected to facilitate similarity-based pre-cache delta compression; generating compressed data representing the data block based on the differences between the data block and at least one of the reference blocks; and caching the compressed data based on the determined content locality.

In an embodiment of the present invention, a method may comprise accessing a block of data, accessing an SSD memory to retrieve a reference block based on similarity of the block of data to the reference block, determining differences between the block of data and the reference block, and recording the determined differences in a cache page configured to cache the determined differences for data blocks.

In an embodiment of the present invention, a method may comprise receiving a request for a block of data, accessing a cached delta page that identifies differences between the block of data and a similar reference block, accessing the similar reference block from an SSD memory, and generating the requested block of data by applying the differences accessed in the delta page to the reference block. The cached delta page may be accessible in a RAM.

In an embodiment of the present invention, a method of generating a reference block for storing in a cache may comprise generating sub-signatures for data blocks in a data storage system, identifying a subset for each data block comprising the most frequently occurring sub-signatures of the sub-signatures for each of the data blocks, determining the sub-signatures that occur most frequently across the data blocks, determining the popularity across the data blocks of each sub-signature in each subset, and selecting a data block with the greatest determined popularity to be stored as a reference block. The method may further comprise recording differences between the selected data block and a portion of the data blocks in a delta page. The subset for each data block may include more than one of the most frequently occurring sub-signatures.

In an embodiment of the present invention, a method of cache data block management may comprise providing a list comprising sub-lists for storing data associated with data blocks, receiving an indication of access of a data block in a data storage system, determining if data associated with the data block appears in any of the sub-lists, and based on the determination, performing one of adding the data associated with the data block to a first sub-list, and promoting the data associated with the data block to a higher position in the list. The first sub-list may be a data block cache candidate sub-list. Promoting the data associated with the data block to a higher position in the list may comprise making the data associated with the data block accessible through a different sub-list if the indication of access is a subsequent indication of access of the data block. The subsequent indication of access may be tunable and may be determined based on I/O access size or data block size. Promoting the data associated with the data block to the higher position in the list may comprise making the data associated with the data block available at higher position within a sub-list. The data associated with a data block in a lowest position of a sub-list may be removed from the sub-list when the data associated with the data block is added to the sub-list. Adding the data associated with the data block to the first sub-list results in data associated with the data block in the lowest position of the first sub-list to be removed from the list. The data associated with the data block may be removed from a sub-list if a subsequent indication of access to the data block is not received within a predetermined number of cache misses. The predetermined number of cache misses may be based in part on a maximum number of positions in the sub-list. If the sub-list from which the data associated with a data block is removed is a RAM sub-list or an SSD sub-list, the removed data may be made accessible in another sub-list. The list may comprise a RAM sub-list, an SSD sub-list, and a candidate sub-list. The data associated with the data block in the candidate sub-list that may be promoted is made accessible in the SSD sub-list. The data associated with the data block in the SSD sub-list that may be promoted is made accessible in the RAM sub-list. The data associated with the data block stored in the list may comprise pointers to cached data blocks. The data associated with the data block stored in the list may comprise linked-list pointers to cached data blocks or meta data. The data associated with the data block that is made accessible through the list comprises a linked-list pointer, wherein the list may be a linked list. At least one of the sub-lists may be a linked list. The data associated with the data block may be made accessible in the first sub-list if it is not yet available in any sub-list. The sub-lists may be non-overlapping and a portion of the sub-lists may be overlapping.

These and other systems, methods, objects, features, and advantages of the present invention may be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION OF THE PREFERRED EMBODIMENT(S)

In the summary above and in the detailed description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context would indicate otherwise), and the method can include one or more other steps which are carried out before any of the defined steps, between two of the defined steps, or after all the defined steps (except where the context would indicate otherwise).

A host computer system shall be understood to mean any computer system that uses and accesses a data storage system for data read and data write operations. Such host system may run applications such as databases, file systems, web services, and so forth.

SSD shall be understood as any solid state disks such as NAND gate flash memory, NOR gate flash memory, or any nonvolatile solid state memories having the properties of fast reads, slow writes, and limited life time due to wearing caused by write operations.

Mass storage may be understood to include hard disk drives (HDDs) including but not limited to hard disk drives, nonvolatile RAM (NVRAM), MEMS storage, and battery backed DRAM. Although the descriptions in this invention concentrate on hard disk drives with spinning disks, generally any type of non-volatile storage can be used in place of hard disk drive.

Intelligent processing unit shall be understood to mean any computation engine capable of high performance computation and data processing, including but not limited to GPU (for graphic processing unit), CPU (for central processing unit), embedded processing unit, and MCU (for micro controller unit). The term intelligent processing unit and GPU/CPU are used interchangeably in this document.

The term "HBA" shall mean any host bus adaptor that connects a storage device to a host through a bus, such as PCI, PCI-Express, PCI-X, InfiniBand, HyperTransport, and alike. Examples of HBAs include SCSI PCI-E card, SATA PCI-E card, iSCSI adaptor card, Fibre Channel PCI-E card, etc.

The term "LBA" shall mean a logic block address that represents the logical location of a data block in a storage system. A host computer may use this address to read or write a data block.

Figure 1:
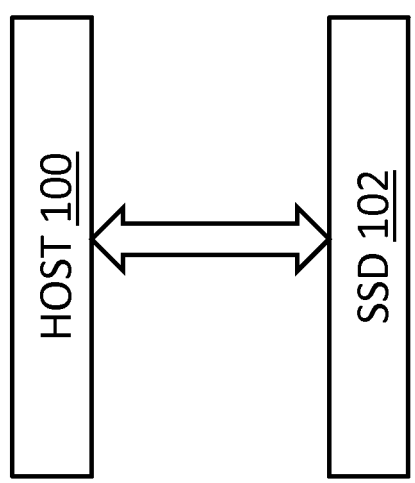
FIG. 1 depicts a block diagram of a data storage system using an SSD memory.

FIG. 1 depicts a block diagram of a known data storage system consisting of a host computer 100 that reads data from and writes data to a NAND-gate flash, NOR-gate flash, or other known SSD memory chip 102. As described above, this simple system provides I/O performance limited to that available from SSD technology and limited memory chip operating life based on SSD limitations described herein and elsewhere.

Figure 2:
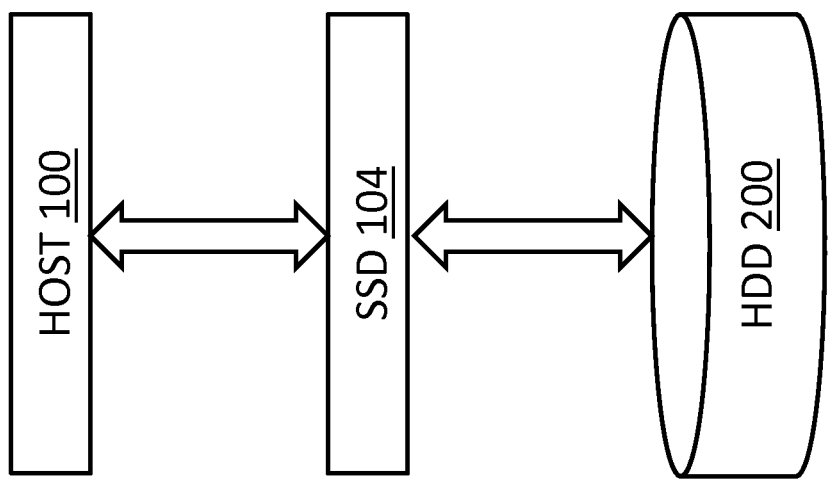
FIG. 2 depicts a block diagram of a hybrid data storage system using an SSD as a cache and an HDD for mass data storage.

FIG. 2 depicts a block diagram of a similar known data storage system consisting of a host computer 100, an SSD 104 used as a lower level storage cache, and an HDD 200 for primary data storage. The performance increase from using the SSD 104 can be limited in part because storage I/O requests do not take advantage of data locality. In addition, large quantities of random writes may slow down the SSD performance and shorten the operating life of an SSD.

Figure 3:
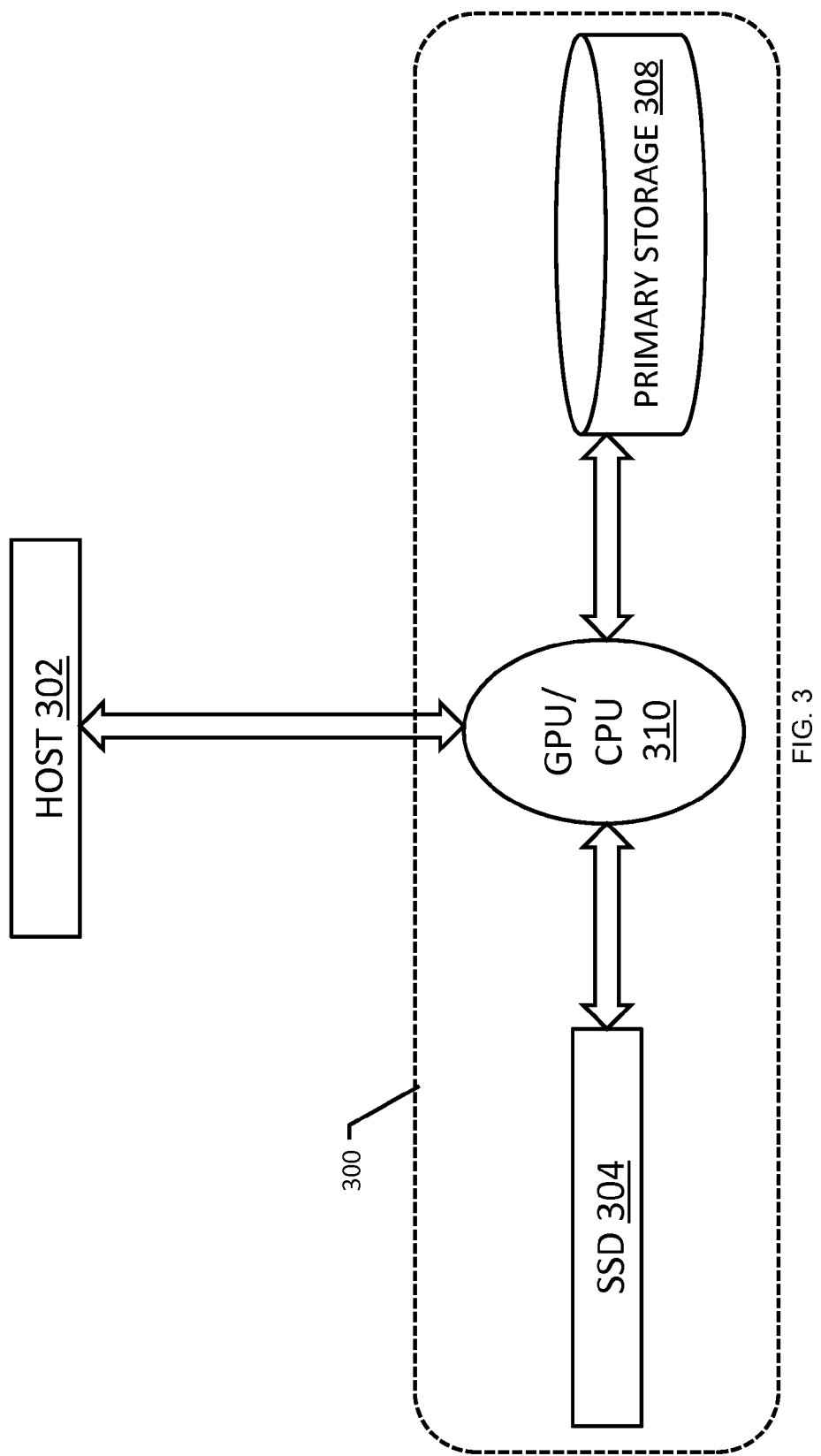
FIG. 3 depicts a block diagram of a hybrid data storage system using a GPU to control reads, writes, and erases to an SSD and an HDD.

As shown in FIG. 3, certain preferred embodiments of the invention may provide significant performance improvements over the systems of FIGS. 1 and 2 by intelligently coupling an SSD 304 and primary storage 308 with a high performance GPU/CPU 310 into a high performance primary storage cache based storage system 300. A host computer 302 runs applications and accesses data in primary storage via the high performance primary storage cache 300. The SSD 304 may be any type of Nonvolatile memory such as NAND-gate FLASH, NOR-gate FLASH, Phase Change Memory, and the like. Alternatively it may be any type of SSD or equivalent storage, such as that which is described herein or generally known. The SSD 304 may store read data called reference blocks that may be written infrequently during primary storage I/O operations. The SSD may store delta blocks that contain compressed deltas, each of which may be derived at run time to represent the difference between a data block of an active disk I/O operation and its corresponding reference block. The SSD may also store the most recently/frequently accessed independent blocks. Other data types may be stored in SSD as well.

The primary storage includes but is not limited to spinning hard disk drives, NVRAM, battery backed DRAM, MEMS storage, SAN, NAS, virtual storage, and the like. The primary storage 308 may be used to store deltas in delta blocks, which are data blocks that contain multiple deltas. A delta, which may be stored in a delta block, may be derived at run time. The delta may represent the difference between a data block of an active primary storage I/O operation and its corresponding reference block that may be stored in the SSD 304. The intelligent processing unit 310 may be any type of computing engine such as a GPU, CPU, or MCU that may be capable of doing computations such as similarity detection, delta derivations upon I/O writes, combining delta with reference blocks upon I/O reads, data compression and decompressions, and other necessary functions for interfacing the storage to the host 302. Although the embodiment of FIG. 3 shows only one SSD 304 and one primary storage module 308, it is to be understood that any embodiment may utilize more than one SSD 304 and more than one primary storage module 308.

Figure 4:
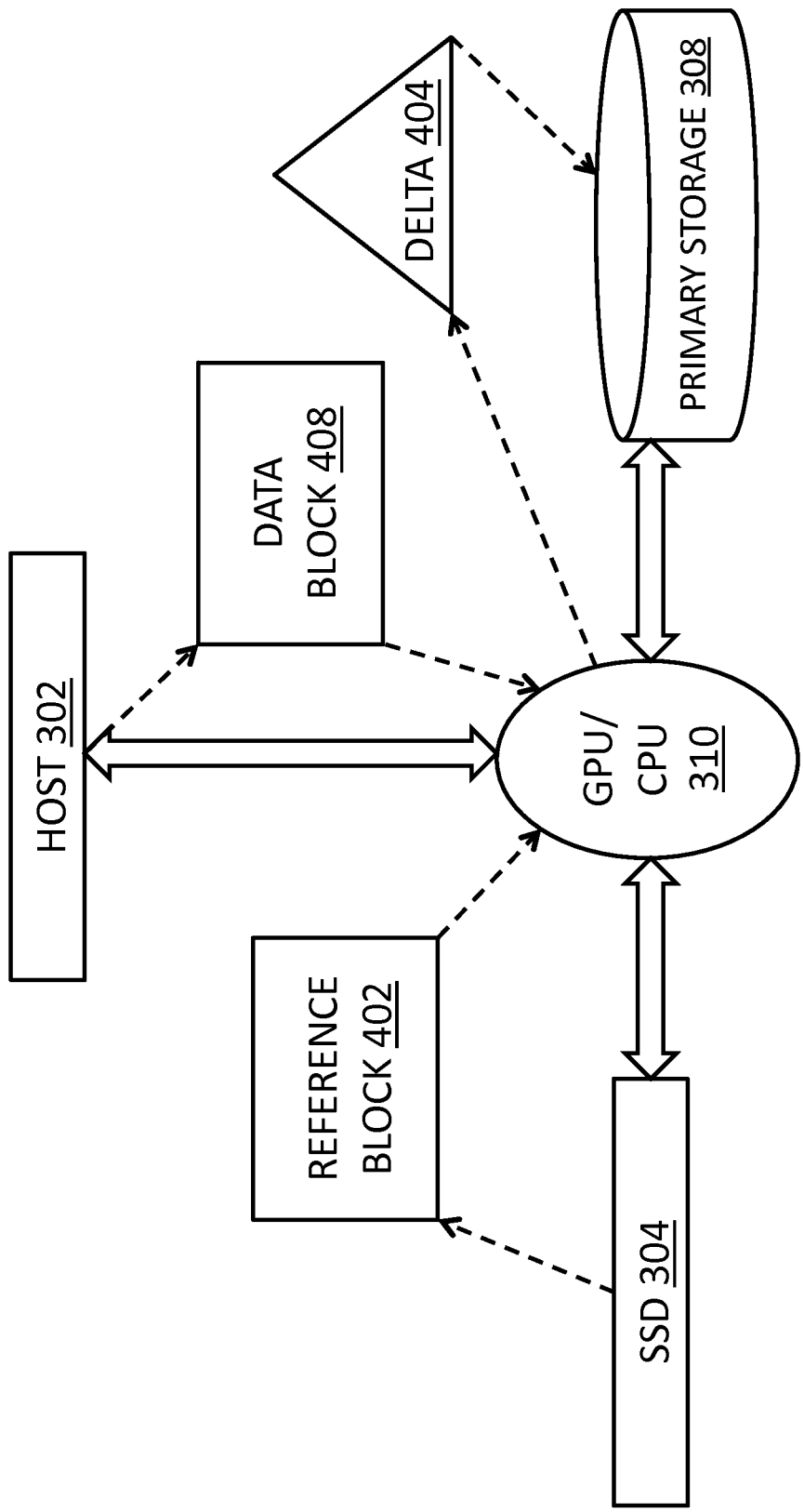
FIG. 4 depicts a block diagram of a write operation by the data storage system of FIG. 3.

Referring now to FIG. 4 which depicts a block diagram of a write operation by the data storage system of FIG. 3, in response to an I/O write by the host computer 302, the intelligent processing unit 310 identifies a reference block 402 in the SSD 304 and computes a delta 404 with respect to the identified reference block 402. The write operation may include the host computer 302 issuing a write request to write a data block 408 in storage. The intelligent processing unit 310 processes the request and communicates with the SSD 304 and primary storage 308 to serve the write operation. The intelligent processing unit 310 first identifies the reference block 402 stored in the SSD 304 that corresponds to the data block 408 and derives the delta 404 (difference) by comparing the reference block 402 with the data block 408 to be written. The derived delta 404 may be grouped with other previously derived deltas and stored in the primary storage 308 as a delta block. Note that the derived delta 404 may be stored in RAM, SSD, and any other memory suitable for use in a cache memory storage system.

Figure 5:
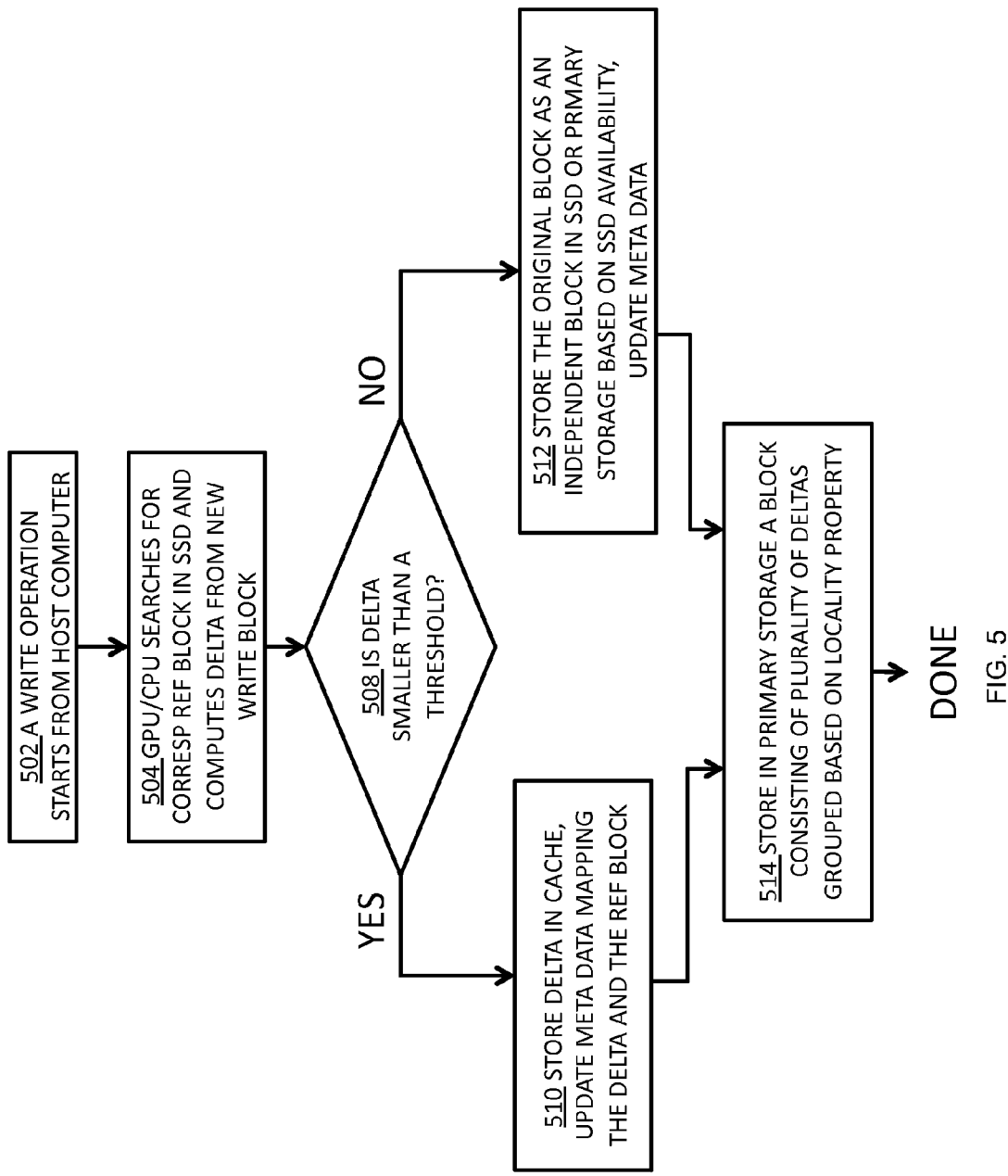
FIG. 5 depicts a high-level logic flowchart showing a write operation by the data storage system of FIG. 3.

Referring now to FIG. 5, which depicts a high-level logic flowchart showing a write operation by the data storage system of FIG. 3, a write operation may be started by the host computer in step 502. In step 504 the intelligent processing unit searches for a corresponding reference block in the SSD and computes a delta with respect to the new data block to be written. In step 508 the intelligent processing unit determines whether the derived delta is smaller than a predetermined and configurable threshold value. If the derived delta is smaller than the threshold value (Yes), the newly derived delta may be stored in a GPU/CPU delta buffer and the meta data mapping the delta and the reference block may be updated in step 510. The intelligent processing unit groups the new delta with previously derived deltas based on a content and/or temporal locality property in to a delta block. When enough deltas are derived to fill a primary storage data block, the generated delta block may be stored in the primary storage in step 514. If step 508 finds that the newly derived delta is larger than the threshold (No), the original data block may be identified as an independent block. In step 512 meta data may be updated and the independent block may be stored unchanged in the SSD if space permits or in the primary storage if space is not available in the SSD.

Figure 6:
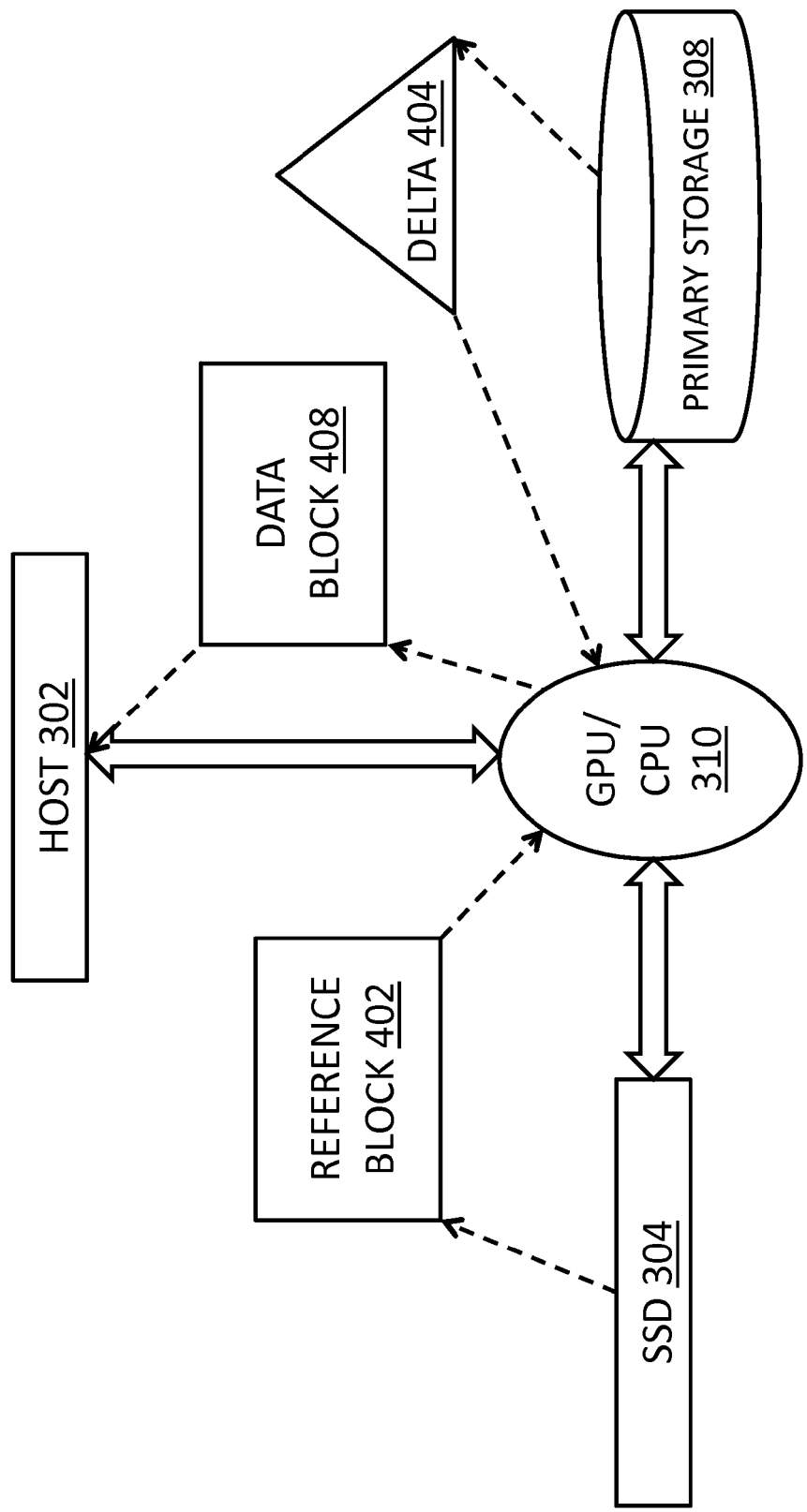
FIG. 6 depicts a block diagram of a read operation by the data storage system of FIG. 3.

Referring now to FIG. 6, the host computer 302 issues a read request to read a data block 608 from storage. In response to this read the requested data block 608 is returned by combining a delta 604 with its corresponding reference block 602 in the intelligent processing unit 310. The intelligent processing unit 310 processes the request and communicates with the SSD 304 and primary storage 308 (if needed) to service the read operation.

The intelligent processing unit 310 first determines whether the requested data block 608 has a corresponding reference block 602 stored in the SSD 304. If a corresponding reference block 602 is stored in the SSD 304, the intelligent processing unit 310 accesses the corresponding reference block 602 stored in the SSD 304 and reads the corresponding delta 608 from either the RAM cache or the primary storage based on the requested data block meta data that is accessible to the intelligent processing unit 310. The intelligent processing unit 310 then combines the reference block 602 with the delta 604 to obtain the requested data block 608. The combined data block 608 is then returned to the host computer system 302.

Figure 7:
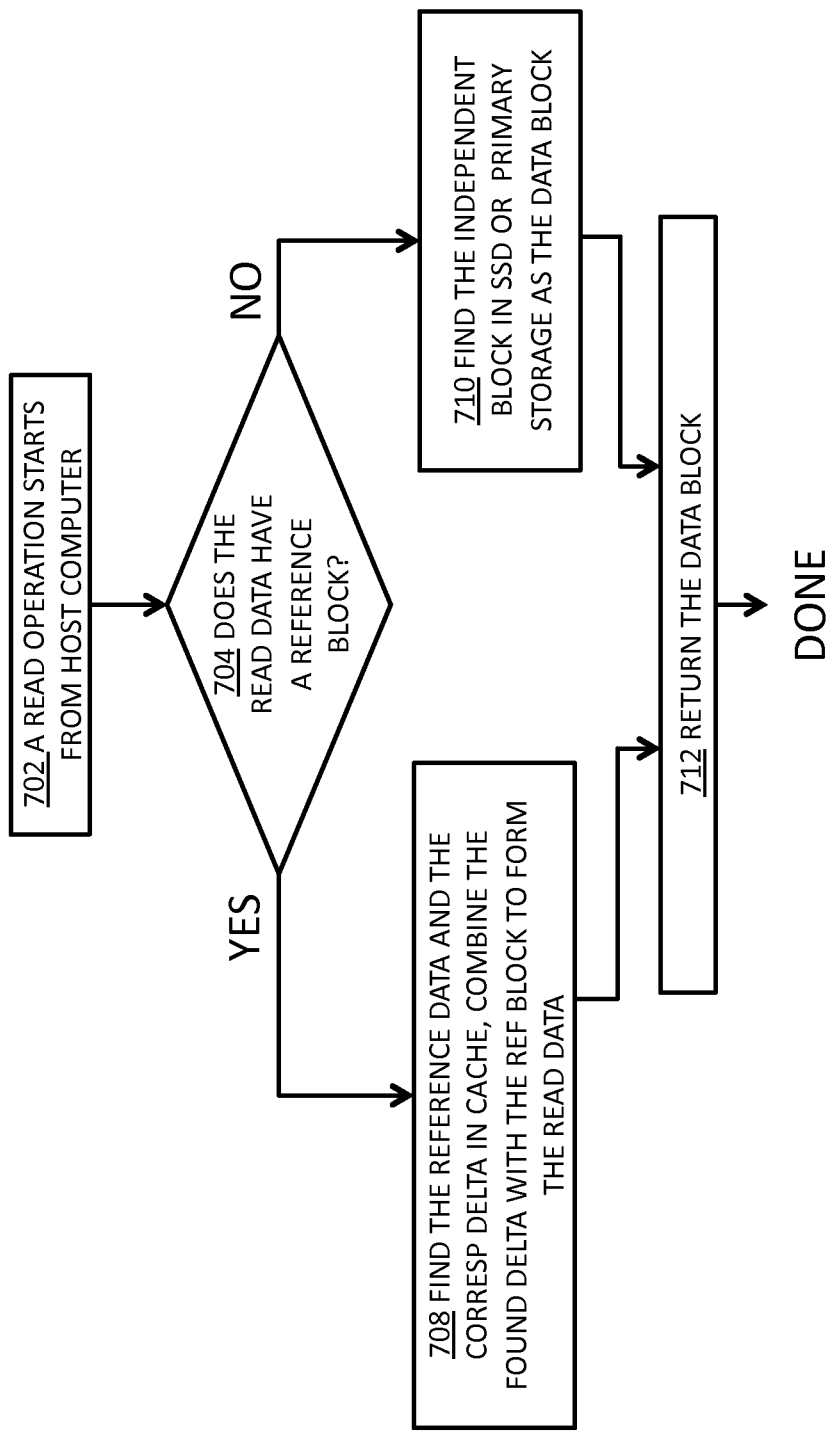
FIG. 7 depicts a high-level logic flowchart showing a read operation by the data storage system of FIG. 3.

Referring now to FIG. 7, which shows a high-level logic flowchart for read operations, a read operation may be started by the host computer in step 702. At step 704, the intelligent processing unit (GPU/CPU) determines whether or not the requested data block has a reference block. If the data block has a reference block (yes), the intelligent processing unit searches for the corresponding reference block and the corresponding delta block in the cache. If no corresponding delta is present in the RAM cache of the intelligent processing unit, the intelligent processing unit searches for the corresponding delta in the primary storage. Once both the reference block and the delta are found, the intelligent processing unit combines the reference block and the delta to form the requested data block in Step 708. If at step 704 the intelligent processing unit finds that the newly requested data block does not have a corresponding reference block ("No" after Step 704), the intelligent processing unit identifies an independent block in the SSD, the CPU/GPU cache, or the primary storage at step 710 and returns the independent data block to the host computer at step 712.

Since deltas may generally be small due to data regularity and content locality, certain preferred embodiments of the invention store deltas in a compact form so that one SSD or HDD operation contains enough deltas to generate tens or even hundreds of I/Os. The goal may be to convert the majority of I/Os from the traditional seek-rotation-transfer I/O operations on HDD to I/O operations involving mainly SSD reads and high-speed computations. The former takes tens of milliseconds whereas the latter may take tens of microseconds. As a result, the SSD in certain preferred embodiments of the invention may function as an integral part of a cache memory architecture that takes full advantage of fast SSD read performance while avoiding the drawbacks of SSD erase/write performance. Because of 1) high speed read performance of reference blocks stored in SSDs, 2) potentially large number of small deltas packed in one delta block stored in HDD, and 3) high performance GPU/CPU coupling the two, certain preferred embodiments of the invention improve disk I/O performance greatly.

Figure 8:
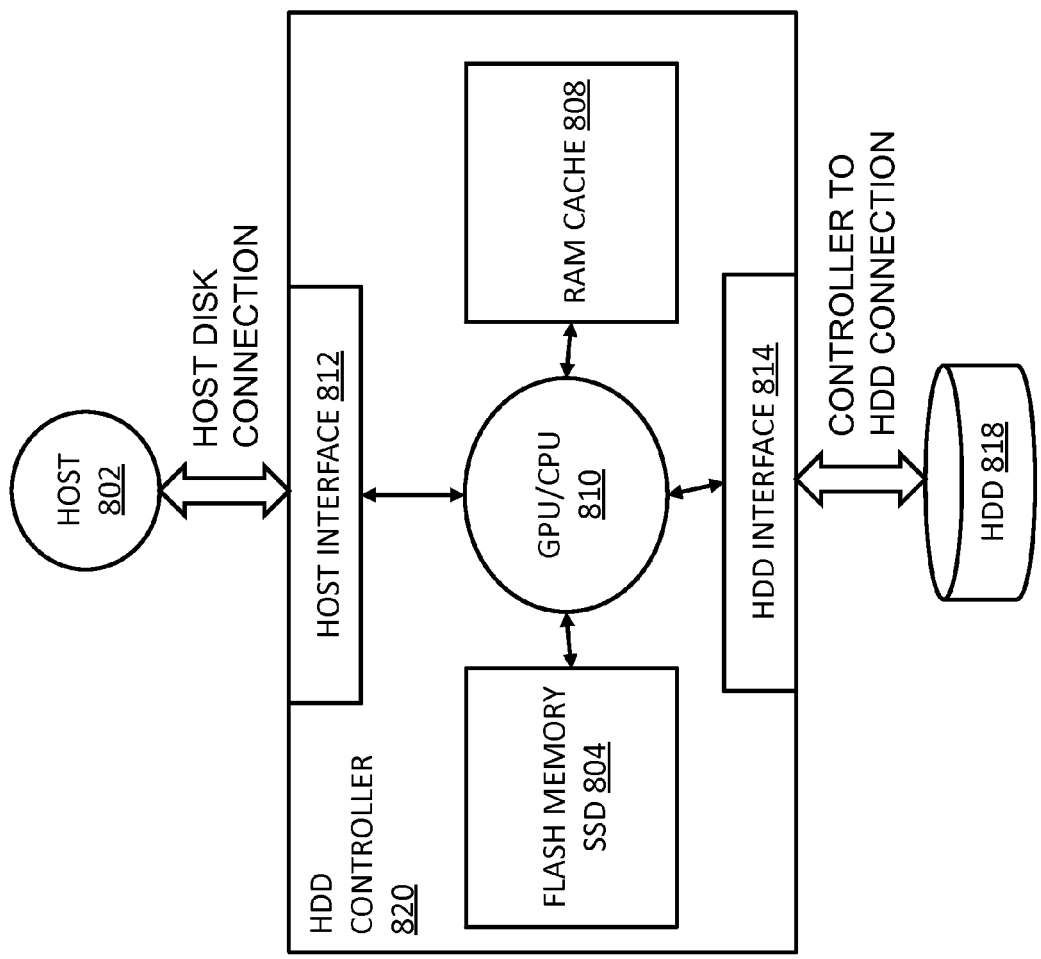
FIG. 8 depicts a block diagram of the data storage system of FIG. 3 implemented at the disk controller level.

A first embodiment of the inventive methods and systems described herein may be embedded inside a disk controller. Such an embodiment may include a disk controller board that is adapted to include NAND-gate flash SSD or similar device, a GPU/CPU, and a DRAM buffer in addition to the existing disk control hardware and interfaces such as the host bus adapter (HBA). FIG. 8 depicts a block diagram of an HDD controller-embedded embodiment. A host system 802 may be connected to a disk controller 820 using a standard interface 812. Such an interface can be SCSI, SATA, SAS, PATA, iSCSI, FC, or the like. The flash memory 804 may be an SSD, such as to store reference blocks, compact delta blocks, hot independent blocks, and similar data. The intelligent processing unit 810 performs logical operations such as delta derivation, similarity detection, combining delta with reference blocks, managing reference blocks, managing meta data, and other operations described herein or known for maximizing SSD-based caching. The RAM cache 808 may temporarily store reference blocks, deltas, and independent blocks for active I/O operations. The HDD controller 820 may be connected to the HDD 818 by known means through the interface 814.

Figure 9:
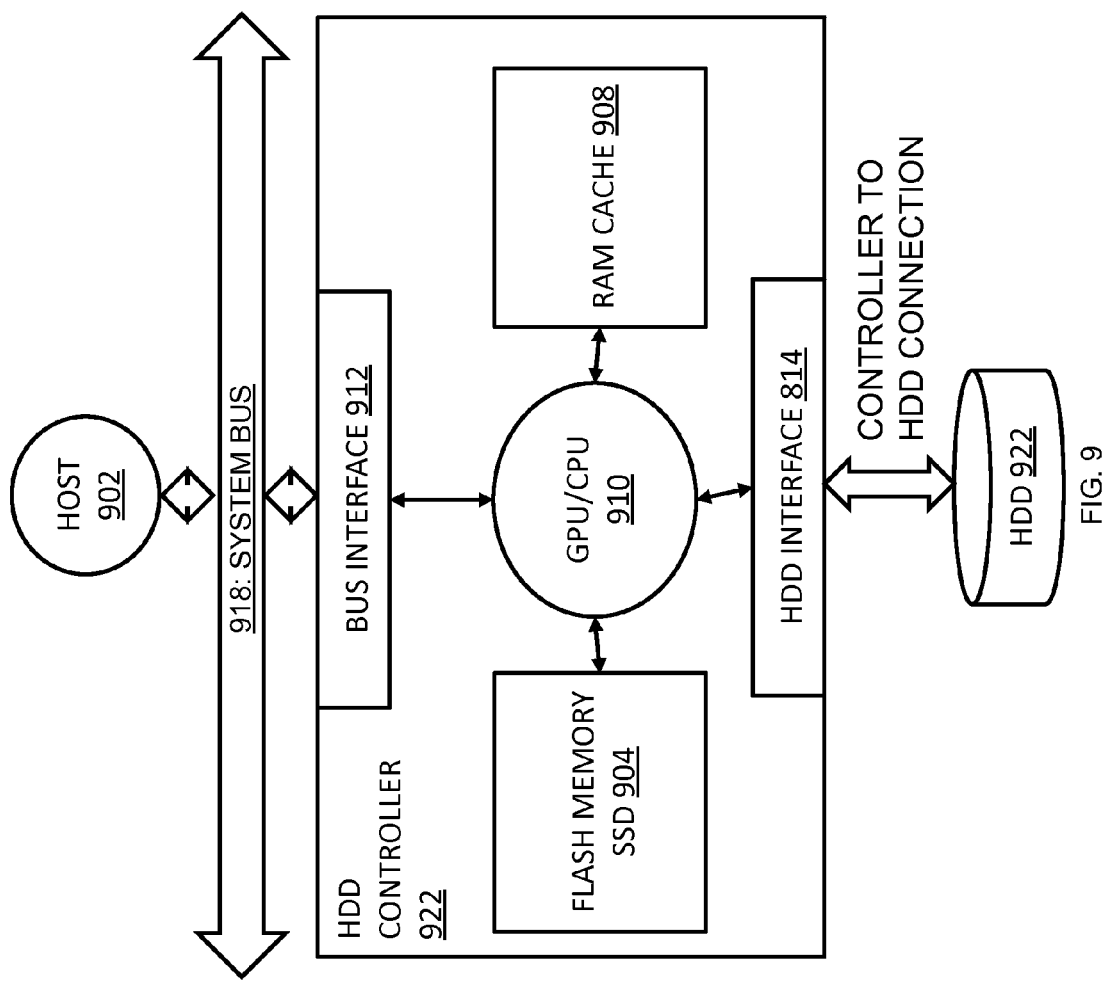
FIG. 9 depicts a block diagram of the data storage system of FIG. 3 implemented at the host bus adaptor level.

A second embodiment may implement the methods and systems described herein at the host bus adaptor (HBA) level by adding the flash SSD, intelligent processing unit, and the DRAM buffer to an existing HBA, such as SCSI, IDE, SATA card, or the like. The new HBA may have a NAND-gate flash SSD or other SSD, an intelligent processing unit (e.g. GPU/CPU), and a small DRAM buffer added to the existing HBA control logic and interfaces. FIG. 9 depicts a block diagram for implementation of this second embodiment inside the HBA 922. A host system 902 may be connected to a system bus 918 such as PCI, PCI-Express, PCI-X, HyperTransport, InfiniBand, and the like. The bus interface 912 allows the HBA card to be connected to the system bus. The flash memory 904 may be an SSD for storing reference blocks and other data. The intelligent processing unit 910 performs processing functions such as delta derivation, similarity detection, combining delta with reference blocks, managing reference blocks, executing cache management functions described herein, and managing meta data. The RAM cache 908 may temporarily store reference blocks, deltas, and independent blocks for active I/O operations. The HBA card 922 may be connected to the HDD 920 through an HDD interface 914 using a suitable protocol such as SCSI, SATA, SAS, PATA, iSCSI, or FC.

Figure 10:
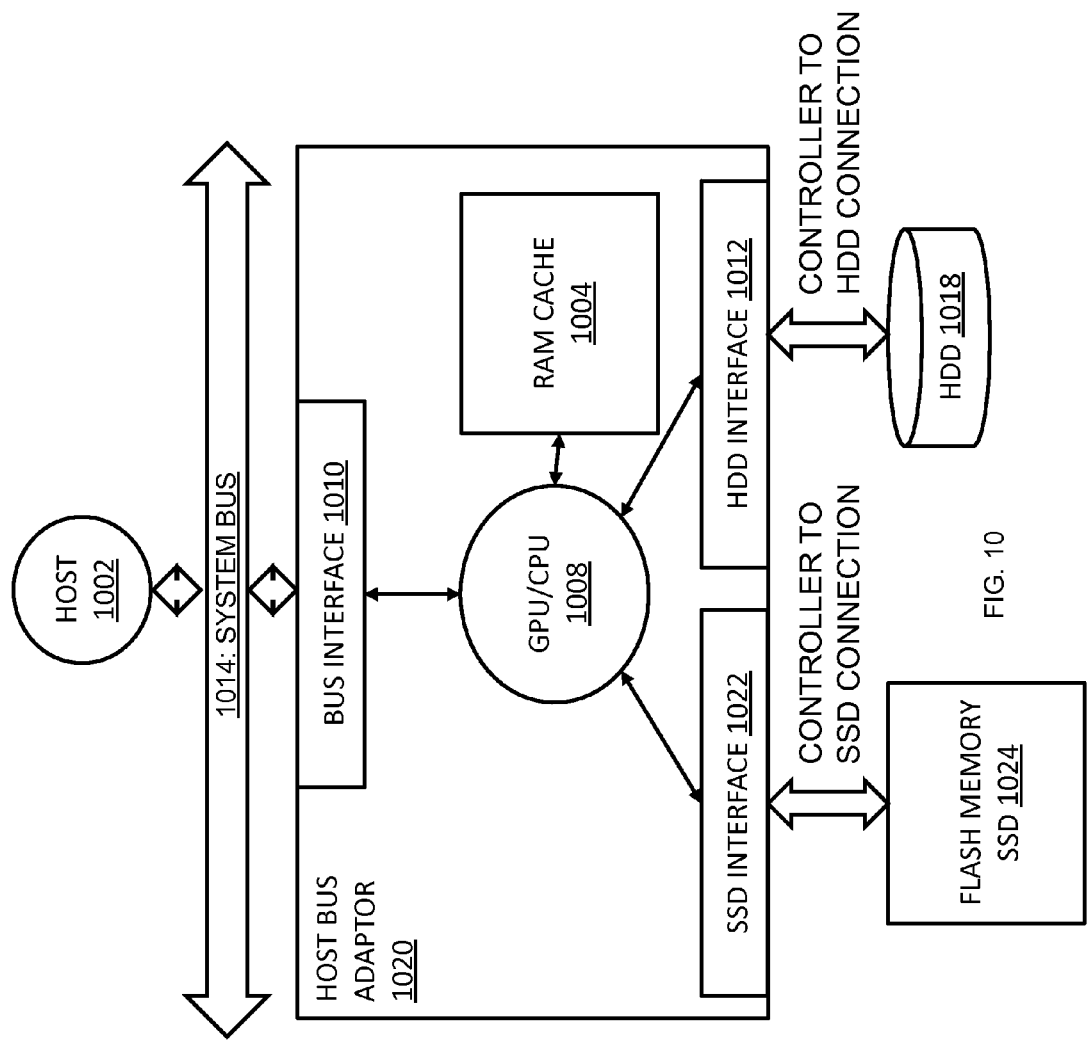
FIG. 10 depicts a block diagram of the data storage system of FIG. 3 implemented at the host bus adaptor level with external SSD.

A third embodiment is implemented at the HBA level but includes no onboard flash memory. An external SSD drive such as PCIe SSD, SAS SSD, SATA SSD, SCSI SSD, or other SSD drive may be used similarly to the SSD in the embodiment of FIG. 9. FIG. 10 depicts a block diagram describing this implementation. The HBA 1020 has an intelligent processing unit 1008 and a DRAM buffer 1004 in addition to the existing HBA control logic and interfaces. The host system 1002 may be connected to the system bus 1014, such as PCI, PCI-Express, PCI-X, HyperTransport, or InfiniBand. The bus interface 1010 allows the HBA card 1020 to be connected to the system bus 1014. The intelligent processing unit 1008 performs processing functions such as delta derivation, similarity detection, combining delta with reference blocks, managing reference blocks, executing cache algorithms that are described herein, managing meta data, and the like. The RAM cache 1004 temporarily stores deltas for active I/O operations. The external SSD 1024 may be connected by an SSD interface 1022 to the HBA card 1020 for storage of reference blocks and other data.

Figure 11:
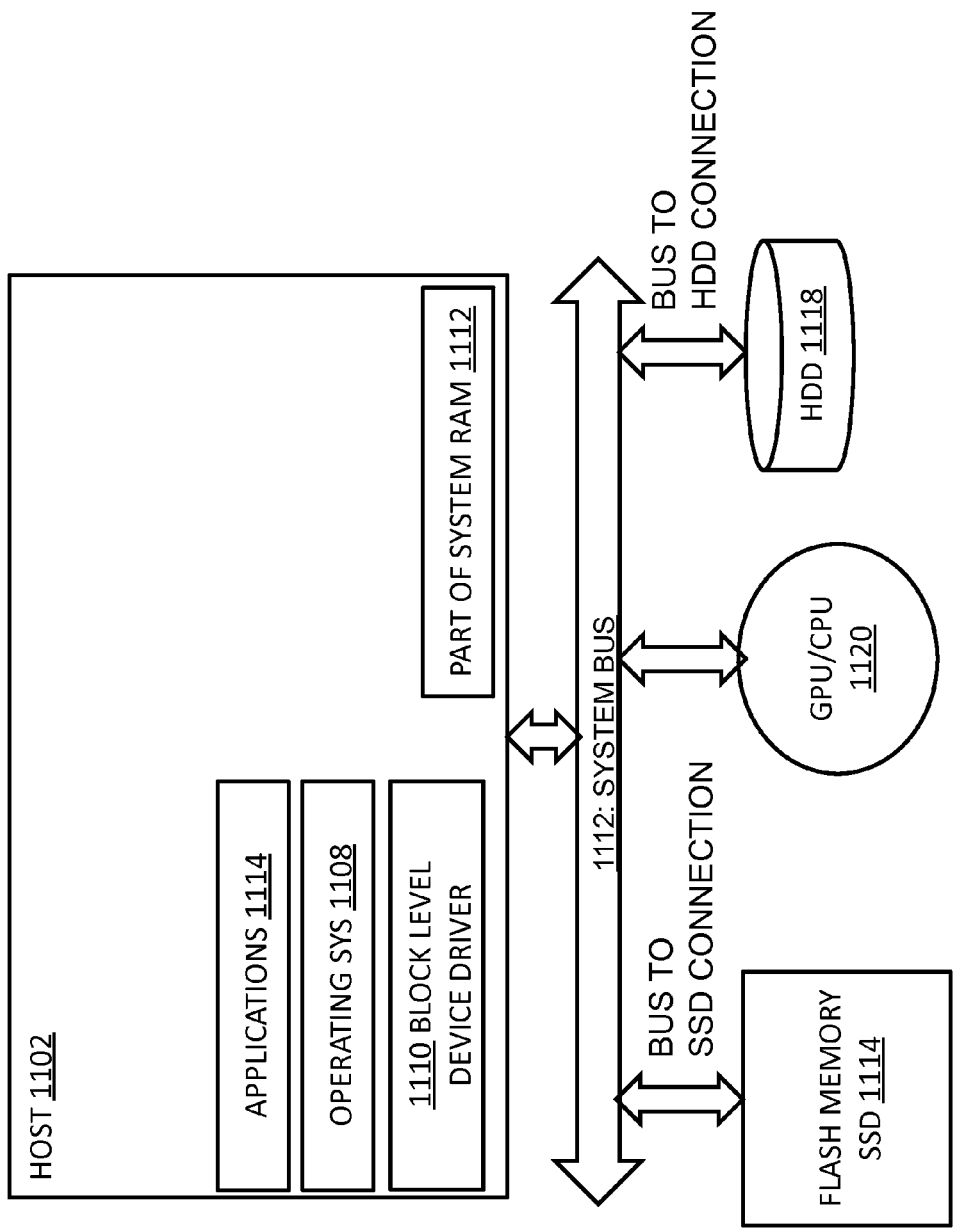
FIG. 11 depicts a block diagram of the data storage system of FIG. 3 implemented by software.

While the above implementations can provide great performance improvements, all require redesigns of hardware such as a disk controller or an HBA card. A fourth implementation includes a software approach using commodity off-the-shelf hardware. A software application at the device driver level controls a separate SSD drive/card, a GPU/CPU embedded controller card, and an HDD connected to a system bus. FIG. 11 depicts a block diagram describing this software implementation. This implementation leverages standard off-the-shelf hardware such as an SSD drive 1114, an HDD 1118, and an embedded controller/GPU/CPU/MCU card 1120. All these standard hardware components may be connected to a standard system bus 1122, such as PCI, PCI-Express, PCI-X, HyperTransport, InfiniBand, and the like. The software for this fourth implementation may be divided into two parts: one running on a host computer system 1102 and another running on an embedded system 1120. One possible partition of software between the host and the embedded system may be to have a device driver program 1110 capable of block level operation running on the host computer 1102 to perform meta data management while interfacing with upper layer software (e.g. an operating system 1108 or an application 1104), and the remaining software functions running on the embedded system 1120. The software functions can be scheduled between host 1102 and the embedded system 1120 so as to balance the loads of the embedded system 1120 and the host system 1102 by taking into account all workload demand of the OS 1108, databases and applications 1104 etc. running on the host 1102. Typically, the embedded system 1120 performs computation-intensive functions such as similarity detections, compression/decompression, and hashing functions. The embedded system 1120 can off-load many functions from the host to reduce its computation burden. A part of the system RAM 1112 may be used to cache reference blocks, deltas, and other hot data for efficient I/O operations and may be accessible to software modules that support this fourth embodiment.

Figure 12:
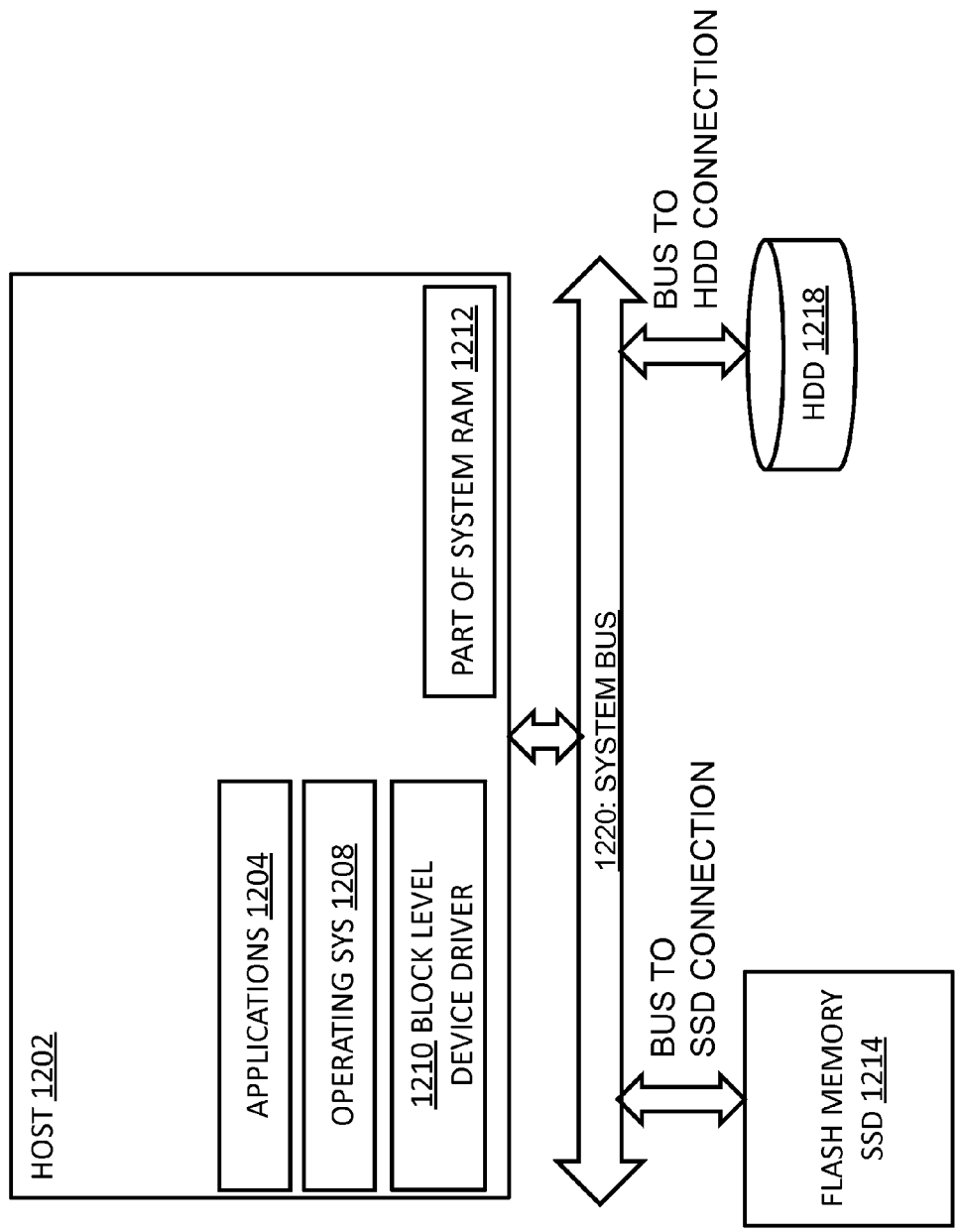
FIG. 12 depicts a block diagram of a hybrid data storage system using software on a host computer to control reads, writes, and erases to an SSD and an HDD.

A fifth embodiment for implementing the methods and systems described herein utilizes a software module running entirely on the host computer. This software solution uses a part of system RAM as the DRAM buffer but assumes no additional hardware except for any type of off-the-shelf SSD and HDD devices. FIG. 12 describes this embodiment. A software module 1210 runs at the device driver level such as a generic block layer, a filter driver layer, or any layer in the I/O stack. It controls an independent SSD 1214 and an independent HDD 1218 that may be connected to a system bus 1220. This implementation uses standard off-the-shelf hardware for the SSD 1214 and the HDD 1218. All these hardware components may be connected to a system bus 1220. The system bus 1220 includes but is not limited to protocols such as PCI, PCI-Express, PCI-X, HyperTransport, InfiniBand, SAS, SATA, SCSI, PATA, USB, etc. The software implementing the fifth embodiment runs on the host computer system 1202. A software module 1210 operates and communicates directly with the SSD 1214 and the HDD 1218. The software module 1210 also controls part of the system RAM 1212 as a cache to buffer reference blocks, deltas, and independent blocks for efficient I/O operations. The software module 1210 also interfaces and communicates with upper layer software modules such as the OS 1208 and applications 1204 running on the host 1202.

This fifth embodiment may be implemented without requiring hardware changes but it may use system resources such as the CPU, RAM, and the system bus. For I/O bound jobs, the CPU utilization can be very low and the additional overhead caused by the software is expected to be small. This is particularly evident as processing power of CPUs increase much more rapidly than I/O systems. In addition, software implementations may require different designs and implementations for different operating systems.

Figure 13:
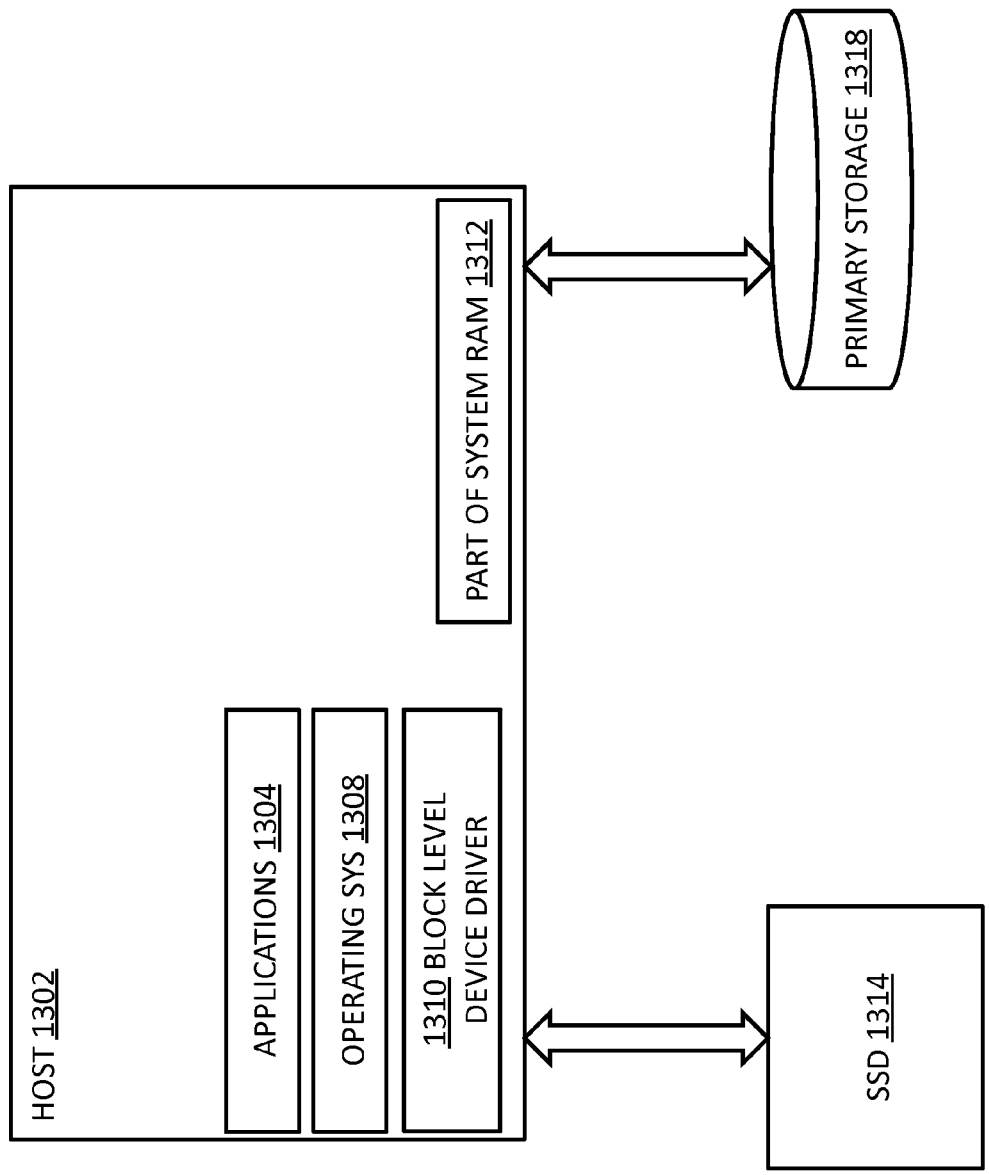
FIG. 13 depicts a block diagram of a software-based data storage system cache management system using the methods and systems described herein.

Referring to FIG. 13, a sixth embodiment for implementing the methods and systems described herein also utilizes a software module running entirely on the host computer. However, this software solution uses a part of system RAM as the DRAM buffer and optionally uses an off-the-shelf SSD module if one is present. While this embodiment provides significant performance increase to accessing data that is stored in a primary storage, this embodiment makes no changes to the primary storage data. A software module 1310 runs at the device driver level such as a generic block layer, a filter driver layer, or any layer in the I/O stack. The software module 1310 controls part of the host RAM 1312 and an optional SSD module 1314 to buffer reference blocks, deltas, and independent blocks for efficient primary storage 1318 operations. The software module 1310 also interfaces and communicates with upper layer software modules such as the OS 1308 and applications 1304 running on the host 1302.

Figure 14:
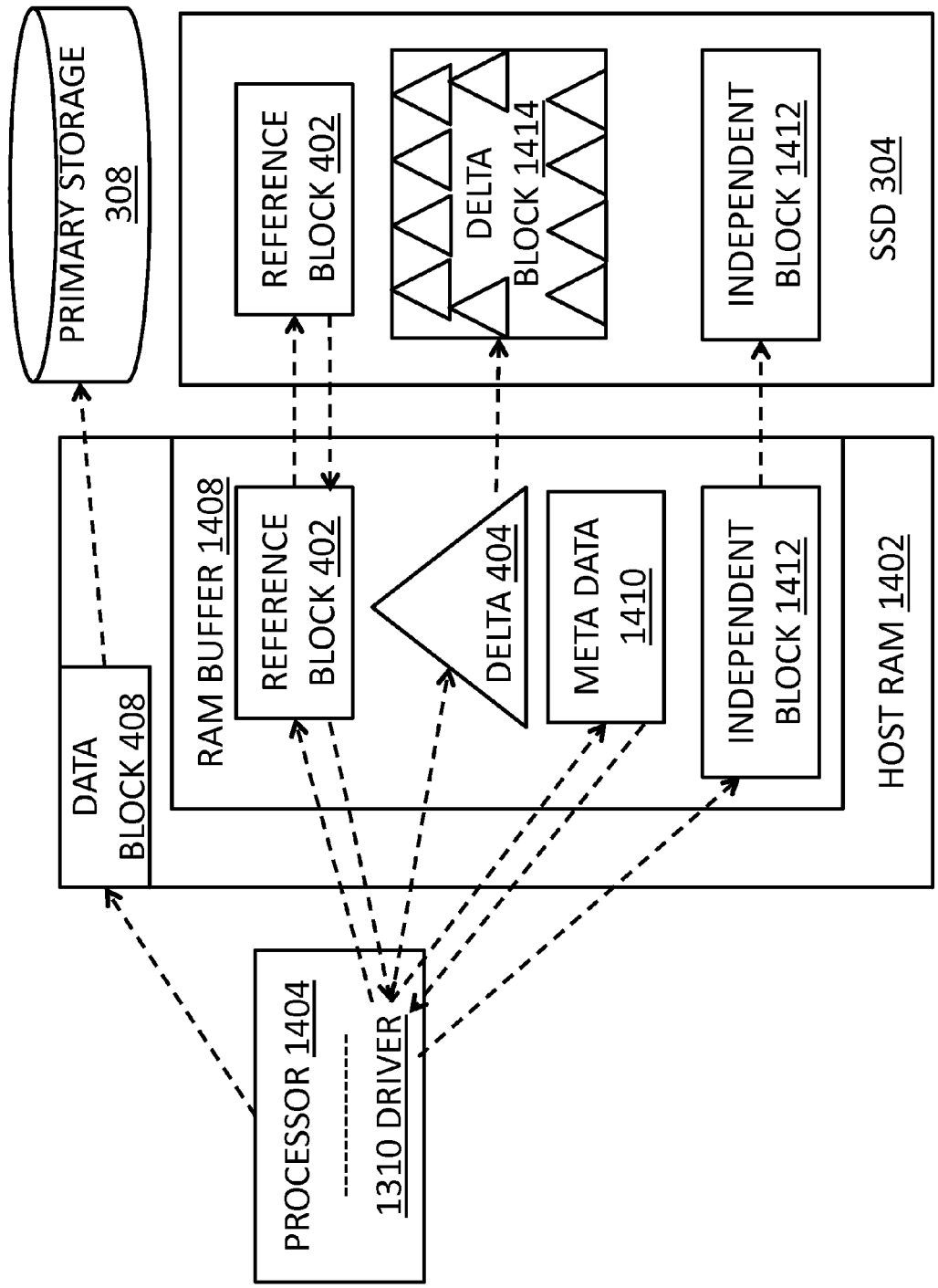
FIG. 14 depicts a block diagram of a write operation by the data storage system of FIG. 13.

Referring to FIG. 14, a primary storage directed write operation using this sixth embodiment is depicted. The host processor 1404 may instruct the primary storage 308 subsystem to perform a write of the data block 408. This instruction is also delivered to the software module/driver 1310 where it is determined if the data block 408 has a corresponding delta 404 and reference block 402. If so, a new delta based on differences between the write data block 408 and the reference block 402 is calculated and written to the delta buffer 1408 portion of the host ram 1402. If there is not already a corresponding delta 404 for the data block 408, similarity of the data block to each of the cached reference blocks may be checked using the similarity determination techniques described herein and a reference block 402 is selected. An original delta 404 is then generated and the delta 404 and meta data 1410 for the data block 408 is generated and stored in the delta buffer 1408. During the generation of the new delta or the original delta, if the resulting delta is determined to be larger than a delta size threshold, the delta compression algorithm may be terminated and an independent block 1412 may be generated for storage in the delta buffer 1408. As can be seen in the embodiment of FIG. 14, if SSD storage is available, reference blocks 402, independent blocks 1412, and/or delta blocks 1414 may be stored in the SSD.

Figure 15:
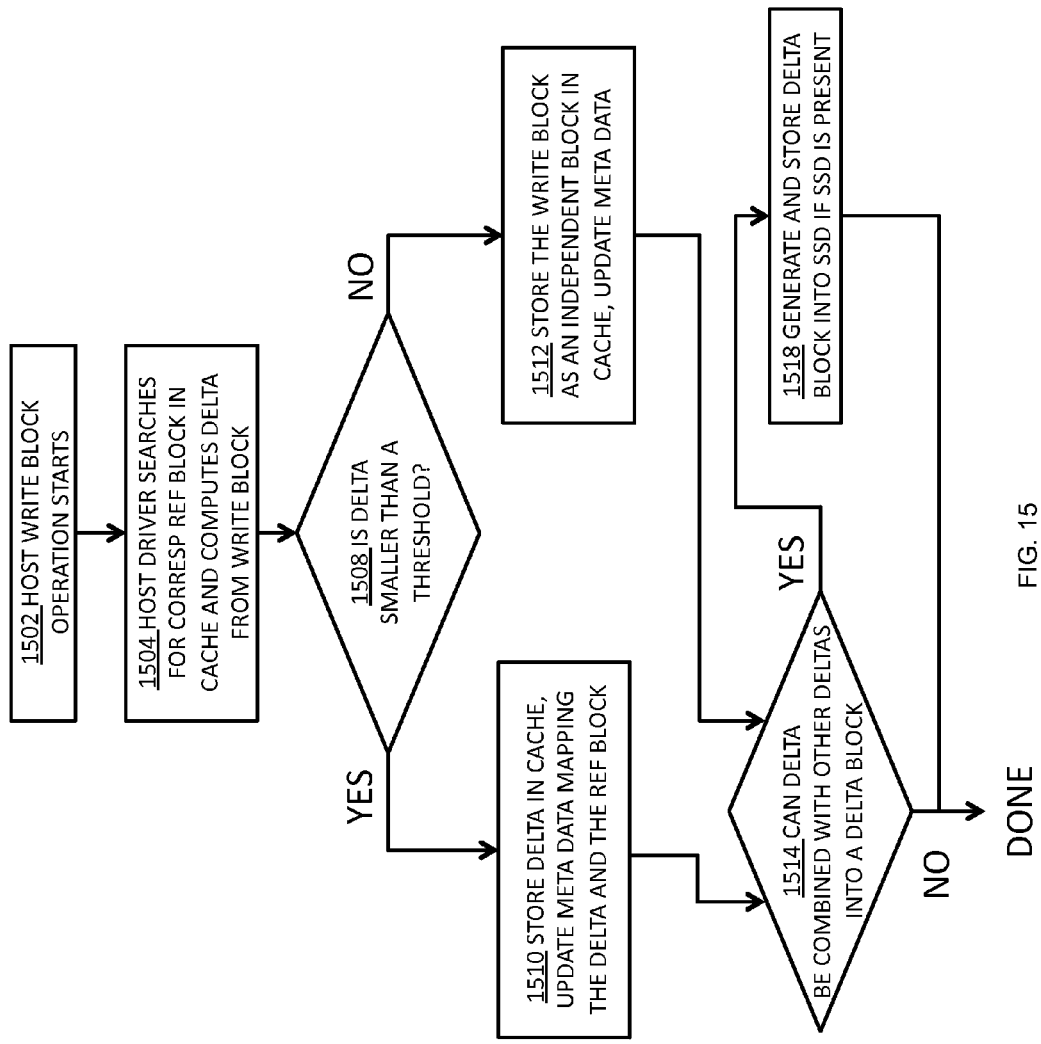
FIG. 15 depicts a high-level logic flowchart showing a write operation by the data storage system of FIG. 13.

Referring now to FIG. 15, a flow diagram of a primary storage directed write operation using the sixth embodiment is depicted. In this flow diagram, a host may start a data block 408 host write operation at step 1502. The software module/driver 1310 may search for a corresponding reference block in the cache (which may include the RAM buffer 1408 and/or the SSD 304 from FIG. 14). Presuming that a reference block is found, a new delta is generated in step 1504. As noted above for FIG. 14, if a reference block is not found for the write data block 408, an original delta may be generated based on a new reference block with the most similarity. If the generated new or the original delta is smaller than a delta size threshold in step 1508 then flow proceeds to step 1510 in which the delta is stored in cache, meta data for mapping the delta to the data block and the reference block is updated. If the new or original delta is larger than the delta size threshold as determined in step 1508, flow proceeds to step 1512 in which the data block is stored in cache as an independent block and metadata to facilitate retrieving this independent block is updated. Flow may proceed with step 1514 in which the software module 1310 determines if the generated delta can be combined with other deltas into a delta block that is suitable for storing in SSD memory. If so, flow proceeds to step 1518 where a delta block is generated and stored into the SSD memory (presuming that the SSD memory is available). Note that writing delta blocks from the RAM buffer to SSD or primary storage may be based on LPU/CIP algorithm described herein.

Figure 16:
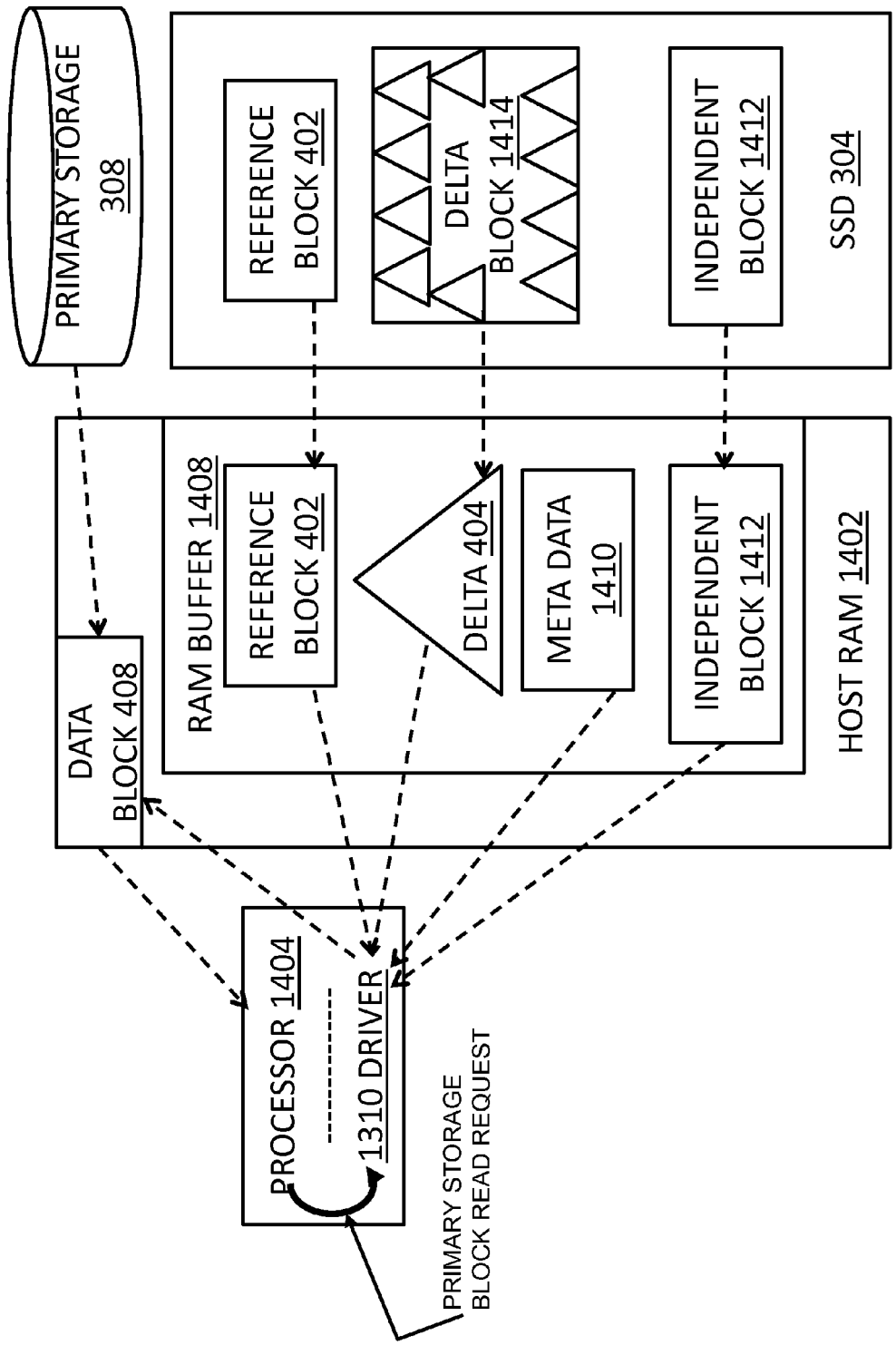
FIG. 16 depicts a block diagram of a read operation by the data storage system of FIG. 13.

Referring now to FIG. 16, a block diagram of a primary storage read operation following the sixth embodiment described herein above is depicted. Processor 1404 may request access of a primary storage data block 408. The request may be provided to the software module/driver 1310 for executing the similarity-based delta compression techniques described herein. Software module/driver 1310 may read meta data 1410 associated with the data block 408. The meta data 1410 may indicate that a delta 404 and a reference block 402 that are stored in cache (e.g. the RAM buffer 1408 of the host RAM 1402). The reference block and the delta may be combined to generate the requested data block 408. Alternatively, the meta data 1410 may indicate that an independent block 1412 that represents the requested data block 408 is available in the cache. The software module 1310 may access the independent data block and provide it to the processor 1404. If it is determined that a delta and an independent block do not exist for the requested data block 408, the primary storage 308 may be called upon to deliver the data block 408. As depicted in FIG. 16, if SSD storage is available, reference blocks 402, delta blocks 1414, and/or independent blocks 1412 may be stored in the SSD.

Figure 17:
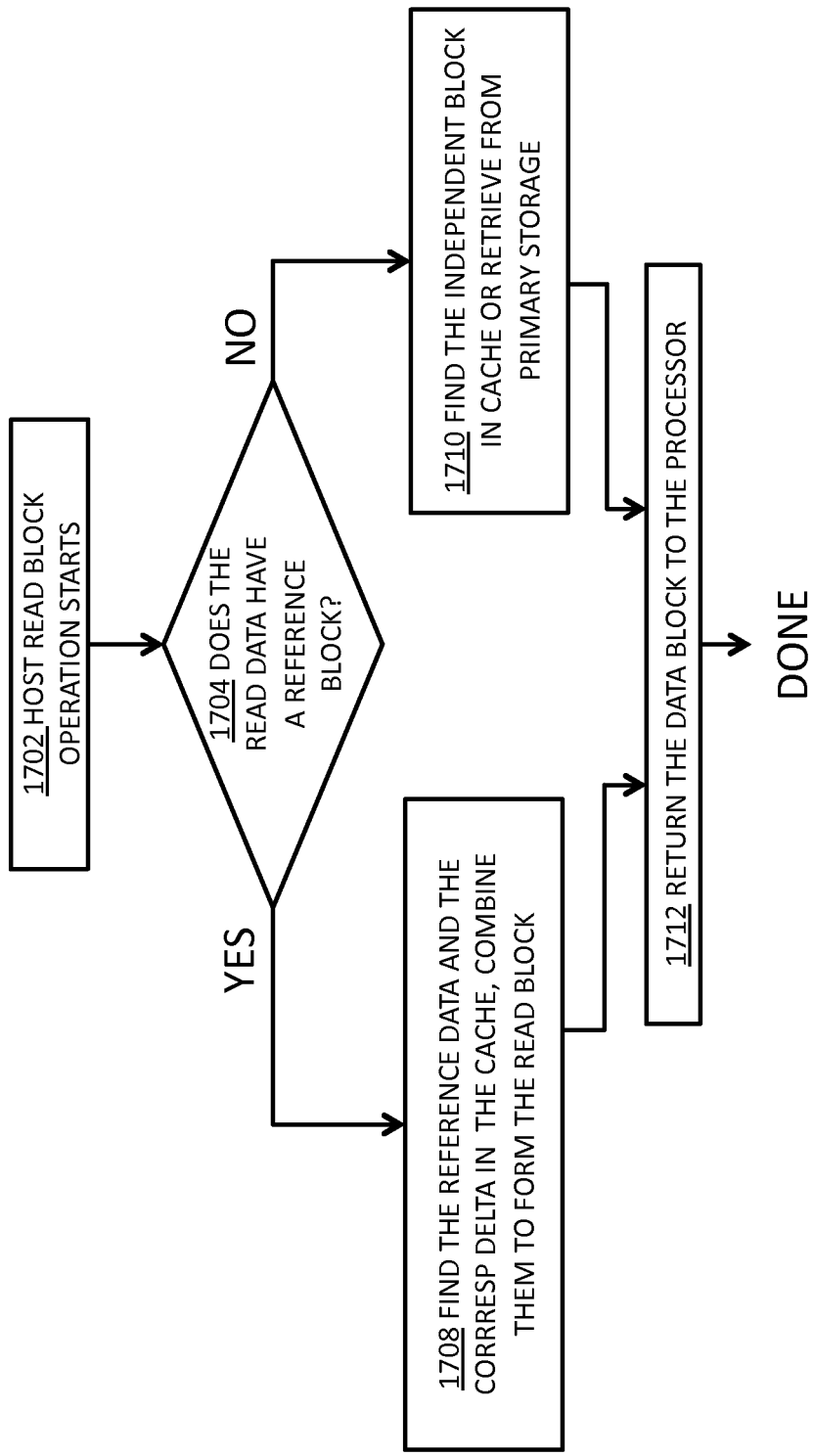
FIG. 17 depicts a high-level logic flowchart showing a read operation by the data storage system of FIG. 13.

The host read operation depicted in the block diagram of FIG. 16 is shown as a flow chart in FIG. 17. A host processor may request a read data block by starting a primary storage read operation at step 1702. If the software module 1310 determines that a reference block exists for the requested primary storage data block (such as by checking meta data associated with the primary storage data block) at step 1704, the corresponding reference block and delta may be read from the cache and combined to form the requested read data block in step 1708. If step 1704 determines that a reference block does not exist for the requested primary storage data block, either an independent block is ready from the cache or the primary storage is relied upon to provide the requested data block in step 1710. The flow concludes in step 1712 in which the requested data block is provided to the requesting processor.

I/O scheduling for embodiments described herein may be quite different from that of traditional disk storage. For example, the traditional elevator scheduling algorithm for HDD aims at combining disk I/Os in an order that minimizes seek distances on the HDD. In contrast, the methods and systems herein facilitate changing I/O access scheduling to emphasize combining I/Os that may be similar to a reference block or may be represented by deltas that are contained in one delta block stored in the primary storage subsystem or a dedicated SSD storage module. To do this scheduling, an efficient meta-data structure may be needed to relate LBAs of read I/Os to deltas stored in a delta block and to relate LBAs of write I/Os to reference blocks stored in SSD.

To serve I/O requests from the host, certain preferred embodiments use a sliding window mechanism similar to the one used in the TCP/IP protocol. Write I/O requests inside the window may be candidates for delta compression with respect to reference blocks and may be packed into one delta block. Read I/O requests inside the window may be examined to determine all those that were packed in one delta block. The window slides forward as I/O requests are being served. Besides determining the best window size while considering both reliability and performance, certain preferred embodiments may be able to pack and unpack a batch of I/Os from the host so that a single HDD I/O operation generates many deltas.

Identifying a reference block in SSD for each I/O may be a basic function of embodiments of the invention. For a write I/O, the corresponding reference block, if present, needs to be identified for delta compression. If the write I/O is a new write with no prior reference block, a new reference block may be identified that has the most similarity to the data block of the write I/O. For a read I/O, as soon as the delta corresponding to the read I/O is loaded, its reference block may be found to decompress to the original data block.

Quickly identifying reference blocks may be highly beneficial to the overall I/O performance. In order to identify reference blocks quickly, reference blocks may be classified into three different categories. The first category contains all reference blocks that have exactly the same LBAs as deltas. These may be the data blocks originally stored in the SSD, but changes occur on these blocks during online operations such as database transactions or file changes. These changes may be stored as a packed block of deltas to minimize random writes to SSD.

Because of content locality, the deltas may be expected to be small. Identifying this type of block may be straightforward with proper meta-data mapping of deltas to reference blocks.

The second category contains data blocks generated as results of virtual machine creations. These blocks include copies of guest OS, guest application software, and user data that may be largely duplicates with very small differences. Virtual machine cloning enables fast deployment of hundreds of virtual machines in a short time. Different virtual machines access their own virtual disk using virtual disk addresses while the host operating system manages the physical disk using physical disk address. For example, two virtual machines send two read requests to virtual disk addresses V1_LBAO and V2_LBAO, respectively. These two read requests may be interpreted by underlying virtual machine monitor to physical disk addresses LBAx and LBAy, respectively, which may be considered as two independent requests by a traditional storage cache. Embodiments of the invention relate and associate these virtual and physical disk addresses by retrieving virtual machine related information from each I/O request. The requests with the same virtual address may be considered to have high possibility to be similar and may be combined based on similarity. In the current example, block V1_LBAO (LBAx) is set as the reference block so the methods and systems described herein may be used to derive and keep the difference between V2_LBAO (LBAy) and V1_LBAO (LBAx) as delta.

The third category consists of data blocks that may be newly generated with LBAs that are not associated with any of the reference blocks stored in SSD. These blocks may be created by file changes, file size increases, file creations, new tables, and so forth. While these new blocks may contain substantial redundant information compared to some reference blocks stored in the cache, quickly finding the corresponding reference blocks that have most similarity may allow best use of the delta-compression and other techniques described herein. To support very quick similarity detection, a new similarity detection algorithm is described herein based on wavelet transform using GPU/CPU. While hashing has been widely used to find identical blocks, the sub-signatures that represent the combination of several hash values of sub-blocks may be more appropriate for detecting similarity between two data blocks. The following paragraph describes briefly this similarity detection algorithm that may exploit modern CPU architectures.

The similarity of two blocks may be determined by the number of sub-signatures that the two blocks share. A sufficient number of shared sub-signatures may indicate that the two blocks are similar in content (e.g. they share many same sub-signatures). However, such content similarity can be either an in-position match or an out-of-position match where the position change is caused by content shifting (e.g. inserting a word at the beginning of a block shifts all remaining bytes down by the word). To efficiently handle both in-position matches and out-of-position matches, embodiments use a combination of regular hash computations and wavelet transformation. Hash values for every three consecutive bytes of a block may be computed to produce a one byte signature. A Haar wavelet transform may be also computed. The most frequently occurring sub-signatures may be selected along with a number of coefficients of the wavelet transform for signature matching. In an example, six of the most frequently occurring sub-signatures and three of three wavelet transform coefficients may be selected. That is, nine signature matching elements representing a block may be compared: six sub-signatures and three coefficients of the wavelet transform. Hash values may be computed with more or fewer than three consecutive bytes. Similarly, more or fewer than six frequent sub-signatures may be selected. Likewise, more or fewer than three Haar wavelet coefficients may be selected.

The three coefficients of the wavelet transform may include one total average, and the positions of the two largest amplitudes. The total average coefficient value may be used to pick the best reference if multiple matches are found for the other eight signatures.

Consider an example of a 4 KB block. Embodiments of the invention first calculate the hash values of all sets of three consecutive bytes to obtain 4K−2 sub-signatures. Among these sub-signatures, the six most frequent sub-signatures may be selected together with the three coefficients of the wavelet transform to carry out the similarity detection. If the number of matches of two blocks exceeds seven, they may be considered to be similar. Based on experimental observations, this position-aware sub-signature matching mechanism can recognize not only shifting of content but also shuffling of contents.

Sub-signatures of a data block may also be computed using sliding tokens. The size of the token ranges from three bytes to hundreds of bytes. The token slides one byte a time from the beginning to the end of the block. Hash values of each sliding token is computed using Rabin finger print, Mersenne prime modulus, or random polynomials etc. Sampling or sorting techniques are used to select a few sub-signatures of each block for similarity detection and reference selection processing.

Figure 18:
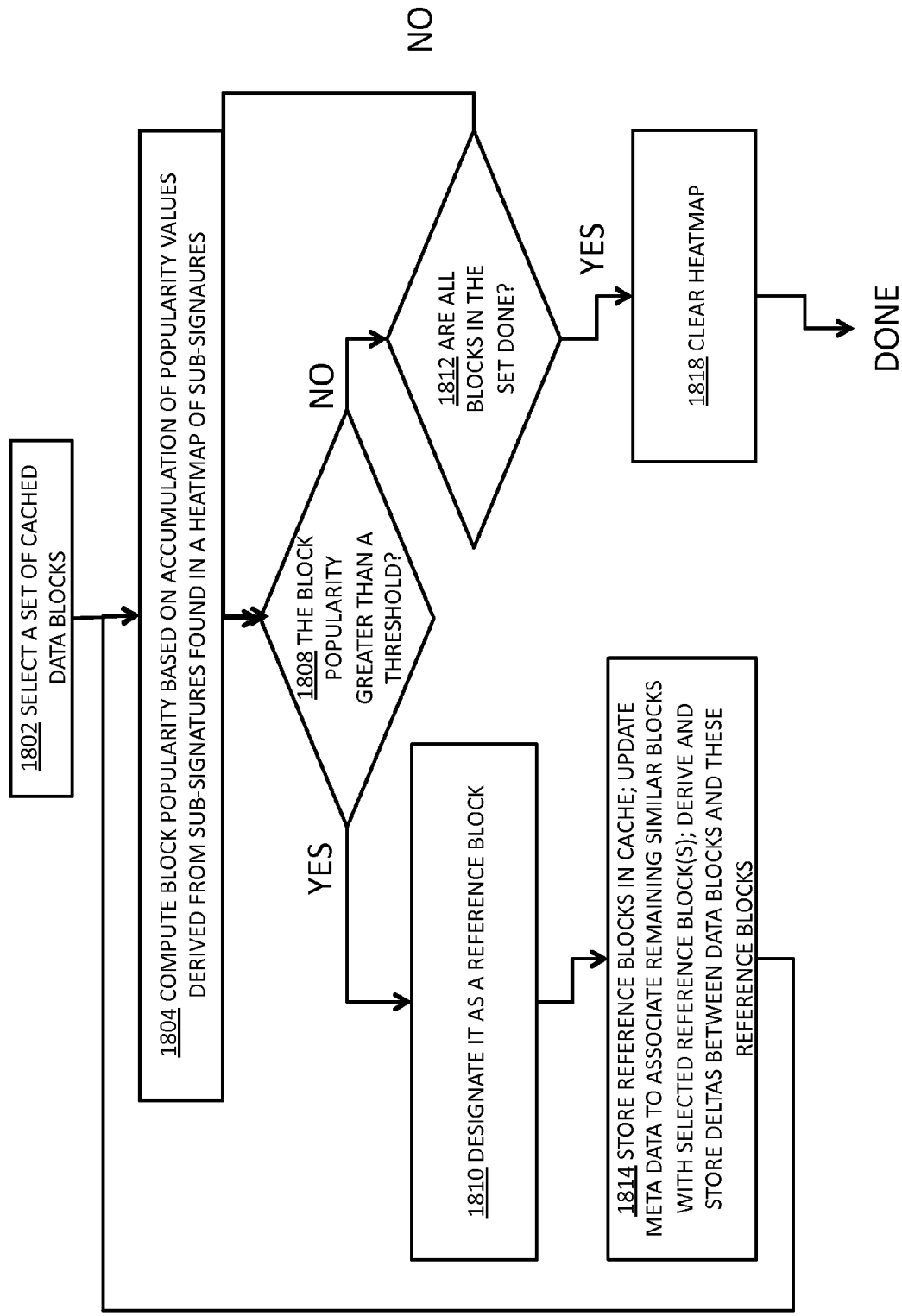
FIG. 18 depicts a high-level logic flowchart showing a process of determining reference blocks from cached independent blocks.

FIG. 18 shows a high level flowchart for similarity detection that may be invoked periodically. For similarity detection upon an access to a new data block, similarity data (e.g. signatures, sub-signatures, and potentially heatmap data) of a set of reference blocks are searched to find a sufficiently similar reference block. Such a reference block should result in a delta that is less than a predefined delta size threshold as described herein. Once a suitable reference block is found, the new data block may be designated as an associate. Also, the delta, and similarity detection-related meta data are stored in a data structure that facilitates rapid access to delta, reference, and independent data block information.

For periodic similarity detection, the period length and the set of blocks to be examined can be configured based on performance requirements and the sizes of available RAM, SSD and primary storage if it is available. For periodic similarity detection, after selection of a set of cached blocks at step 1802 to examine for similarity detections, popularity of each block may be computed at step 1804. Each block may then be evaluated to determine its popularity. If the popularity of a block exceeds a predefined and configurable threshold value checked in step 1808, the data block may be designated as a reference block in step 1810 to be stored in the RAM or the SSD. If step 1808 determined that the similarity value of the two blocks is less than the threshold value, the process continues to other blocks through step 1812. The designated reference block(s) from step 1810 may be stored in the cache and metadata about the block may be updated to allow association of remaining similar blocks for delta-compression. Finally, after all the data blocks in the set may be compared, the heat map is cleared in step 1818 to begin a new phase of sub-signature generation and block popularity accounting.

Figure 19:
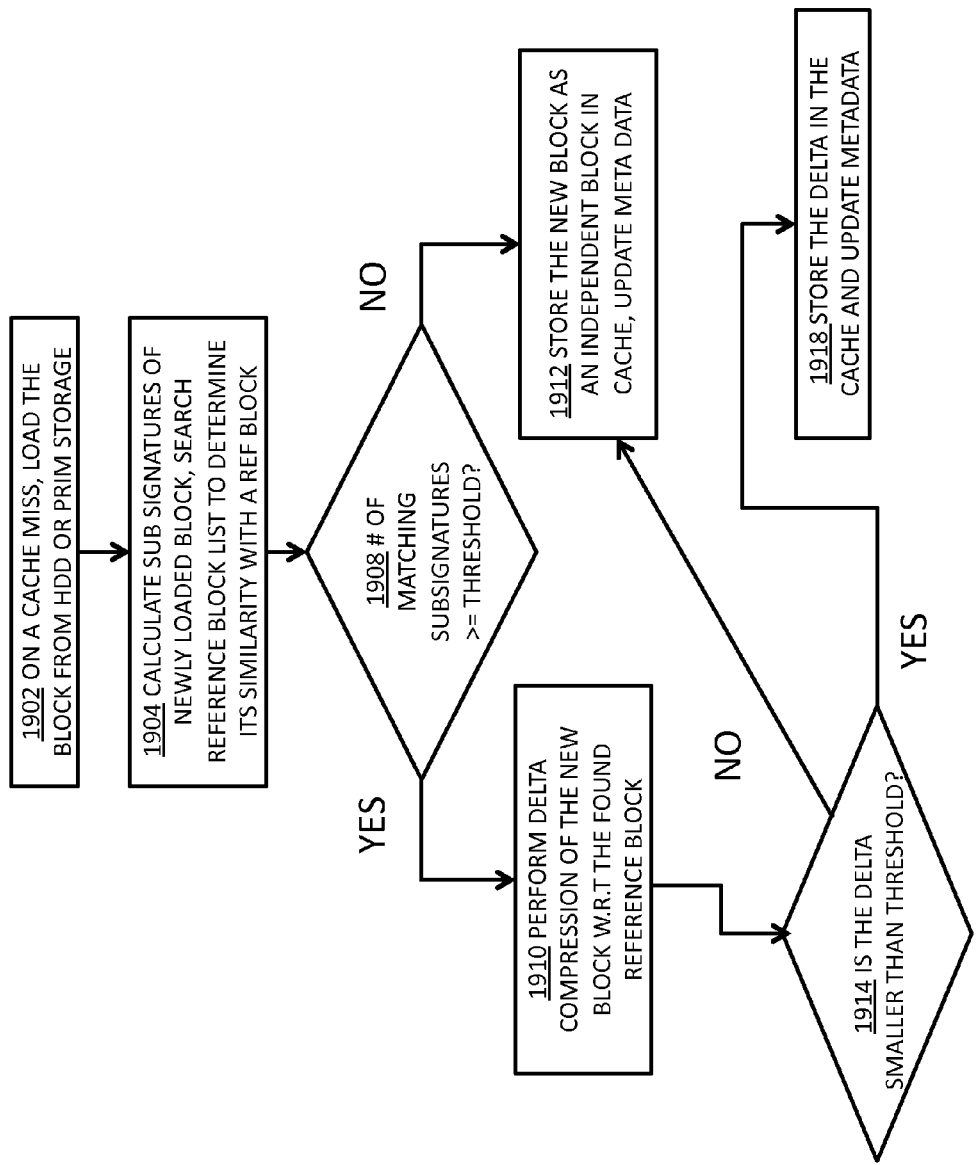
FIG. 19 depicts a high-level logic flowchart showing a process of delta compression on a cache miss.

Referring to FIG. 19, a flowchart is depicted of cache management actions that may be taken upon a new access to a data block not currently known to the cache management system (e.g. resulting from a cache miss). The flow starts by loading the data block indicated by a cache miss from primary storage (e.g. mass storage, SAN, and the like) at step 1902. The flow proceeds to step 1904 where sub-signatures of the newly loaded data block are calculated. The sub-signatures are used in a search of the currently known reference blocks to look for reference blocks that include sub-signatures that match those generated in this step. The number of matching sub-signatures is compared to a delta-compression similarity threshold in step 1908. If the number of matching sub-signatures exceeds the similarity threshold, a candidate reference block is identified and flow proceeds to step 1910. If the number of matching sub-signatures does not exceed the similarity threshold, flow proceeds to step 1912.

In step 1910, delta compression techniques, such as those described herein may be used to perform delta compression of the newly loaded block to determine the degree of similarity between the newly loaded block and the identified reference block. The degree of similarity is tested by comparing the size of the delta generated through delta-compression against a maximum difference threshold in step 1914. If the delta-compression result in a delta that is at least a small as a delta size threshold, the newly loaded block can be represented by a combination of the delta and a reference block so flow continues to step 1918 in which the derived delta is stored in the cache system memory and cache management meta-data is updated.

If the delta-compression derived difference is larger than the delta size threshold, then the block may be sufficiently different to warrant being maintained as an independent block and flow proceeds to step 1912. In step 1912, the newly loaded block is stored as an independent block (one that is not represented by a combination of deltas with respect to a reference block), and cache meta-data is updated.

Embodiments of the invention may attempt to store reference blocks in SSD that do not change frequently and that share similarities with many other data blocks. Guidelines for determining what data to store in SSD and how often to update SSD may be established. Such guidelines may tradeoff size, cost, available SSD memory, application factors, processor speed(s), and the like. An initial design guideline may allow storing the entire software stack including OS and application software as well as all active user data as base data (e.g. in the SSD or RAM). This may be quite feasible with today's large-volume and less expensive NAND flash memories coupled with the fact that only a small percentage of file system data are typically accessed over a week. Data blocks of the software stack and base data may be reference blocks in SSD. Run time changes to these reference blocks may be stored in compressed form in delta blocks in HDD. These changes include changes on file data, database tables, software changes, virtual machine images, and the like. Such changes may be incremental so they can be very effectively compacted in delta blocks. As changes keep occurring, incremental drift may get larger and larger. To maintain high efficiency, data stored in the SSD may be updated to avoid excessively large incremental drift. Each update may result in changes in SSD and HDD as well as associated metadata.

The next design decision may be the optimal block size of reference blocks and delta blocks. Using larger reference blocks may reduce meta-data overhead and may allow more deltas to be covered by one reference block. However, if the reference block size is too large, it places a burden on the GPU/CPU for computation and caching. Similarly, large delta blocks allow more deltas to be packed in and potentially high I/O efficiency because one disk operation generates more I/Os (note that each delta in a packed delta block represents one I/O block). On the other hand, it may be a challenge whether I/Os generated by the host can take full advantage of this large amount of deltas in one delta block as discussed previously.

Another trade-off may be whether to allow deltas packed in one delta block to refer to single reference block or multiple reference blocks in SSD. Using one reference block to match all the deltas in one delta block allows compression/decompression of all deltas in the delta block to be done with one SSD read. On the other hand, it may be preferable that the deltas compacted in one delta block belong to I/O blocks that may be accessed by the host in a short time frame (temporal locality) so that one HDD operation can satisfy more I/Os that may be in one batch. These I/O blocks in the batch may not necessarily be similar to exactly one reference block for compression purposes. As a result, multiple SSD reads may be necessary to decompress different deltas stored in one delta block. Fortunately, random read speed of SSD is so fast that it may be affordable to carry out reference block reads online.

Some embodiments of the invention have a DRAM buffer that temporarily stores I/O data blocks including reference blocks and delta blocks that may be accessed by host I/O requests. This DRAM may buffer four types of data blocks: compressed deltas, data blocks for read I/Os after decompression, reference blocks from SSD, and data blocks of write I/Os. There may be several interesting trade-offs in managing this DRAM buffer. The first interesting tradeoff may be whether compressed deltas are cached for memory efficiency, or whether decompressed data blocks are cached to facilitate high performance read I/Os. If compressed deltas are cached, the DRAM can store a large number of deltas corresponding to many I/O blocks. However, upon each read I/O, on-the-fly computation may be necessary to decompress the delta to its original block. If decompressed data blocks are cached, these blocks may be readily available to read I/Os but the number of blocks that can be cached is smaller than caching deltas.

The second interesting tradeoff may be the space allocation of the DRAM buffer to the four types of blocks. Caching large number of reference blocks can speed up the process of identifying a reference block, deriving deltas upon write I/Os, and decompressing a delta to its original data block. However, read speed of reference blocks in SSD may already be very high and hence the benefit of caching such reference blocks may be limited. Caching a large number of data blocks for write I/Os, on the other hand, helps with packing more deltas in one delta block but raise reliability issues. Static allocation of cache space to different types of data blocks may be simple but may not be able to achieve optimal cache utilization. Dynamic allocation, on the other hand, may utilize the cache more effectively but incurs more overhead.

The third interesting tradeoff may be fast write of deltas to SSD/primary storage versus delayed writes for packing large number of deltas in one delta block. For reliability purposes, it may be preferable to perform a write to SSD/primary storage as soon as possible whereas for performance purposes it may be preferable to pack as many deltas in one block as possible before executing an SSD/primary storage write operation.

The computation time of Rabin fingerprint hash values is measured for large data blocks on multi-core GPU/CPUs. This computation is helpful in identifying reference blocks in SSD. The times it takes to compute hash values of a data block with size of 4 KB to 32 KB may be in the range of a few to tens of microseconds. In embodiments of the invention three of the most time-consuming processing parts have been implemented on the GPU/CPU.

The first part is the signature generation that includes hashing calculations, sub-signature sampling, the Haar wavelet transform, and final selection of representative sub-signatures. As described previously, groups of consecutive bytes may be hashed to derive a distribution of sub-signatures. This operation can be done in parallel by calculating all the hash values at the same time using multi threads. Sampling and selection can be done using random sample, sorting based on histogram, or min wise independent selection.

The second part is the periodic Kmean computations to identify similarities among unrelated data blocks. Such similarity detection can be simplified as a problem of finding k centers in a set of points. The remaining points may be partitioned into k clusters so that the total within a cluster sum of squares (TWCSS) is minimized. Multiple threads may be able to calculate the TWCSS for all possible partitioning solutions at the same time. The results may be synchronized at the end of the execution, and the optimum clustering is a result. In the current prototype implementation, Kmean computation was invoked periodically to identify reference blocks to be stored in the cache.

The third part is delta compression and decompression. A ZDelta compression algorithm or LZO compression algorithm may be used; however optimization of delta codec is possible and may benefit from fine tuning.

In order to see whether embodiments of the invention may be practically feasible and provide anticipated performance benefits, a proof-of-concept prototype was developed using open source Kernel Virtual Machine (KVM). The prototype represents only a partial realization, using a software module, of the methods and systems described herein. The system is referred to as I-CASH (I-CASH is a short name Intelligently Coupled Array of SSD and HDD).

The functions that the prototype has implemented include identifying reference blocks in a virtual machine environment and using Kmean similarity detections periodically, deriving deltas using ZDelta algorithm for write IIOs, serving read IIOs by combining deltas with reference blocks, and managing interactions between SSD and HDD. The current prototype carries out the necessary computations using the host CPU and uses a part of system RAM as the DRAM buffer of the I-CASH. A GPU was not used for computation tasks in the prototype. It is believed that the performance evaluation using this preliminary prototype presents a conservative result.

In order to capture both block level I/O request information and virtual machine related information, the prototype module may be implemented in the virtual machine monitor. The I/O function of the KVM depends on QEMU that is able to emulate many virtual devices including virtual disk drive. The QEMU driver in a guest virtual machine captures disk I/O requests and passes them to the KVM kernel module. The KVM kernel module then forwards the requests to QEMU application and returns the results to the virtual machine after the requests are complete. The I/O requests captured by the QEMU driver are block-level requests of the guest virtual machine. Each of these requests contains the virtual disk address and data length. The corresponding virtual machine information may be maintained in the QEMU application part. The invention embodiment of the prototype may be implemented at the QEMU application level and may therefore be able to catch not only the virtual disk address and the length of an I/O request but also the information of which virtual machine generates this request.

The most significant byte of the 64-bit virtual disk address may be used as the identifier of the virtual machine so that the requests from different virtual machines can be managed in one queue. If two virtual machines are built based on the same OS and application, two I/O requests may be candidates for similarity detection if the lower 56 bits of their addresses are identical.

The software module maintains a queue of disk blocks that can be one of three types: reference blocks, delta blocks, and independent blocks. It dynamically manages these three types of data blocks stored in the SSD and HDD. When a block is selected as a reference, its data may be stored in the SSD and later changes to this block may be redirected to the delta storage consisting of the DRAM buffer and the HDD. In the current implementation, the DRAM is part of the system RAM with size being 32 MB. An independent block has no reference and contains data that can be stored either in the SSD or in the delta storage. To make an invention embodiment work more effectively, a threshold may be chosen for delta blocks such that delta derivation is not performed if the delta size exceeds the threshold value and hence the data is stored as independent block. The threshold length of delta determines the number of similar blocks that can be detected during similarity detection phase. Increasing the threshold may increase the number of detected similar blocks but may also result in large deltas limiting the number of deltas that can be compacted in a delta block. Based on experimental observations, 768 bytes are used as the threshold for the delta length in the prototype.

Similarity detection to identify reference blocks is done in two separate cases in the prototype implementation. The first case is when a block is first loaded into an invention embodiment's queue and the invention embodiment searches for the same virtual address among the existing blocks in the queue. The second case is periodical scanning after every 20,000 I/Os. At each scanning phase, the invention embodiment first builds a similarity matrix to describe the similarities between block pairs. The similarity matrix is processed by the Kmean algorithm to find a set of minimal deltas that are less than the threshold. One block of each such pair is selected as reference block. The association between newly found reference blocks and their respective delta blocks is reorganized at the end of each scanning phase.

A prototype may be installed on KVM of the Linux operating system running on a PC server that is a Dell PowerEdge T410 with 1.8 GHz Xeon CPU, 2 GB RAM, and 160 G SATA drive. This PC server acts as the primary server. An SSD drive (OCZ Z-Drive p84 PCI-Express 250 GB) is installed on the primary server. Another PC server, the secondary server, is Dell Precision 690 with 1.6 GHz Xeon CPU, 2 GB RAM and 400 G Seagate SATA drive. The secondary server is used as the workload generator for some of the benchmarks. The two servers are interconnected using a gigabit Ethernet switch. The operating system on both the primary server and the secondary server is Ubuntu 8.10. Multiple virtual machines using the same OS are built to execute a variety of benchmarks.

For performance comparison purpose, a baseline system is also installed on the primary PC server. The main difference between the base line system and a system implementing the methods and systems described herein is the way the SSD and HDD are managed. In the baseline system, the SSD is used as an LRU disk cache on top of the HDD. In a system implementing the methods and systems described herein, on the other hand, the SSD stores reference data blocks and HDD stores deltas as described previously.

Appropriate workloads may be important for performance evaluations. It should be noted that evaluating the performance of embodiments of the invention is unique in the sense that I/O address traces are not sufficient because deltas are content-dependent. That is, the workload should have data contents in addition to address traces. Because of this uniqueness, none of the available I/O traces is applicable to the performance evaluations. Therefore, seven standard I/O benchmarks that are available to the research community have been collected as shown in Table 1.

TABLE 1

Standard benchmarks used in performance evaluation of I-CASH.

| Abbreviation | Name | Description |
| --- | --- | --- |
| RU | RUBiS | e-Commerce web server workload |
| TP | TPC-C | Database server workload |
| SM | SPECmail2009 | Mail server workload |
| SB | SPECwebBank | Online banking |
| SE | SPECwebEcommerce | Online store selling computers |
| SS | SPECwebSupport | Vendor support website |
| SF | SPECsfs2008 | NFS file server |

The first benchmark, RUBiS, is a prototype that simulates an e-commerce server performing auction operations such as selling, browsing, and bidding similar to eBay. To run this benchmark, each virtual machine on the server has installed Apache, Mysql, PHP, and RUBiS client. The database is initialized using the sample database provided by RUBiS. Five virtual machines are generated to run RUBiS using the default settings of 240 clients and 15 minutes running time.

TPC-C is a benchmark modeling the operations of real-time transactions. It simulates the execution of a set of distributed and on-line transactions (OLTP) on a number of warehouses. These transactions perform the basic database operations such as inserts, deletes, updates and so on. Five virtual machines are created to run TPCC-UVA implementation on the Postgres database with 2 warehouses, 10 clients, and 60 minutes running time.

In addition to RUBiS and TPC-C, five data intensive SPEC benchmarks developed by the Standard Performance Evaluation Corporation (SPEC) have also been set up. SPECMail measures the ability of a system to act as an enterprise mail server using the Internet standard protocols SMTP and IMAP4. It uses folders and message MIME structures that include both traditional office documents and a variety of rich media contents for multiple users. Postfix was installed as the SMTP service, Dovecot as the IMAP service, and SPECmail2009 on 5 virtual machines. SPECmail2009 is configured to use 20 clients and 15 minutes running time. SPECweb2009 provides the capability of measuring both SSL and non-SSL request/response performance of a web server. Three different workloads are designed to better characterize the breadth of web server workload. The SPECwebBank is developed based on the real data collected from online banking web servers. In an experiment, one workload generator emulates the arrivals and activities of 20 clients to each virtual web server under test. Each virtual server is installed with Apache and PHP support. The secondary PC server works as a backend application and database server to communicate with each virtual server on the primary PC server. The SPECwebEcommerce simulates a web server that sells computer systems allowing end users to search, browse, customize, and purchase computer products. The SPECwebSupport simulates the workload of a vendor's support web site. Users are able to search for products, browse available products, filter a list of available downloads based upon certain criteria, and download files. Twenty clients are set up to test each virtual server for both SPECwebEcommerce and SPECwebSuppor for 15 minutes. The last SPEC benchmark, SPECsfs, is used to evaluate the performance of an NFS or CIFS file server. Typical file server workloads such as LOOKUP, READ, WRITE, CREATE, and REMOVE are simulated. The benchmark results summarize the server's capability in terms of the number of operations that can be processed per second and the I/O response time. Five virtual machines are setup and each virtual NFS server exports a directory to 10 clients to be tested for 10 minutes.

Using the preliminary prototype and the experimental settings, a set of experiments have been carried out running the benchmarks to measure the I/O performance of embodiments of the invention as compared to a baseline system. The first experiment is to evaluate speedups of embodiments of the invention compared to the baseline system. For this purpose, all the benchmarks were executed on both an embodiment of the invention and on the baseline system.

Figure 20:
FIG. 20 depicts a bar graph showing I/O speedup factors achieved by the data storage system of FIG. 12 in comparison with a baseline system using an SSD as an LRU disk cache on top of an HDD, with both systems running identical sets of standard benchmarks and using a 4 KB block size.

FIG. 20 shows the measured speedups for all seven benchmarks. From this figure, it is observed that for 5 out of 8 benchmarks the methods and systems described herein improve the overall I/O performance of the baseline system by a factor of 2 or more with the highest speedup being a factor of 4. In the experiment, 3 different SSD sizes were considered: 256 MB, 512 MB, and 1 GB. It is interesting to observe from this figure that the speedup does not show monotonic change with respect to SSD size. For some benchmarks, large SSD gives better speedups while for others large SSD gives lower speedups. This variation indicates a potential dependence on the dynamics of workloads and data content as discussed above.

While I/O performance generally increases with the increase of SSD cache size for the baseline system, the performance change of the tested embodiment of the invention depends on many other factors in addition to SSD size. For example, even though there is a large SSD to hold more reference blocks, the actual performance of the tested embodiment may fluctuate slightly depending on whether or not the system is able to derive a large amount of small deltas to pair with those reference blocks in the SSD, which is largely workload dependent. Nevertheless, the tested embodiment performs constantly better than the baseline system with performance improvement ranging from 50% to a factor of 4 as shown in FIG. 20.

The speedups shown in FIG. 20 are measured using 4 KB block size for reference blocks to be stored in the SSD. This block size is also the basic unit for delta derivations and delta packing to form delta blocks to be stored in the HDD. As discussed in the previous section, reference block size is a design parameter that affects delta computation and number of deltas packed in a delta block.

Figure 21:
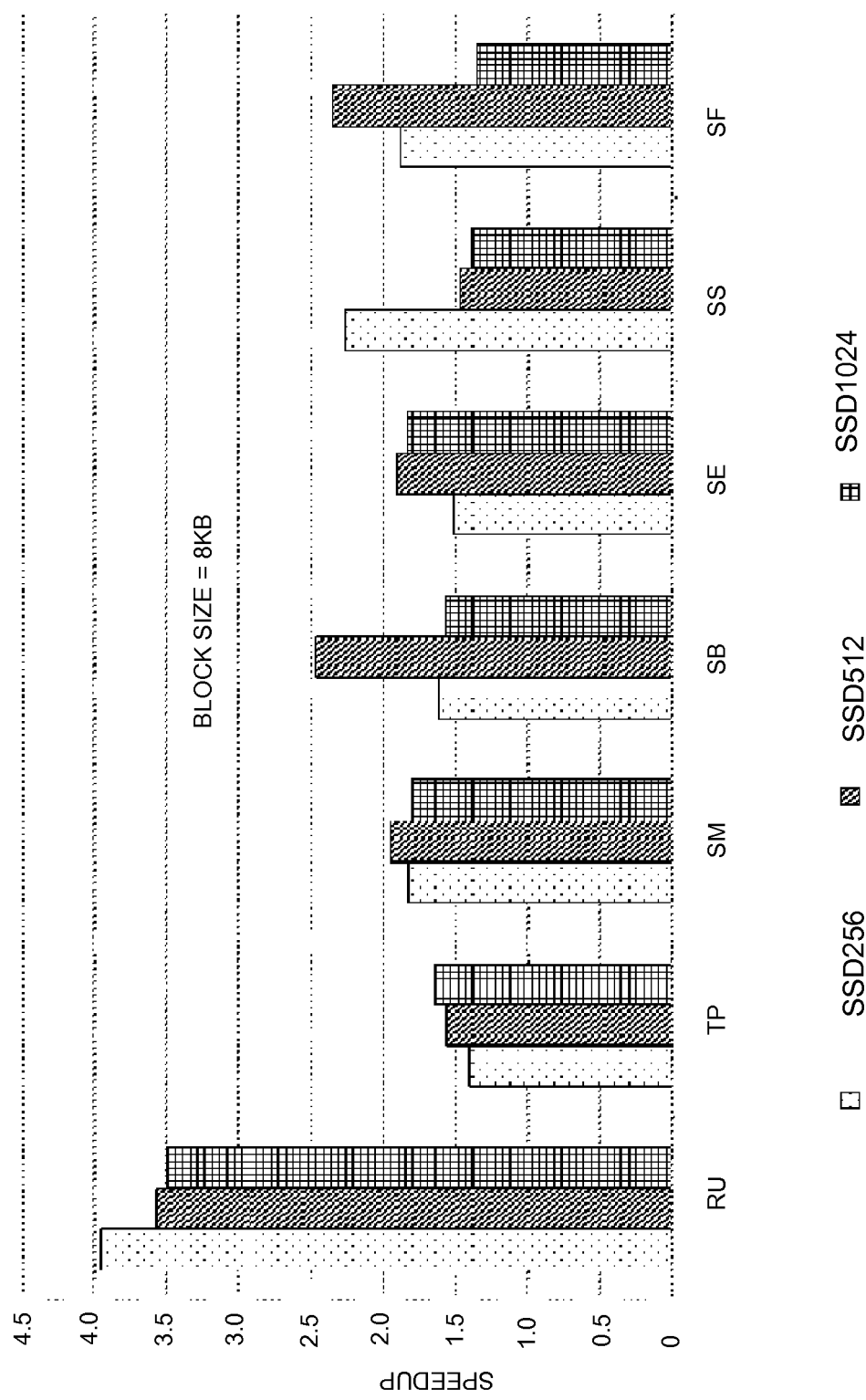
FIG. 21 depicts a bar graph showing I/O speedup factors achieved by the data storage system of FIG. 12 in comparison with a baseline system using an SSD as an LRU disk cache on top of an HDD, with both systems running identical sets of standard benchmarks and using an 8 KB block size.

FIG. 21 shows speedups measured using a similar experiment but with an 8 KB block size. Comparing FIG. 21 with FIG. 20, very small differences were noticed on overall speedup when an 8 KB block size is compared to a 4 KB block size. Intuitively, large block size should give better performance than small block size because of the large number of deltas that can be packed in a delta block stored in the HDD. On the other hand, large block size increases the computation cost for delta derivations. It is expected that the situation may change if a dedicated high speed GPU/CPU is used for such computations.

To isolate the effect of computation times, the total number of HDD operations of the tested embodiment and that of the baseline system were measured. The I/O reductions of the tested embodiment were then calculated as compared to the baseline by dividing the number of HDD operations of the baseline system by the number of HDD operations of the tested embodiment.

Figure 22:
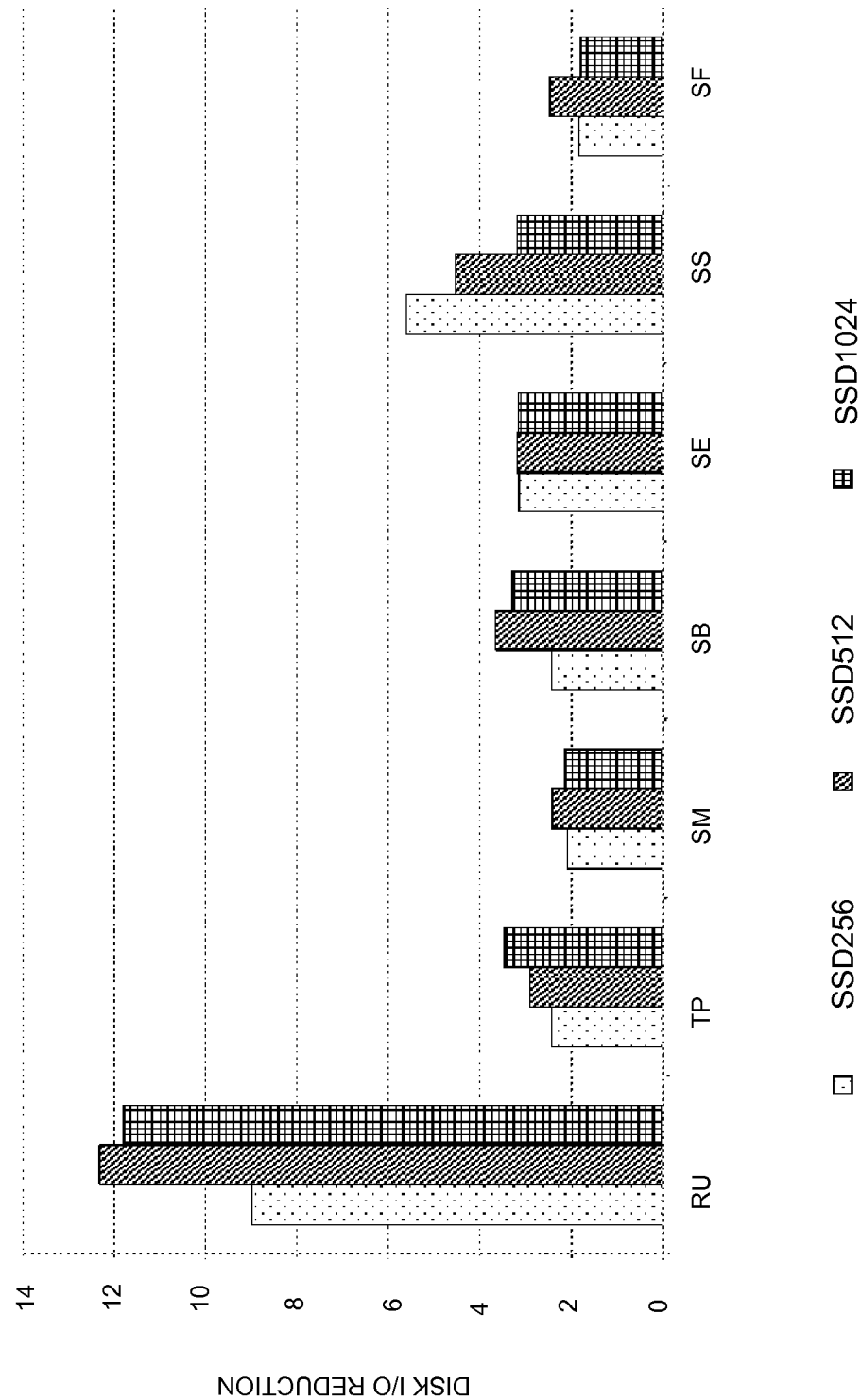
FIG. 22 depicts a bar graph showing HDD disk I/O reductions achieved by the data storage system of FIG. 12 in comparison with a baseline system using an SSD as an LRU disk cache on top of an HDD, with both systems running identical sets of standard benchmarks and using a 4 KB block size.
Figure 23:
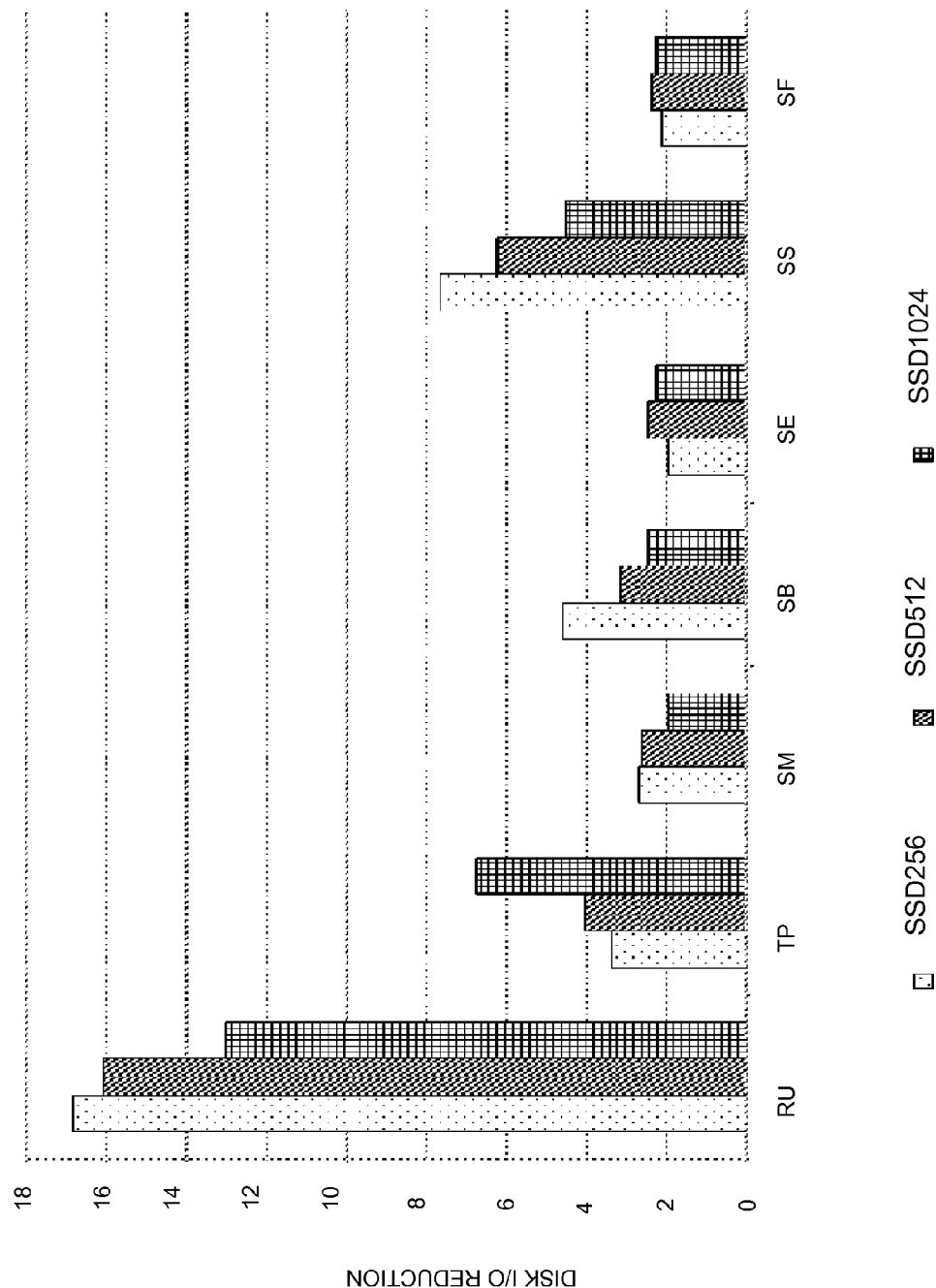
FIG. 23 depicts a bar graph showing HDD disk I/O reductions achieved by the data storage system of FIG. 12 in comparison with a baseline system using an SSD as an LRU disk cache on top of an HDD, with both systems running identical sets of standard benchmarks and using an 8 KB block size.

FIGS. 22 and 23 show the I/O reductions for all the benchmarks with block size being 4 KB and 8 KB, respectively. It may be deduced from these figures that the tested embodiment reduces the number of HDD operations to half at least for all benchmarks. This factor of two I/O reduction did not directly double performance in terms of overall I/O performance. This can be attributed to the computation overhead of the tested embodiment since the current prototype is implemented in software and consumes system resources for delta computations. This observation can be further evidenced by comparing FIG. 22 with FIG. 23 where the only difference is block size. With larger block size, the HDD disk I/O reduction is greater than smaller block size because more deltas may be packed in one delta block stored in the HDD. However, the overall performance differences between these two block sizes, as shown in FIGS. 20 and 15, are not as noticeable as I/O reductions.

From FIGS. 20 through 23 it is noticed that RUBiS benchmark performs the best on the tested embodiment for all cases. To understand why this benchmark shows such superb performance, the I/O traces of the benchmarks were analyzed. Analyzing the I/O traces unveiled that RUBiS benchmark has 90% of blocks that are repeatedly accessed for at least 2 times and 70% of blocks that are accessed for at least 3 times. This highly repetitive access pattern is not found in other 6 benchmarks. For example, 40% of blocks are accessed only once in the SPECmail benchmark run.

Because of time constraint, benchmark running time was limited in the experiments. It might have been that the repetitive access pattern may show after a sufficiently long running time since such behavior is observed in real world I/O traces such as SPC-1.

Figure 24:
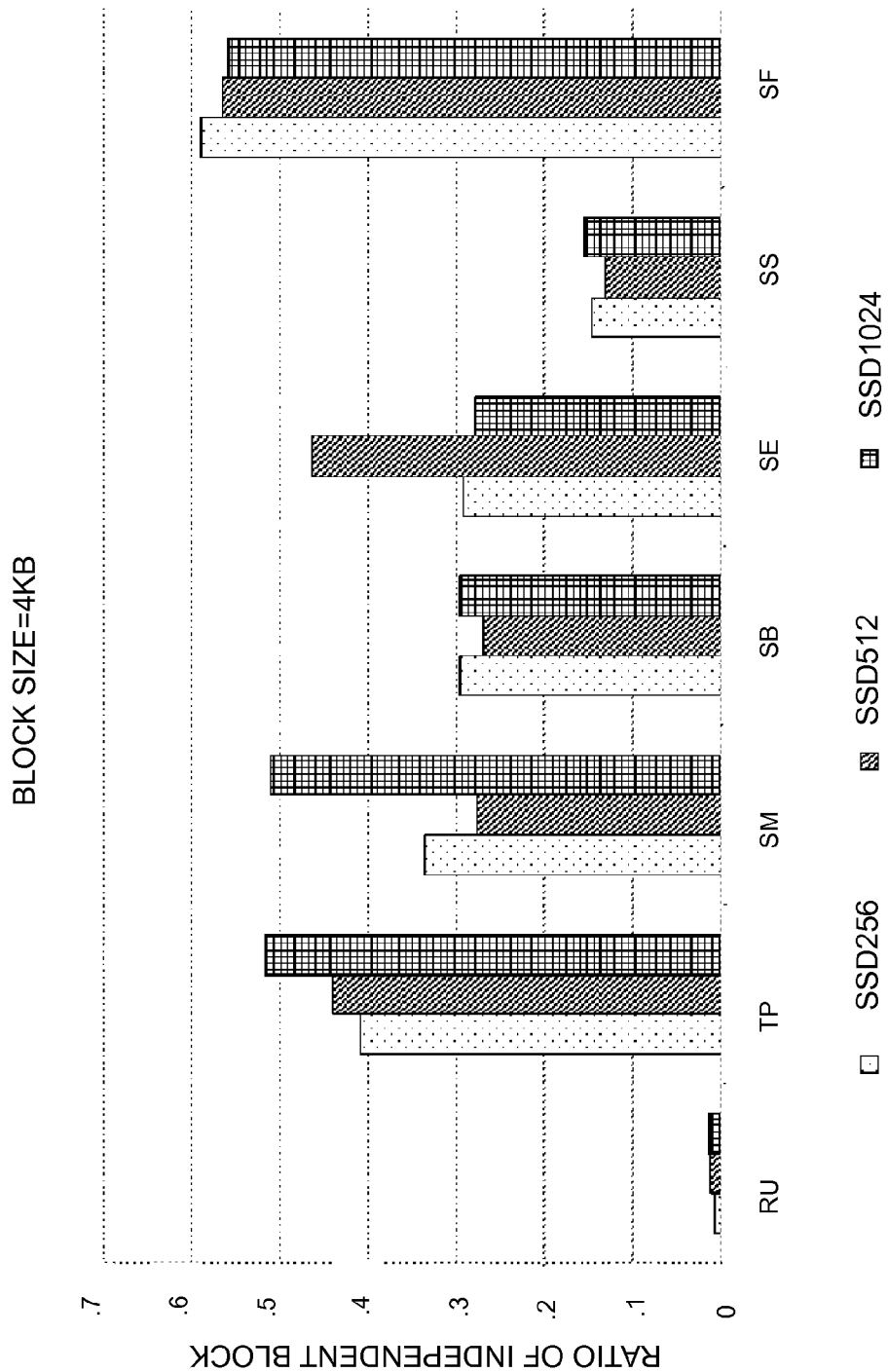
FIG. 24 depicts a bar graph showing estimated percentages of independent blocks stored by the system of FIG. 12 running a set of standard benchmarks and using a 4 KB block size.
Figure 25:
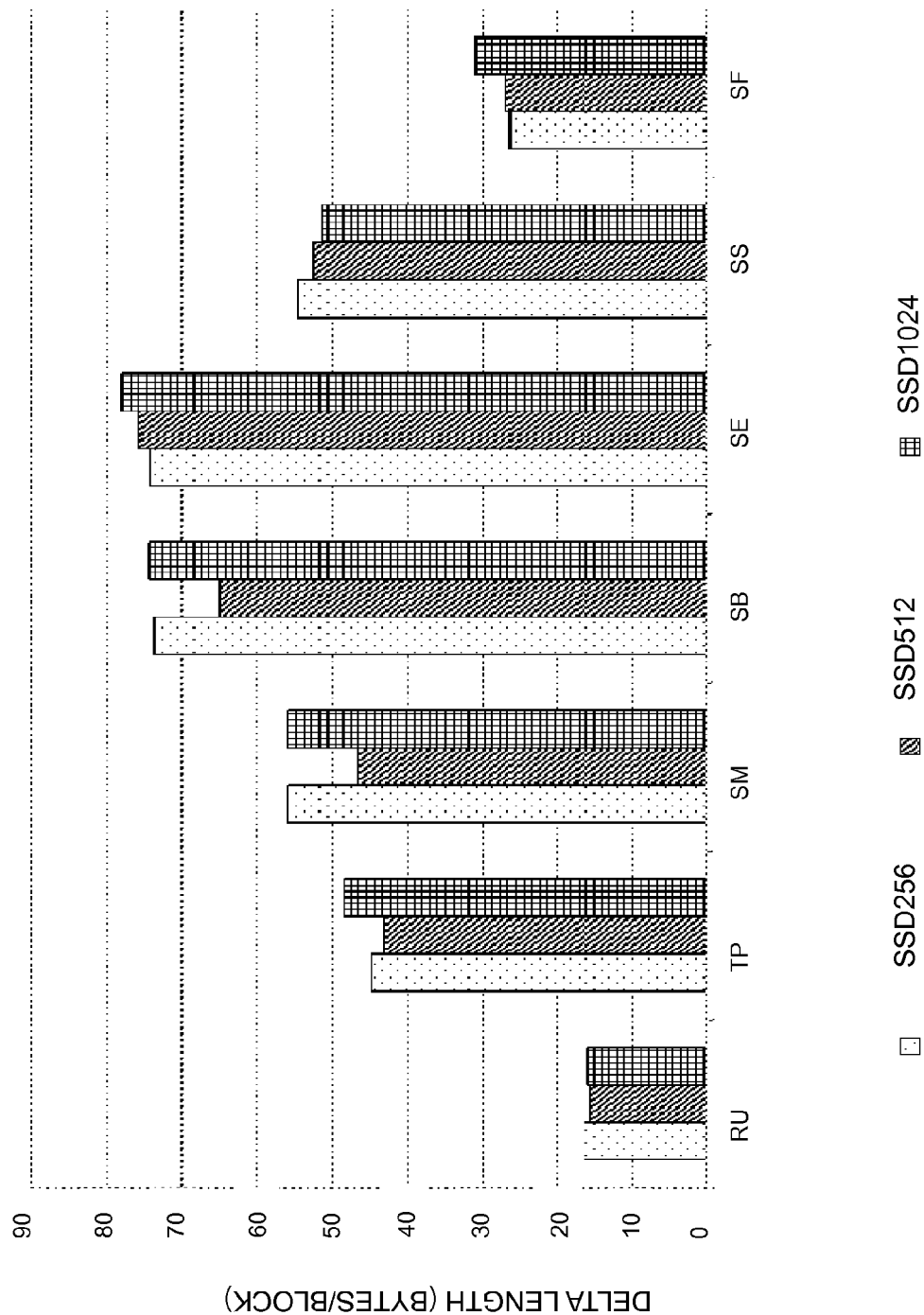
FIG. 25 depicts a bar graph showing average sizes of deltas stored by the system of FIG. 12 running a set of standard benchmarks and using a 4 KB block size.

Besides I/O access patterns that affect performance of the tested embodiment, another factor impacting that performance is the percentage of I/O blocks that can find their reference blocks in SSD and can be compressed to small deltas with respect to their corresponding reference blocks. FIG. 24 shows the percentage of independent blocks found in the experiments. Recall that independent blocks are the I/O blocks that are stored in the traditional way because the tested embodiment may not find related reference blocks that produce a delta smaller than the predefined threshold. From FIG. 24 it is observed that the tested embodiment is able to find over 50% of I/O blocks for delta compression except for SPECsfs. The average delta sizes of the delta compression are shown in FIG. 25 for all the benchmarks. Clearly, the smaller the delta, the better the tested embodiment performs. Consistent with the performance results shown in FIGS. 18 to 22, RUBiS benchmark has the largest percentage of blocks that can be compressed and the least delta size as shown in FIGS. 24 and 25. As a result, it shows the best I/O performance overall.

Figure 26:
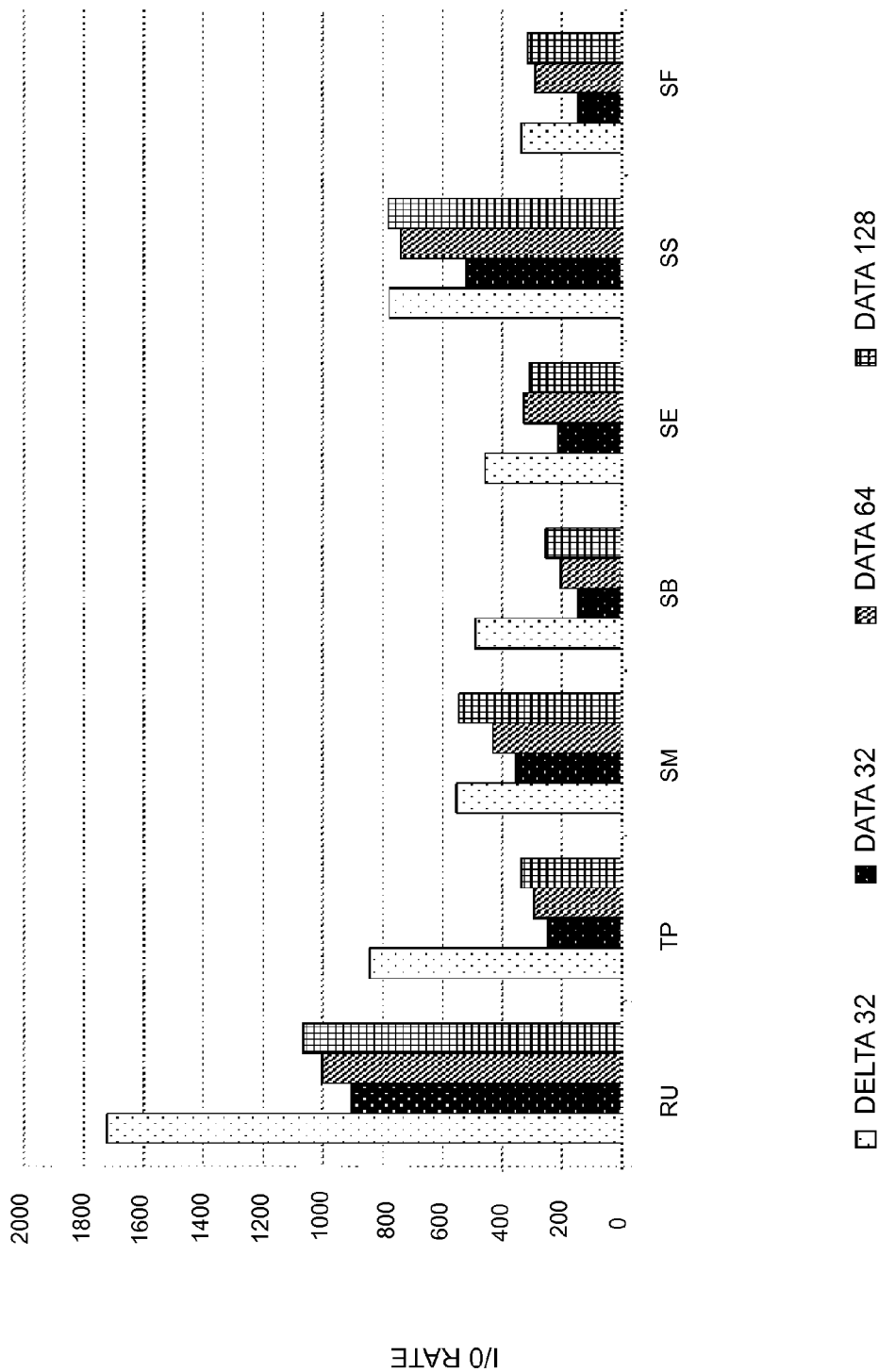
FIG. 26 depicts a bar graph showing a comparison of average RAM cache I/O rates of delta caching by the system of FIG. 12 and data block caching in a DRAM buffer.

The prototype of the tested embodiment uses a part of the system RAM (32 MB) as the DRAM buffer that was supposed to be on a hardware controller board. As discussed previously, there are tradeoffs in managing this DRAM buffer regarding what to cache in the buffer. To quantitatively evaluate the performance impacts of caching different types of data, the I/O rate of the benchmarks was measured by changing the cache contents. FIG. 26 shows the measured performance results for four different cases: 32 MB cache to store deltas, 32 MB cache to store data, 64 MB cache to store data, and 128 MB to store data. As shown in the figure, caching delta is always better than caching data themselves even though additional computations may be required. For the RUBiS benchmark which shows strong content locality, using 128 MB RAM to cache data performs worse than using 32 MB to cache deltas. This clearly shows the benefit of the tested embodiment.

Figure 27:
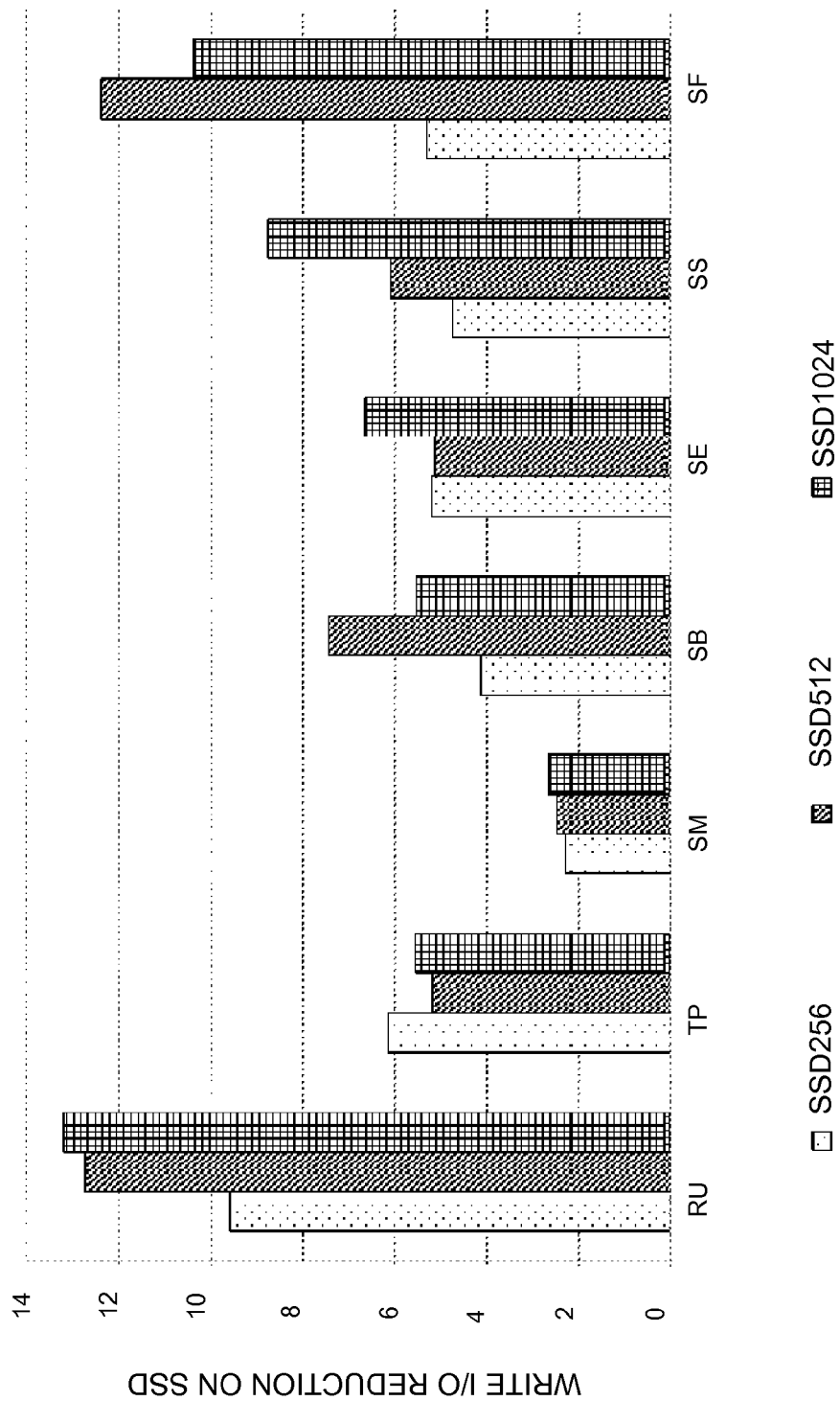
FIG. 27 depicts a bar graph showing run time write I/O reductions to an SSD.

Finally, the average write I/O reductions of the tested embodiment were compared to the baseline system. Recall that the preliminary prototype does not strictly disallow random writes to SSD as would have been done by a hardware implementation of the tested embodiment. Some independent blocks that do not have reference blocks with deltas smaller than the threshold value (768 byte in the current implementation) may be written directly to the SSD if there is space available. Nevertheless, random writes to SSD may still be substantially smaller than the baseline system. FIG. 27 shows the ratio of the number of SSD writes of the baseline system to the number of writes of the I-CASH. The write reduction ranges from a factor of two to an order of magnitude. Such write I/O reductions imply prolonged life time of the SSD as discussed previously.

A novel data storage architecture has been presented exploiting the two emerging semiconductor technologies, flash memory SSD and multi-core GPU/CPU. The idea of the new disk I/O architecture may be intelligently coupling an array of SSDs and HDDs in such a way that read I/Os are done mostly in SSD and write I/Os to SSD are minimized and done in batches by packing deltas derived with respect to the reference blocks.

By making use of the computing performance of modern GPUs/CPUs and exploiting regularity and content locality of I/O data blocks, certain preferred embodiments of the invention replace mechanical operations in HDDs with high speed computations. A preliminary prototype realizing partial functionality of the methods and systems described herein has been built on Linux OS to provide a proof-of-concept. Performance evaluation experiments using standard I/O intensive benchmarks have shown great performance potential with up to 4 times performance improvement over systems that use SSD as a storage cache. It is expected that embodiments of the invention may dramatically improve data storage performance with fine-tuned implementations and greatly prolong the life time of SSDs that are otherwise wearing quickly with random write operations.

Furthermore, the present methods and systems may exploit the ever increasing content locality found in a variety of primary storage systems to minimize disk I/O operations that are still a significant bottleneck in computer system performance. A new cache replacement algorithm called Least Popularly Used (LPU) may dynamically identify the reference blocks that may not only have the most access frequency and recency but also may contain information that may be shared or resembled by other blocks being accessed. The LPU algorithms may also leverage the methods and systems described herein of caching reference blocks and small deltas to effectively service most disk I/O operations by combining a reference block 402 with the corresponding delta inside the cache as opposed to going to the slow primary storage (e.g. a hard disk). The new cache replacement algorithm (LPU) may also be based on the statistical analysis of frequency spectrum of both I/O addresses (e.g. LBAs) and I/O content. Applying a LPU algorithm may also increase a hit ratio of CPU-direct buffer caches greatly for a given cache size through application of content locality considerations in the buffer cache management algorithm. Therefore, embodiments of an LPU algorithm may significantly improve diverse primary storage architectures (RAID, SAN, virtualized storage, and the like) by combining LPU techniques with the various RAM/SSD/HHD cache embodiments described herein. In addition, applying aspects of LPU algorithms to buffer cache management may significantly improve hit ratios without changing or expanding buffer cache memory or hardware.

In order to allow any of the caches described herein and elsewhere to take advantage of data access frequency, recency, and information content characteristics, both access behavior and content signatures of data blocks being cached may be determined and tracked. For example, each cache block may be divided into S logical sub-blocks. A sub-signature may be calculated for each of the S sub-blocks. A two dimensional array of sub-signature related data, called a Heatmap, may be maintained in an embodiment of an LPU algorithm. The Heatmap may enable determining popularity of the cached data based on aspects of locality (e.g. content locality, temporal locality, and the like).

Figure 28:
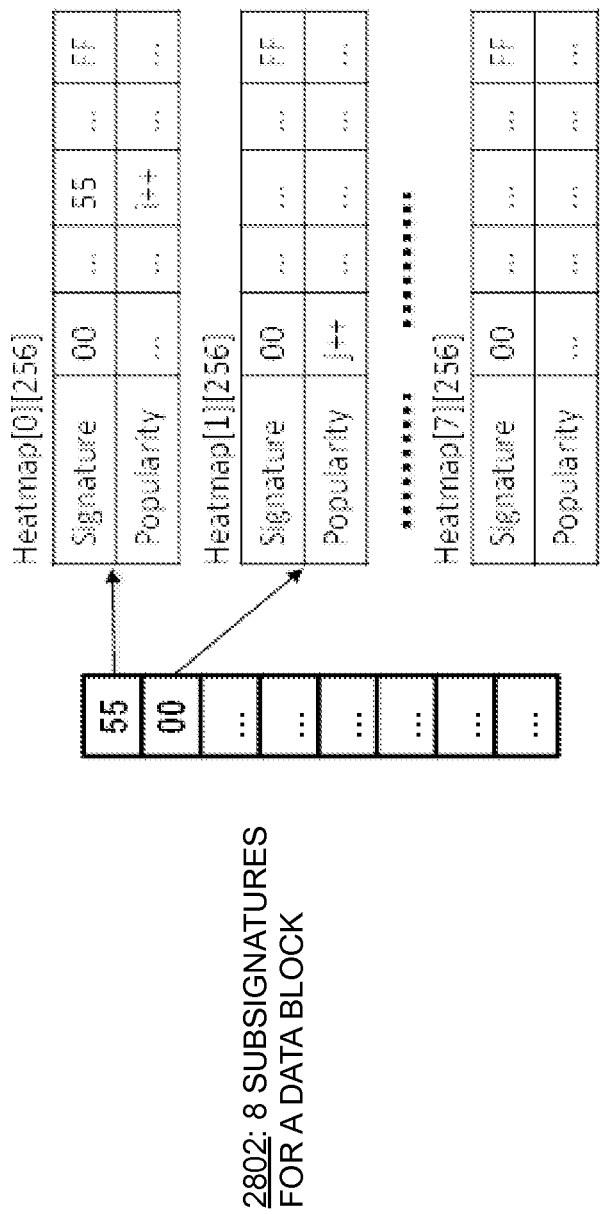
FIG. 28 depicts sub-block signatures and heatmap concepts.

FIG. 28 illustrates sub-block signatures and a Heatmap. The Heatmap of FIG. 28 has S rows and Vs columns, where Vs is the total number of possible signature values for a sub-block. For example, if the sub-signature is 8 bits, Vs=256. Each entry in the Heatmap keeps a popularity value that may be defined as the number of accesses of the sub-block matching the corresponding signature value. In this example, each data block 2802 is divided into 8 sub-blocks and 8 corresponding signature values are created. In this example, sub-signatures 55 and 0 are shown. When a data block is accessed that contains a sub-signature of 55 for its first logical sub block, the popularity value corresponding to column number 55 of the 1st row is incremented. Similarly, if a second sub block sub-signature of a data block is 0, then column number 0 of second row is also incremented. In this way, a Heatmap may keep popularity values of all sub-signatures of sub-blocks.

An alternate embodiment of a Heatmap may be organized as a two dimensional array that has columns that correspond to the number of possible signature values and rows that correspond to a number of times that each possible signature value has been accessed during a predetermined period of time.

To illustrate how a Heatmap may be organized and maintained as I/O requests are issued, consider an example where each cache block is divided into two sub-blocks and each sub-signature has only four possible values, i.e. Vs=4. The Heatmap of this example is shown in Table 2 below for a sequence of I/O requests accessing data blocks at addresses LBA1, LBA2, LBA3, and LBA4, respectively. In this example, all of the possible contents of sub-blocks are depicted as A, B, C, and D and the corresponding signature for each sub-block is a, b, c, and d respectively. A two dimensional embodiment of a Heatmap in this case contains two rows corresponding to two sub-blocks of each data block and four columns corresponding to the four possible signature values. As shown in Table 2, all entries of the Heatmap are initialized to {(0, 0, 0, 0), (0, 0, 0, 0)}. Whenever a data block is accessed, the popularities of corresponding sub-signatures in the Heatmap are incremented. For instance, the first block has logical block address (LBA) of LBA1 with content (A, B) and corresponding signatures (a, b) for two sub-blocks. As a result of the I/O request, two popularity values in the Heatmap are incremented corresponding to the two sub-signatures, and the Heatmap becomes {(1, 0, 0, 0), (0, 1, 0, 0)} as shown in Table 2. After 4 requests of various data blocks, the Heatmap becomes {(2, 1, 1, 0), (0, 1, 0, 3)} based on the accumulation of sub-signature occurrences.

TABLE 2

The buildup of a Heatmap.

| I/O sequence | Content | Signature | Heatmap[0]<br>a b c d | Heatmap[1]<br>a b c d |
|---|---|---|---|---|
| | | Initialized | 0 0 0 0 | 0 0 0 0 |
| LBA1 | A B | a b | 1 0 0 0 | 0 1 0 0 |
| LBA2 | C D | c d | 1 0 1 0 | 0 1 0 1 |
| LBA3 | A D | a d | 2 0 1 0 | 0 1 0 2 |
| LBA4 | B D | b d | 2 1 1 0 | 0 1 0 3 |

Each block has 2 sub-blocks represented by 2 sub-signatures each having 4 possible values Vs = 4.

The computation overhead to generate and maintain a Heatmap may be substantially reduced over other data similarity counting techniques. Also, although Hashing may be a computation efficient technique to detect identical blocks, it may also lower the chance of finding similarity because a single byte change results in a totally different hash value. Therefore, hashing by itself may not help in finding more similarities. On the other hand, an LPU algorithm may calculate the secure hash value (e.g. SHA-1) of a data block to determine if a block is identical to another.

In an alternate example of a two-dimensional Heatmap, taking a set of 4 KB blocks divided into 512B sub-blocks with 8 bits sub-signature for each sub-block, a Heatmap with 8 rows corresponding to 8 sub-blocks (4K divided by 512) and 256 columns corresponding to all of the possible 8-bit signatures for a sub-block may be used. Each time a block is read or written, its 8 one-byte sub-signatures may be retrieved and the 8 values of corresponding entries in the Heatmap (also known as popularity values) may be increased by one. Use of these frequency spectrum aspects of content may differentiate LPU algorithms from conventional caching algorithms. As noted above, embodiments of an LPU algorithm may capture both the temporal locality and the content locality of data being accessed by a host processor. If a block of the same address is accessed twice, the increase of corresponding popularity value in the Heatmap reflects the temporal locality. On the other hand, if two similar blocks with different addresses are each accessed once, the Heatmap can catch the content locality of these two blocks since the popularity values of matching sub-signatures are incremented in the Heatmap. In this way, popularity may be determined based on frequency and recency of a signature associated with active I/O operations. In an example, if a signature is shared by many active I/O blocks, then the signature is popular. Block popularity may be based on block and sub-block signature popularity. A block that contains many popular signatures may be classified as reference block and therefore may be cached and used with the various delta generation and caching techniques described herein. Because many other active I/O blocks share content with this reference block, the net result is a higher cache hit ratio and more efficient delta compression with respect to many other associated blocks that share such popular sub-signatures.

In order to capture the dynamic nature of content locality at runtime, LPU algorithms enable scanning cached blocks after a programmable number of I/O requests. This number of I/O requests defines a scanning window. At the end of each scanning window, an LPU algorithm examines the popularity values in the Heatmap and chooses the most popular blocks as reference blocks. An objective of selecting a reference block is to identify a cached data block that may contain the most frequently accessed sub-blocks so that many frequently accessed blocks share content with it. The reference block may be selected such that the number of remaining blocks that have small differences (deltas) from the reference block may be maximized. In this way, more I/O requests may be served by combining the reference block with small deltas. Once a Heatmap has been examined at the end of the scanning window, the Heatmap values may be reset to enable variations of popularity over time to influence the LPU algorithm and determination of reference blocks in the cache.

Table 4 shows the calculation of popularity values and the cache space consumption using different choices of a reference block for the example of Table 2. The popularity value of a data block may be the sum of all its sub-block popularity values in the Heatmap. As shown in Table 3 below, the most popular block is the data block at address LBA3 with content (A, D). Its popularity value is 5. Therefore, block (A, D) may be chosen as the reference block. Once the reference block is selected, our LPU algorithm uses delta-coding to eliminate data redundancy. The result shows that using the most popular block (A, D) as the reference, cache space usage is minimum—about 2.5 cache blocks assuming near-perfect delta encoding. Without considering content locality, a conventional Least Recently Used caching algorithm would need 4 cache blocks to keep the same hit ratio. The space saved by applying an LPU algorithm may be used to cache even more data.

TABLE 3

Selection of a reference block. The popularities of all blocks are calculated according to the Heatmap of Table3.

| | | | | Reference | | | |
|---|---|---|---|---|---|---|---|
| LBAs | Block | Popularity | LRU | A B | C D | A D | B D |
| LBA1 | A B | 2 + 1 = 3 | A B | A B | A B | _ B | A B |
| LBA2 | C D | 1 + 3 = 4 | C D | C D | C D | C _ | C _ |
| LBA3 | A D | 2 + 3 = 5 | A D | _ D | A _ | A D | A _ |
| LBA4 | B D | 1 + 3 = 4 | B D | B D | B _ | B _ | B D |
| | | Cache space | 4 | 3.5 | 3 | 2.5 | 3 |

Figure 29:
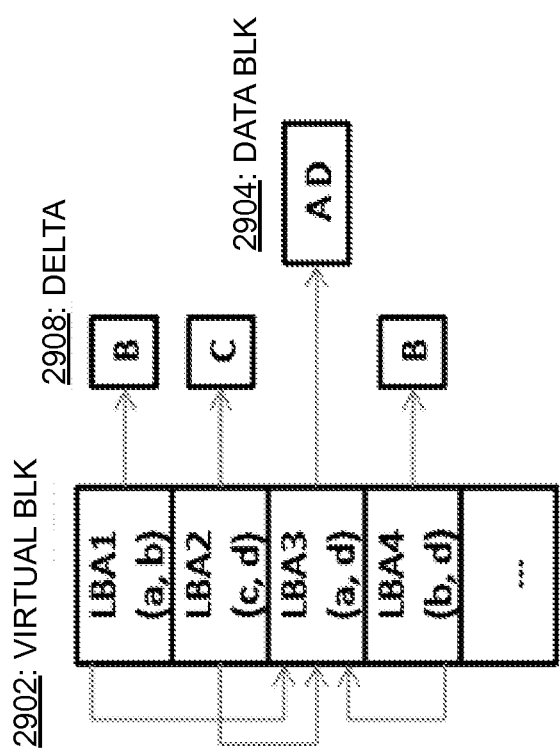
FIG. 29 depicts and exemplary data layout based on a selected reference block.

FIG. 29 shows the cache data content after selecting block (A, D) as the reference block. The LPU method facilitates dividing a cache into three parts as shown in FIG. 29: a virtual block list 2902, data blocks 2904, and delta blocks 2908. The virtual block list 2902, referred to as an LPU queue, may store all the information of cached disk blocks with each entry referencing and/or containing meta data, such as the address, the signature, the pointer to the reference block, the type of block (reference, delta, independent) and the pointer to delta blocks for the corresponding cached data block. However, the LPU queue may be configured to store pointers to virtual blocks rather than include the virtual block data, thereby allowing a large number of virtual blocks to be managed similarly to an LRU queue. The data pointer of a virtual block may be NULL if the disk block represented by this virtual block has been evicted. The delta blocks 2908 may be managed in 64-byte chunks. A virtual block list entry may reference one or more delta blocks because incremental changes may have been made to the data addressed by the virtual block LBAx. As long as a virtual block list entry references sufficient delta blocks, a virtual block list entry may be retained in the list even if its data block is evicted. Alternatively, as long as there is sufficient room in the delta block 2908 part of the cache, a virtual block list entry may continue to be used to reference delta blocks even if the data block associated with the virtual block list entry has been evicted from the cache because the data block can be constructed from the various referenced delta blocks and a corresponding reference block.

A virtual block list, VBL for short, may be used with an LPU algorithm for read and for write requests. Generally upon either a read or write request, the LBA is looked up in the VBL. If it is found, then the type of block is determined from meta data in the corresponding VBL entry. Subsequent actions are generally based on the type of block and the type of request (read or write).

Figure 30:
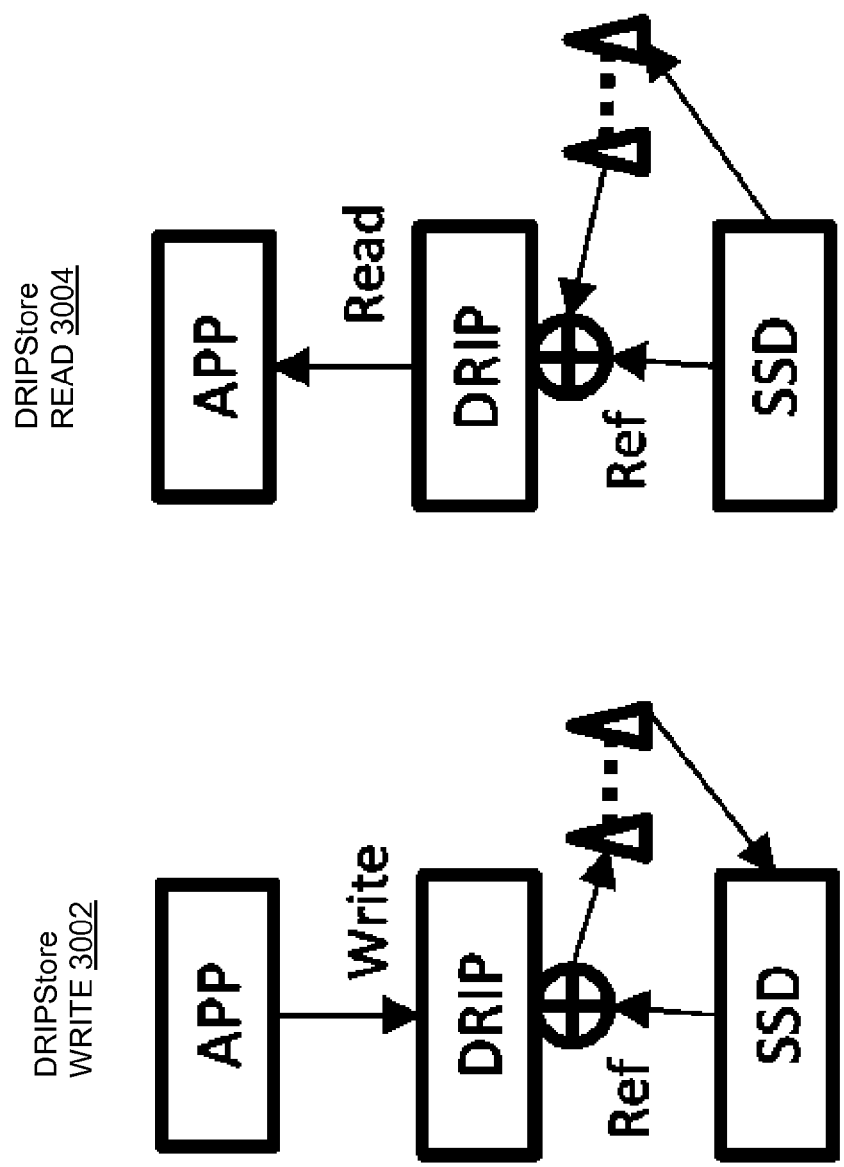
FIG. 30 depicts a read process and a write process for exploiting content locality to optimize SSD storage design.

For a read operation, the following actions are available:
Type=Independent—retrieve the data based on the LBA pointer in the VBL
VBLType=Unmodified Reference—retrieve the data based on the LBA pointer in the VBL
Type=Delta or Reference that has been modified—retrieve the delta and the reference block and generate the requested data For a write operation, the following actions are available
Type=Independent—generate a delta and update meta data in the VBL entry that indicates this is a changed block with a delta
VBLType=Reference—generate a delta and update meta data in the VBL entry that indicates this is a changed reference block with a delta
Type=Delta—generate a new delta and update meta data in the VBL entry or change the type to Independent if the delta is too large In the embodiment of FIG. 30, cached pages may be classified into three different categories, Delta, Reference, and Independent pages. When these three categories are targeted for SSD Storage a technique called DRIPStore may enable making best use of high read performance of an SSD while also minimizing SSD write operations. Referring to FIG. 30, a pair of block diagrams showing a read and write process associated with a DRIPStore technique as described herein (that may also exploit content locality in optimizing SSD storage design). A reference page category for DRIPStore may be defined as described elsewhere herein and/or may comprise the pages that are popular at least because the differences of their content to many other pages can be described by generally small deltas. A delta page category for DRIPStore may be defined as a compacted block of many small deltas and as described elsewhere herein. An independent page category for DRIPStore may comprise the remaining pages that may not share enough similarity with reference pages. Such pages may be called independent pages. A DRIPStore approach may treat pages categorized as Reference pages as read-only which is suitable for storage in RAM and SSD. A DRIPStore approach may also attempt to minimize writes to the SSD by writing only compacted delta pages to SSD or to another portion of cache memory, rather than writing individual deltas to SSD. Each compacted delta page may hold a log or other description of many deltas. Because of potentially strong content access regularity and/or content locality that may exist in data blocks, a compacted or packed delta page may contain metadata describing a potentially large number of small deltas with respect to reference pages, thereby reducing write operations in the SSD greatly. Embodiments of a DRIPStore method may perform similarity detection, delta derivations upon I/O writes, combining delta with reference pages upon I/O reads, and other necessary functions for interfacing the storage to the host OS.

A delta that may be stored in a delta page may be derived at run time representing the difference between the data page of an active I/O operation and its corresponding reference page stored in the RAM or SSD 304. Referring now to DRIPStore write flow 3002 of FIG. 30, upon an I/O write, a DRIPStore process may identify a reference page in the SSD 304 that corresponds to the desired I/O write page and may compute the delta with respect to the reference page. Similarly in a DRIPSTORE read flow 3004, upon an I/O read, the data block that corresponds to the desired I/O read page may be returned by combining a delta for the I/O read page with its corresponding reference page. Since deltas may be small due to data I/O regularity and content locality, the deltas may be stored in a compact form and consolidated in to a packed delta page so that one write to the SSD 304 may satisfy tens or even hundreds of desired write I/Os. A goal of applying DRIPStore may be to convert the majority of primary storage write I/Os to I/O operations involving mainly SSD 304 reads and delta computations. Therefore, DRIPStore may take full advantage of the SSD 304's fast read performance and may avoid its poor erase/write performance. Further, at least partly because of 1) high speed read performance of reference pages stored in the RAM and the SSD 304, 2) a potentially large number of small deltas packed in one delta page, and 3) high performance CPUs/GPUs, embodiments of DRIPStore may be expected to improve SSD I/O performance greatly.

A component of the DRIPStore design may be to identify reference pages. In order to identify reference pages quickly, reference pages may further be divided into at least two different categories. The first reference page category may contain reference pages that may have exactly the same LBAs as deltas. An example of a reference page in this first category is a data block that has been modified since it was designated as a reference block; therefore while the reference block may still be useful to the caching system, the physical data to be stored in primary storage requires this reference page to be combined with a delta page. The second category may consist of data blocks that may be newly generated and may have LBAs that do not match any one of the reference pages stored in the SSD 304.

To facilitate similarity detection of blocks and/or reference blocks, for each data block, the DRIPStore process may compute block sub-signatures. Generally, a one byte or a few bytes signature may be computed from several sequential bytes of data in the data block 408. Two pages may be considered similar if they share a minimum number of sub-signatures. However, content similarity between two data blocks may be an in-position match or an out-of-position match which may be caused by content shifting (e.g. inserting a word at the beginning of a block shifts all remaining bytes down by the word). To efficiently handle both in-position matches and out-of-position matches, a DRIPStore process may use a combination of sub-signatures (e.g. such as those described elsewhere herein) and a histogram of a data page/block. Hash values for every k consecutive bytes of a page may be computed to produce 1-byte or a few bytes sub-signatures. Considering a conventional byte size of eight bits, there are 256 possible values for each sub-signature if the sub-signature size is 1-byte. A histogram of all 1-byte hash values in a data page may be summarized into 256 bars corresponding to these possible values of sub-signatures. If sub-signatures include more or less than eight bits, the number of possible values of reach sub-signature may be greater or fewer than 256. From this histogram, one may determine the frequency of occurrences of each sub-signature value in the block. Subsequently, the most frequently occurring sub-signatures may be used to find matches with the most frequent sub-signatures of other pages. The total number of occurrences of each sub-signature in the histogram may be accumulated across all blocks considered, resulting in a list of the degrees of sharing of each sub-signature among all the blocks considered. These degrees of sharing may be used as weights to compute a final popularity value. The block or blocks with the largest popularity value(s) may be selected as one or more reference pages.

Figure 31:
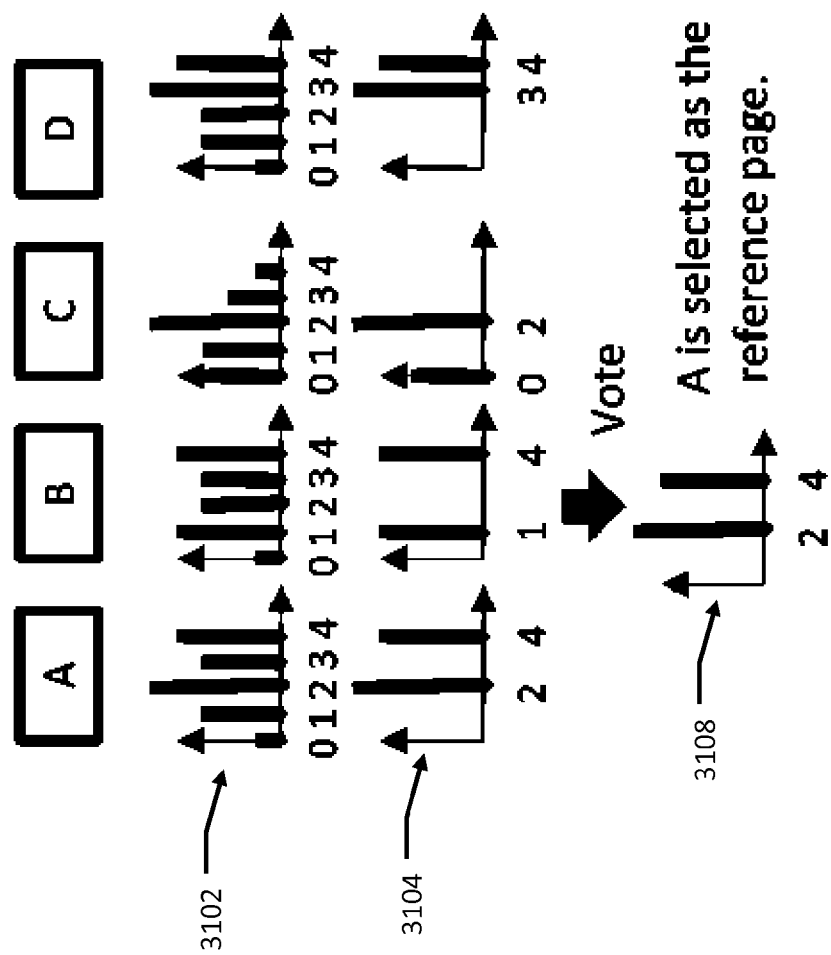
FIG. 31 depicts a reference page selection process.

Referring to FIG. 31, a reference page selection process is illustrated. In order to see how the similarity detection algorithm works, consider the following example. Four blocks may be considered to determine which one should be the reference page. Further, for simplicity of explanation, each sub-signature may be any one of 5 different values: 0, 1, 2, 3, and 4. After computing all sub-signatures in each of the 4 blocks, A, B, C, and D, a block histogram 3102 may be derived for each block A, B, C, and D, respectively. Note that there are only 5 bars in each histogram corresponding to the five possible signature values, 0, 1, 2, 3, and 4, respectively. In data block A, the most frequent sub-signature is 2 and the second most frequent is 4. Similarly, the two most frequent sub-signatures in block B are 1 and 4. From these four block histograms 3102, the two most frequent sub-signatures for each data block may be picked to create a block histogram subset 3104. It may be easily seen from the block histogram subset 3104 that among the 4 data blocks, sub-signature 4 appears three times (degree of sharing is 3), sub-signature 2 appears two times (degree of sharing is 2), and sub-signature 0, 1, and 3 appear one time each (degree of sharing is 1). After deriving these degrees of sharing, popularity of each block may be computed by accumulating the degrees of sharing matching each of the sub-signatures in the block diagram subset 3104. In this example, the popularity of block A is 2+3=5 because the degree of sharing of sub-signature 2 is 2 and the degree of sharing of sub-signature 4 is 3. Both signatures 2 and 4 appeared in the block histogram subset 3104 for block A. Similarly, the popularity of block B is 1+3=4, the popularity of block C is 1+2=3, and the popularity of block D is 1+3=4. Block A has the highest popularity value which is 5 and therefore is selected as the reference page depicted in 3108. Blocks B, C, and D all share some sub-signatures with block A, implying that A is resembled by all other three blocks and these three blocks may be compressed with delta coding using block A as the reference data.

An exemplary implementation of DRIPStore may compute 1-byte sub-signatures of every 3 consecutive bytes in a data block, i.e. k=3. It may then select the 8 most frequent sub-signatures for signature matching, i.e. f=8. In an example, for a 4 KB block, the DRIPStore process may first calculate the hash values of all 3 consecutive bytes to obtain 4K−2 sub-signatures. If the number of matches between a block and the reference exceeds 6, this block may be associated with the reference. Based on experimental observations, this sub-signature with position mechanism may recognize not only shifting of content but also shuffling of contents.

The data blocks to be examined for similarity detection may be determined based on performance and overhead considerations. Content locality may exist in a storage system both statically and dynamically and the data redundancy may be found in one of two ways. First, a scanning thread may be used to scan the storage device periodically. A static scan may be easy to implement since data may be fixed and the scan may achieve a good compression ratio by searching for the best reference blocks. However, a static scan may read data from different storage devices and the similar blocks found may not necessarily have tight correlation other than content similarity. The DRIPStore algorithm may take a second approach which may identify similar blocks online from the data blocks already loaded in a cache. For a write I/O, a corresponding reference block for delta compression may be found. If the write I/O were a new write with no prior reference block, a new reference block may be identified for that write I/O. For a read I/O, as soon as the delta corresponding to the read I/O may be loaded, a reference block may be found to decompress to the original data block.

Figure 32:
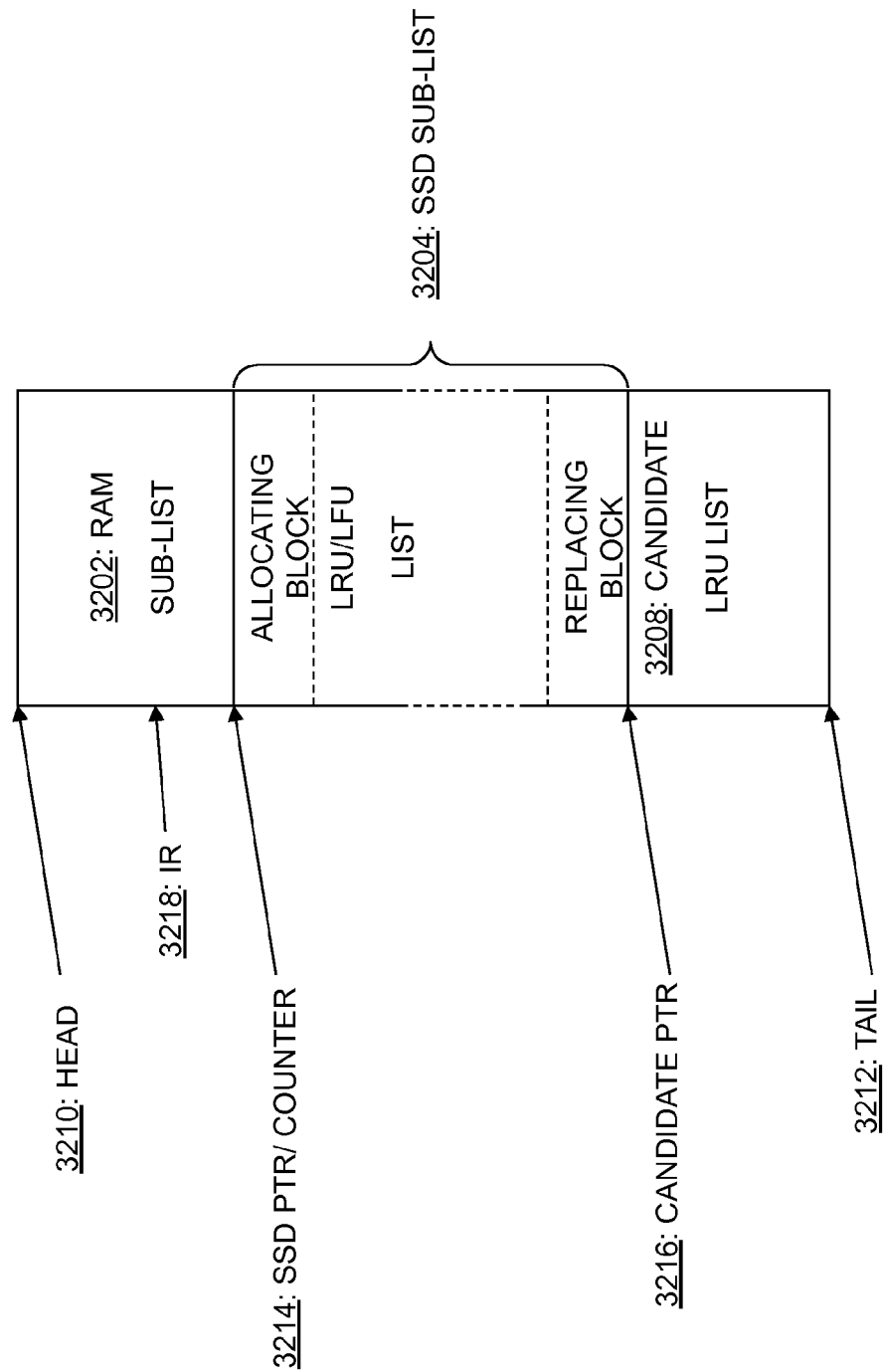
FIG. 32 depicts a block diagram of a conservative insertion and promotion list.

An alternative cache management algorithm that may take advantage of the delta compression and other methods described herein may be referred to as conservative insertion and promotion (CIP). FIG. 32 illustrates a block diagram of a CIP list. The CIP may keep an ordered list of cached data pages similar to the LRU list in traditional cache designs. This ordered list of cached pages may be referred to as a CIP-List 3200 in FIG. 32. However, instead of ordering the CIP-List 3200 based on access recency, CIP may conservatively insert a newly referenced page toward the lower end of the CIP-List 3200 and may gradually promote the page in the CIP-List 3200 based on re-reference occurrence metrics. An aspect of the CIP cache replacement algorithm may be to maintain the CIP-List 3200 that may include a RAM sub-list 3202, an SSD sub-list 3204, and a candidate sub-list 3208 as shown in FIG. 32. Upon the first reference to a page, the reference may be inserted in the candidate sub-list 3208 and may gradually be promoted to the SSD sub-list 3204 and the RAM sub-list 3202 as re-references to the page occur. As a result of such conservative insertion and promotion, a CIP cache management algorithm may filter out sweep accesses to sequential data without negatively impacting the cached data while conservatively caching random accesses with higher locality. The CIP-List 3200 may implicitly keep access frequency information of each cached page without large overhead of keeping and updating frequency counters. In addition, the CIP may clearly separate read I/Os from write I/Os by sending a batch of read only I/Os or write only I/Os to an SSD NCQ (native command queue) or SQ (submission queue) to maximize the internal parallelism and pipelining operations typically found with SSD storage devices 304.

The CIP-List 3200 may be a linked list that may contain meta data associated with cached pages such as pointers and LBAs. Typically, each node in the list may need tens of bytes resulting in less than 1% space overhead for page size of 4 KB. In addition to a head pointer 3210 and a tail pointer 3212 of the linked list, the CIP adds a SSD pointer 3214 to point at the top of the SSD sub-list 3204 and the candidate pointer 3216 to point at the top of candidate sub-list 3208, respectively, as shown in FIG. 32.

Figure 33:
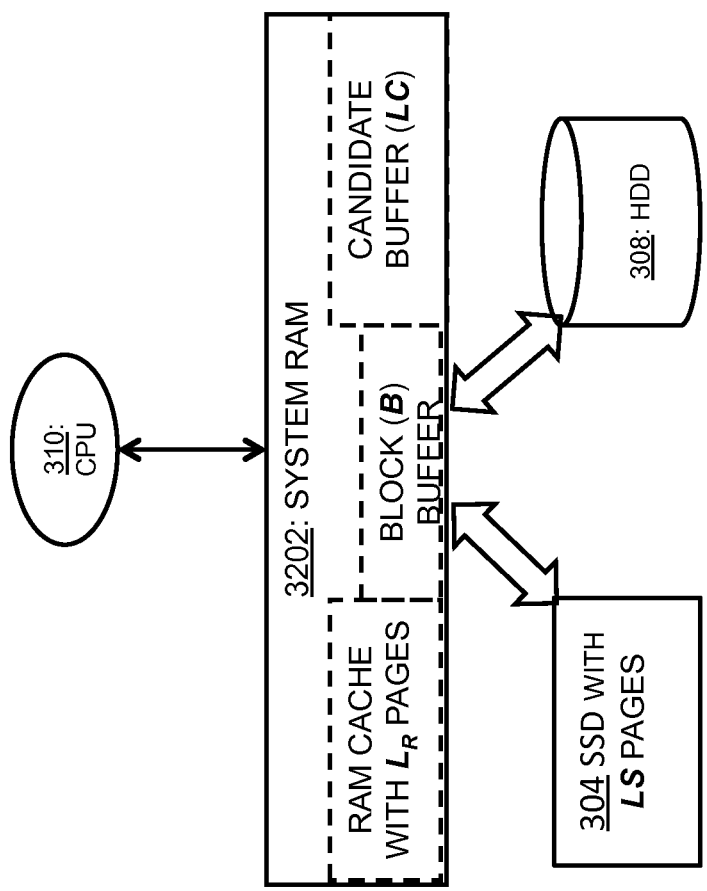
FIG. 33 depicts a block diagram of an embodiment including RAM layout and RAM cache.

Referring to FIG. 33, a block diagram of the system including the RAM layout for RAM cache is illustrated. In an example, variable LR may be the amount of the RAM controlled by the RAM sub-list 3202, LS may be the amount of the SSD controlled by the SSD sub-list 3204, and LC may be the amount of storage controlled by the candidate sub-list 3208. Further, variable B may be the block size of the SSD 304 in terms of number of pages. The size of the RAM that the CIP may manage may be computed as LR+LC+B.

There may be three types of replacements in the CIP algorithm. A first replacement may include replacing a page from the RAM sub-list 3202 to the SSD sub-list 3204. A second replacement may include replacing a page from the SSD sub-list 3204 to the HDD 308. A third replacement may include replacing a candidate page from the candidate sub-list 3208 to HDD 308. All these replacements may happen at or near the bottom of each sub-list, similar to the LRU list. That is, the higher position a page is in the CIP-List 3200, the more important the page may be and the less likely that it may be replaced. The CIP algorithm may conservatively insert a missed page at the lower part of the CIP-List 3200 and may let it move up gradually as re-references to the page occur. This may facilitate managing a multi-level cache that may consider recency, frequency, inter-reference interval times, and bulk replacements in the SSD 304.

In embodiments, page reference recency information may be used for managing the cache for many different workloads. This may be why an LRU algorithm has been popular and used in many cache designs. The CIP algorithm may maintain the advantages of LRU design by implementing the candidate sub-list 3208, RAM sub-list, or SSD sub-list as a LRU list. The candidate sub-list 3208 may contain pages that may be brought into the RAM upon misses or it may contain only metadata of pages that have been missed once or only a few times even though the data is not yet cached. Upon a miss, the metadata of the missed page may be inserted at or near the top of the candidate sub-list 3208 and may be given an opportunity to show its importance to stay in the candidate-list until the LCth miss before it may be replaced. If it gets re-referenced during this time, it may be promoted to the top or at least near the top of the RAM sub-list 3202. Pages at the bottom of the RAM sub-list are accumulated to form a batch to be written to the SSD 304 at which time their meta data is placed in the SSD sub-list 3204. The number of re-references, maximum time required between re-references, and other aspects that may impact a decision to promote a page within the CIP-list 3200 may be tunable. In this way a page may get promoted if it is re-referenced only twice within a predetermined period of time or it may require several re-references within an alternate predetermined period of time to be tagged for promotion. A promotion algorithm may also depend on block size versus I/O access size so that even when an 8K block is accessed twice due to the I/O access size being 4K, a 4K page stored in the Candidate sub-list may not be promoted upon the second access to the candidate block to retrieve the second 4K page of the 8K block. Since the SSD 304 favors batch writes, the SSD write may be delayed until B such pages have been accumulated on top of the SSD sub-list 3208. During this waiting period, if the page is re-referenced again, it may be promoted to the RAM sub-list 3202 because inter-reference interval time of this page is small showing the importance of the page indicates that it should be cached in the RAM. Therefore, the CIP-List 3200 may automatically maintain both recency and inter-reference recency information of cached pages taking advantages of both LRU and LIRS cache replacement algorithms.

In order to take into account reference frequency information in managing cache replacement, a new page to be cached in the RAM cache may be inserted at the lower part (IR) 3218 of the RAM sub-list 3202 and may get promoted one position up in the list upon each reference or upon a configurable number of references. Similarly, in the SSD sub-list 3204, any reference (or configurable number of references) may promote the referenced page up by one position (or a configurable number of positions) in the CIP-List 3200. As a result of such insertion and promotion policy, the relative position of a page in the CIP-List 3200 may approximate the reference frequency of the page. Frequently referenced pages may be unlikely to be evicted from the cache because they may be high up in the CIP-List 3200. For the RAM sub-list 3202, IR 3218 may be a tunable parameter that may determine how long a newly inserted page may stay in the cache without being re-referenced. For example, if IR 3218 is at the top of the CIP-List 3200, it is equivalent to LRU. If IR 3218 is at the bottom of the CIP-List 3200, the page may be replaced upon next miss unless it is re-referenced before the next cache miss. Generally, IR 3218 may point at the lower half of the RAM sub-list 3202 so that a new page may need to earn enough promotion credits (e.g. have a high reference frequency) to move to the top and yet it may be given enough opportunity to show its importance before it is evicted. For the SSD sub-list 3204, insertion may always happen at the top of the CIP-List 3200 where B pages may be accumulated to be written into the SSD 304 in batches. Once the recently added B pages are written into the SSD 304, their importance may depend on their reference frequency since each time a page is referenced its position in the CIP list may be promoted further up the list. The pages at the bottom of the list may not have been referenced for a very long time and hence may become candidates for replacement when the SSD 304 is full. The CIP may try to replace these pages in batches to optimize the SSD 304 performance.

In addition to being able to taking into account recency, frequency, and inter-reference recency, the CIP algorithm may help avoid the impact of mass storage scans and other types of mass storage sweep accesses on cached data and may be able to automatically filter out large sequential accesses so that they may not be cached in the SSD 304. This may be done by the candidate sub-list 3208. Pages in a scan access sequence may not make to the RAM sub-list or the SSD sub-list 3204 if they are not re-referenced and therefore may be replaced from the candidate buffer before they can be cached in the RAM or the SSD 304. Pages belonging to a large sequential scan accesses may be easily detected by comparing the LBA of a node in the candidate list and the LBAs of current/subsequent I/Os and using a threshold counter. In an embodiment, for cache hits, the algorithm may work in the following manner. If the referenced page, p, is in the RAM sub-list 3202 of the CIP-List 3200, p may be promoted by one position up if it is not already at the top of the CIP-List 3200. Upon a read reference to page p that may be in the SSD sub-list 3204 of the CIP-List 3200, p may be promoted by one position up if it is not already among the top of B+1 pages in the SSD sub-list 3204. If p is one of the top B+1 pages in the SSD sub-list 3204, p may be inserted at the IR position of the RAM sub-list 3202. Further, if the size of the RAM sub-list 3202 is LR at time of the insertion, the page at the bottom of the RAM sub-list 3202 may be demoted to the top of the SSD sub-list 3204 and its corresponding data page may be moved from the RAM cache to the block buffer to make room for the newly inserted page. The block counter in the SSD pointer may be incremented. If the counter reaches B, SSD_Write may be performed.

Upon a write reference to page p that is in the SSD sub-list 3204 of CIP-List 3200, p may be removed from the SSD sub-list 3204 and inserted at the IR 3218 position of the RAM sub-list 3202. If the size of the RAM sub-list 3202 is LR at time of the insertion, the page at the bottom of the RAM sub-list 3202 may be demoted to the top of the SSD sub-list 3204 and its corresponding data page may be moved from the RAM cache to the block buffer to make room for the newly inserted page. The block counter in the SSD pointer may be incremented. If the counter reaches B, SSD_Write may be performed. In addition, if the referenced page, p, is in the candidate sub-list 3208 of CIP-List 3200, p may be inserted at the top of the SSD sub-list 3204 and the corresponding data page may be moved from the candidate buffer to the block buffer. The counter in the SSD pointer may be incremented. If the counter reaches B, SSD_Write may be performed.

In another embodiment, for cache misses, the algorithm may work in the following manner. If RAM cache is not full, the missed page p may be inserted at the top of the RAM sub-list 3202 and the corresponding data page is cached in the RAM cache. If RAM cache is full, the missed page p may be inserted at the top of the candidate sub-list 3208 and the corresponding data page may be buffered in the candidate buffer or not cached at all. If the candidate buffer is full, the bottom page in the candidate sub-list 3208 may be replaced to make room for the new page.

An SSD_Write may proceed as follows. If SSD is full, i.e. the SSD sub-list 3204 size equals LS, the CIP algorithm may destage the bottom B pages in the SSD sub-list 3204 to the HDD 308. Only dirty destaged pages need to be read from the SSD 304 and written to HDD 308. Next, the CIP algorithm may perform SSD writes to move all dirty data pages in the block buffer to the SSD 304 followed by clearing the block buffer and the block counter in the SSD pointer of the CIP-List.

Similarly, the candidate list may be a linked list or a simple table (array structure). The table may be hashed by using LBAs. Each entry may keep a counter to count a number of cache misses that have occurred since the entry was added to the candidate list so that the corresponding data may be promoted to be cached once its counter exceeds a threshold. Exceeding such a threshold may indicate that data in the cache is stale and therefore performance may be improved by promoting candidate data to the cache to replace stale data. Each entry may also be configured with a timer that impacts a re-reference counter for the entry. The re-reference counter may be reset to 0 once the time interval, determined by the timer, between two consecutive accesses (successive re-references) to the same block exceeds a predetermined value. This interval between references may be calculated on each I/O access to the same block by subtracting the current I/O access time-of-day and previously stored access time-of-day value in the corresponding table entry.

Each sub-list of the CIP-list 3200 may include some overlapping pages. In an example, some of the pages in the RAM-list may also exist in the SSD list because a page in the SSD may have been promoted to the RAM and the page in SSD may be unaffected until other pages are promoted to the SSD-sublist. This may not pose any significant problem because a RAM list may be checked for presence of a page before an SSD list is checked.

Figure 34:
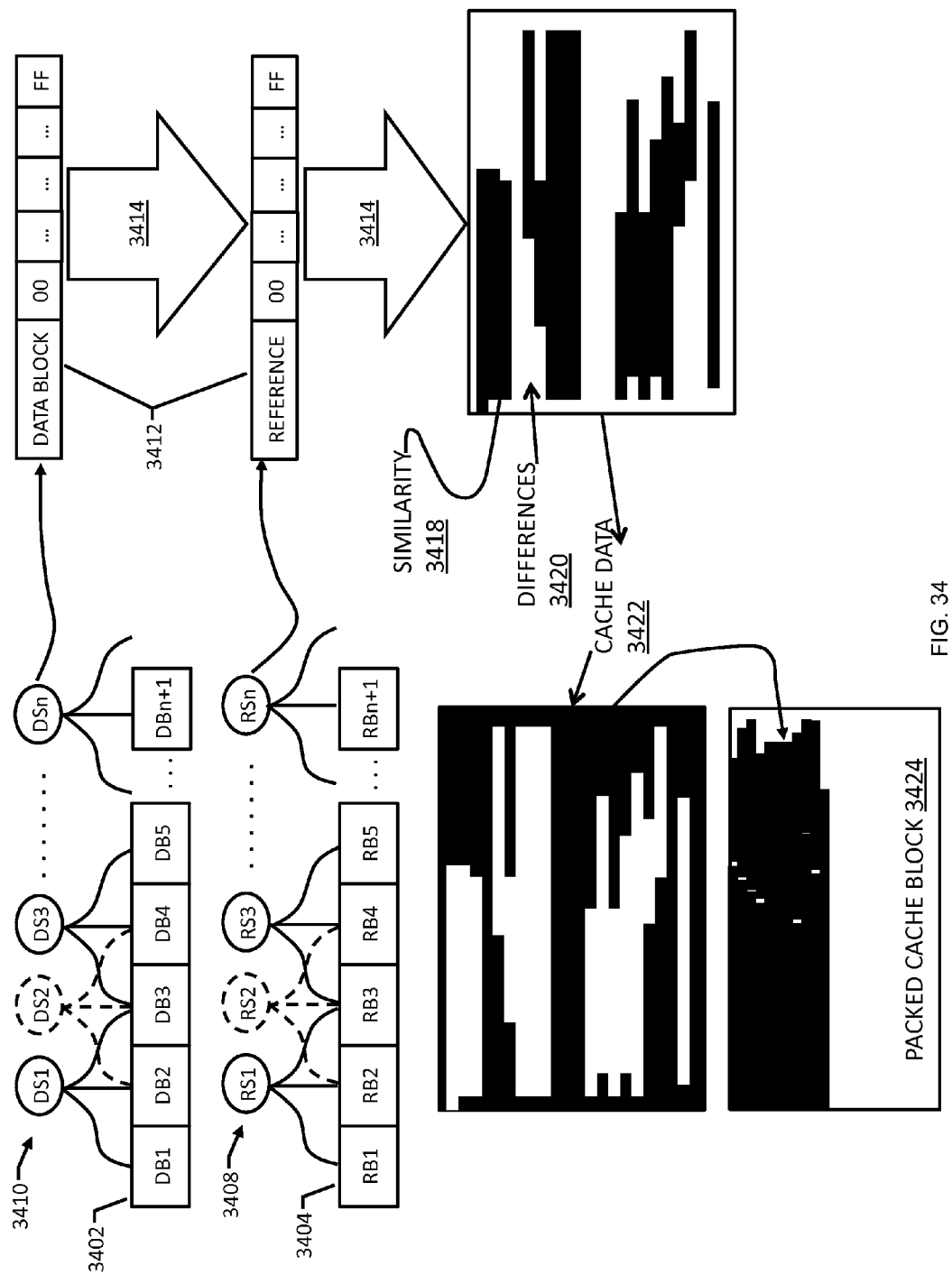
FIG. 34 depicts a method of compression/de-duplication in a cache subsystem of a data storage system.

Referring to FIG. 34, a method of compression/de-duplication in a cache subsystem of a data storage system that facilitates line-speed, software-based, low CPU-overhead, block level, pre-cache similarity-based delta compression is presented. Signatures as described herein are computed for at least one data block 3402 (DBn) and at least one reference block 3404 (RBn). In the embodiment of FIG. 34, both reference block signatures 3408 (RSx) and data block signatures 3410 (DSx) are computed based on three or more adjacent bytes in the respective block. A plurality of data block signatures (DSx) and reference block signatures (RSx) are generated and aggregated 3412 to facilitate comparison 3414. Various techniques for aggregation are described herein and any such technique may be applicable in the embodiment of FIG. 34. Comparing reference block signatures (RSx) with data block signatures (DSx) may result in determining data in the data block 3402 that is similar to the reference block (Similarity 3418). From this determination of similarity, differences 3420 may also be determined and those differences 3420 may be made available or storing in a cache as cache data 3422. This cache data 3422 may be packed into a packed cache block 3424 prior to being stored in a data cache.

Figure 35:
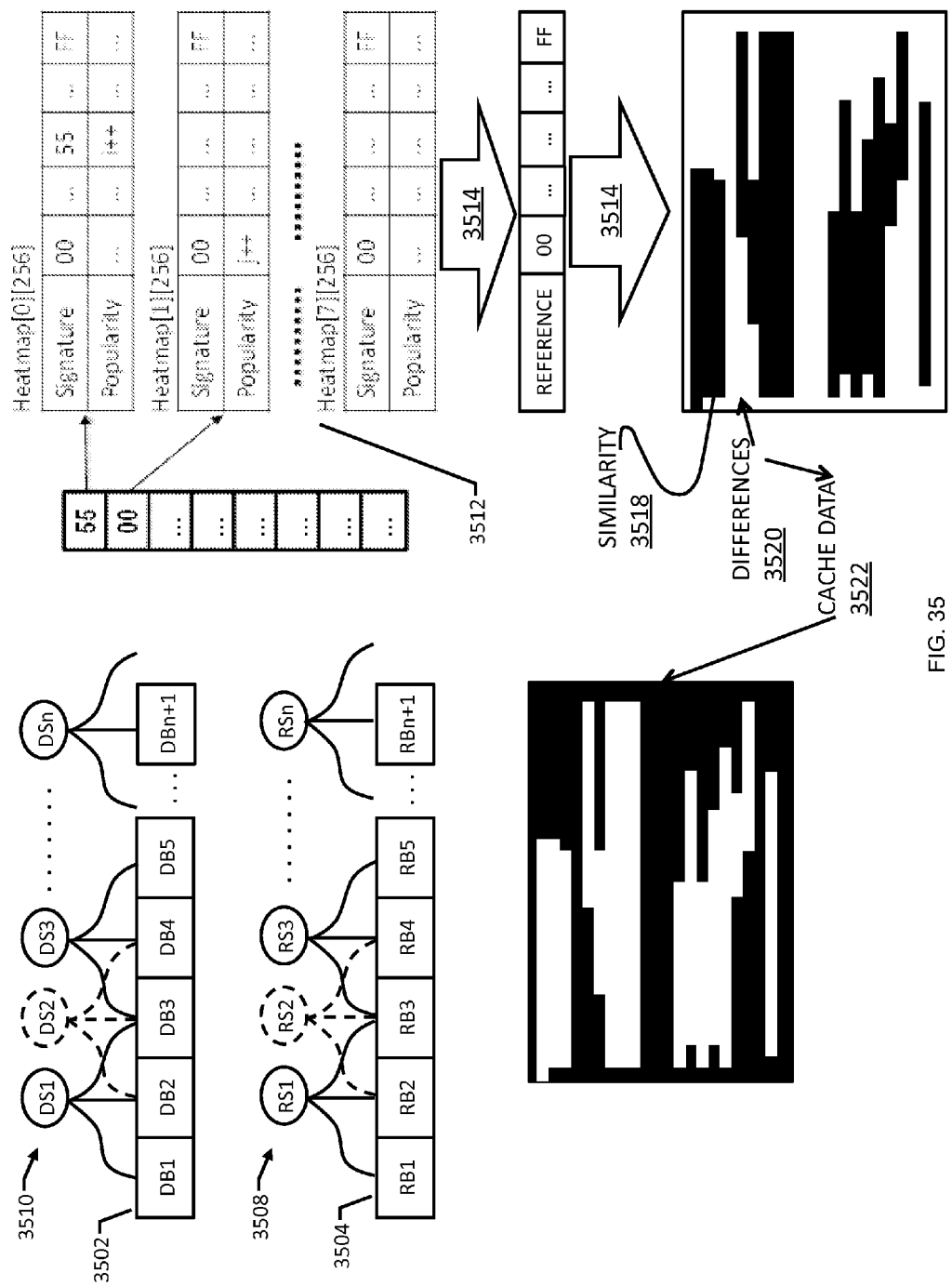
FIG. 35 depicts an alternate method of compression/de-duplication in a cache subsystem of a data storage system.

Referring to FIG. 35, a method of compression/de-duplication in a cache subsystem of a data storage system that facilitates line-speed, software-based, low CPU-overhead, block level, pre-cache similarity-based delta compression that is similar to the method of FIG. 34 is presented. Signatures as described herein are computed for at least one data block 3502 (DBn) and at least one reference block 3504 (RBn). In the embodiment of FIG. 35, both reference block signatures 3508 (RSx) and data block signatures 3510 (DSx) are computed based on three or more adjacent bytes in the respective block. A plurality of data block signatures (DSx) and reference block signatures (RSx) are generated and aggregated using a heatmap 3512 as described herein to facilitate calculating popularities of signatures 3514. The popularity value of each signature is updated upon each I/O. Accumulating popularity values of data block signatures (DSx) based on a heatmap 3512 may facilitate determining which data block 3502 has sufficient popularity to be used as a reference block (Similarity 3518). Likewise through determination of similarity, differences 3520 may also be determined and those differences 3520 may be made available or storing in a cache as cache data 3522. This cache data 3522 may be packed into a packed cache block 3524 prior to being stored in a data cache.

Figure 36:
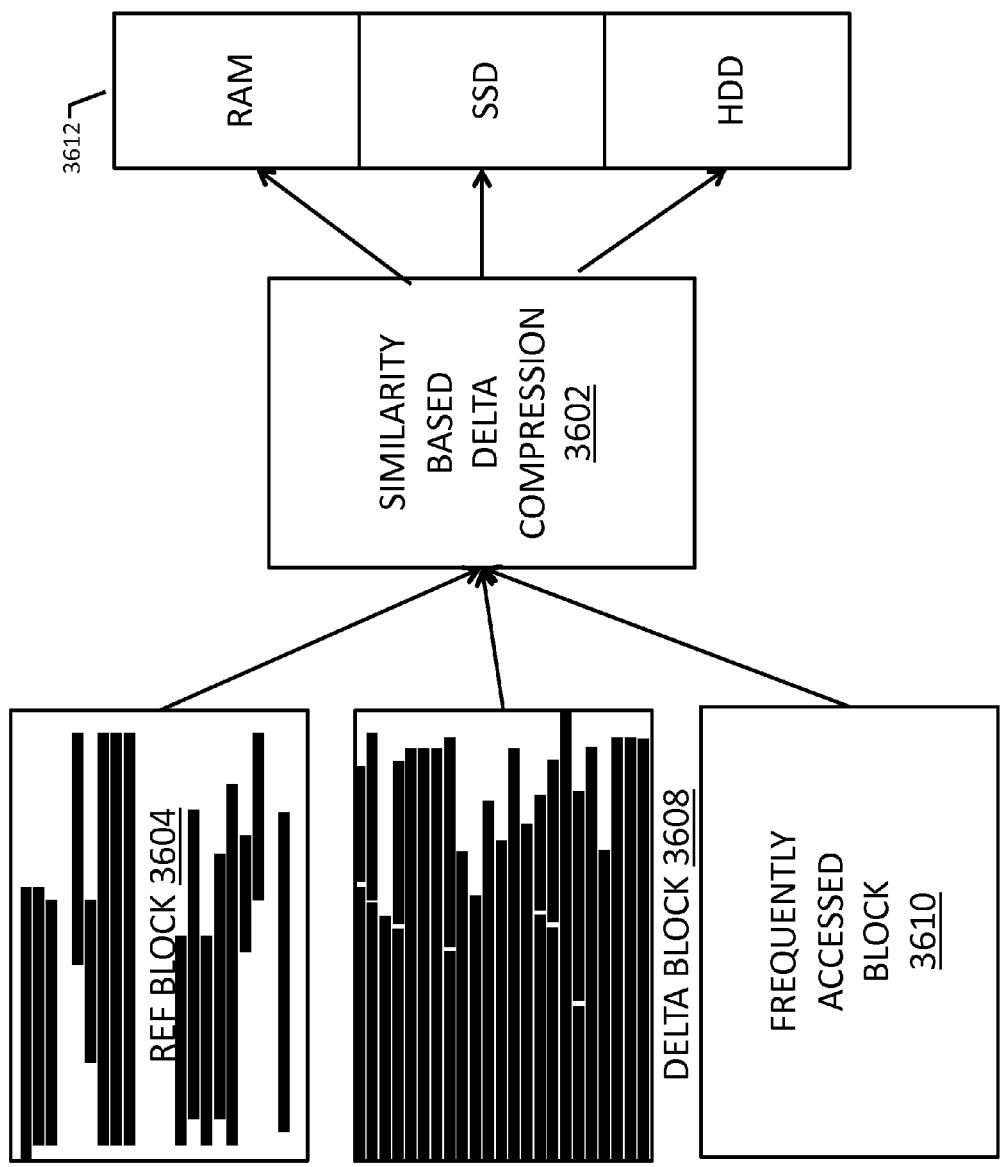
FIG. 36 depicts a method of storing data in a cache memory of a data storage system that is capable of similarity-based delta compression.

Referring to FIG. 36, a method of storing data in a cache memory of a data storage system that is capable of similarity-based delta compression is presented. In the embodiment of FIG. 36, a cache system that is capable of similarity-based delta compression 3602, such as by way of example those depicted in FIGS. 34 and 35 may choose among a plurality of types of data blocks to determine data to be stored in a cache memory system 3612. In the example of FIG. 36, the similarity-based delta compression capable cache system 3602 may receive any number of reference blocks 3604, packed delta blocks 3608, frequently accessed blocks 3610, or other types of data for caching. The system may apply the various techniques described herein to determine a location for storing the received data. The various techniques include without limitation, signature based comparison, similarity-based delta compression, content locality, temporal locality, spatial locality, signature popularity, block popularity, sub-signature frequency, sub-signature popularity, conservative insertion and promotion, location of similar data blocks, type of data block, and the like. Based on the determination of a location for storing the received data, the system 3602 may store any of the received reference blocks, packed delta blocks, and frequently accessed blocks in any portion of the cache memory 3612.

Figure 37:
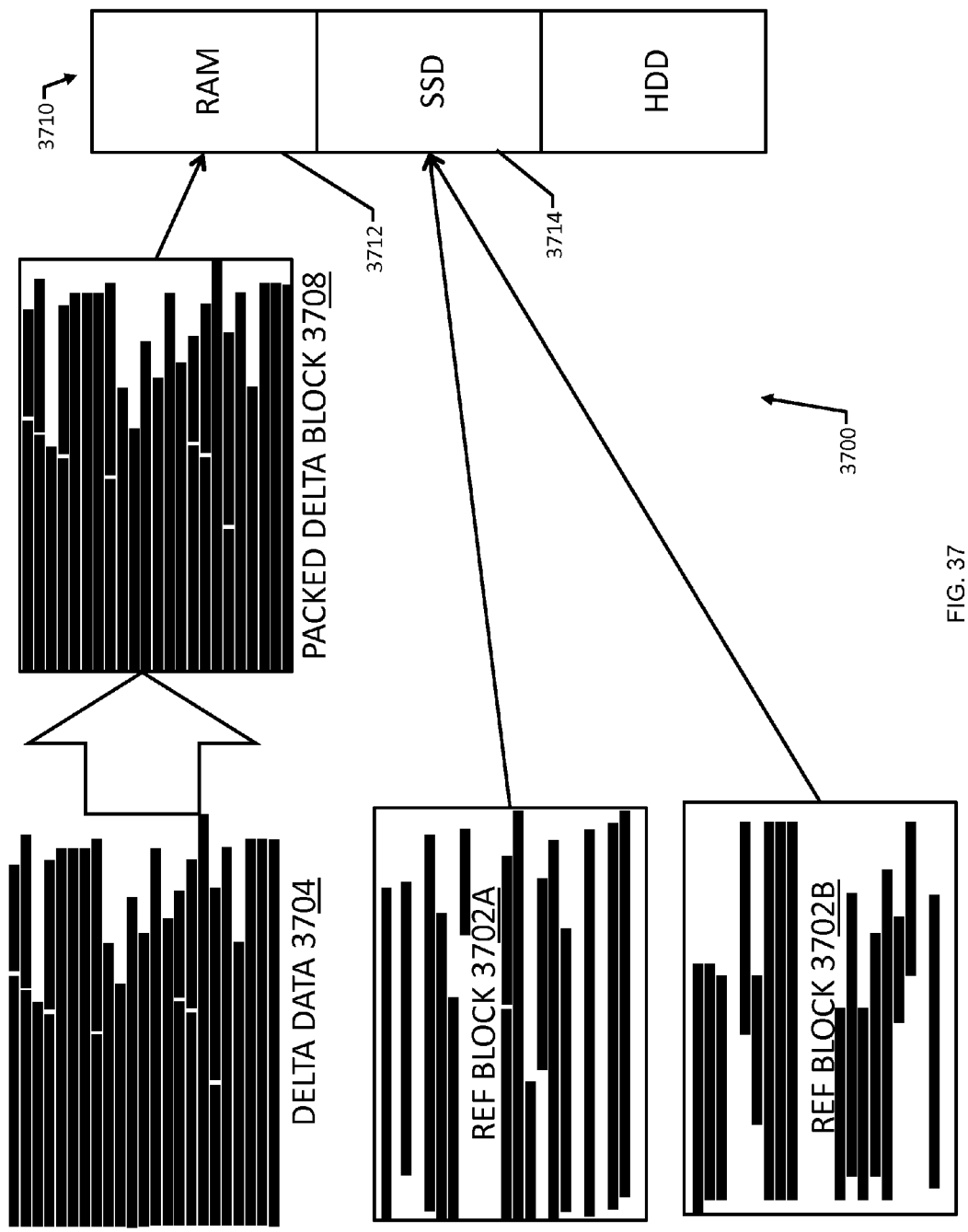
FIG. 37 depicts a method of differentiated data storage in a cache memory system.

Referring to FIG. 37, a method of differentiated data storage in a cache memory system 3700 that comprises at least two different types of memory is presented. In the method of FIG. 37, data placement of reference blocks 3702 and difference data 3704 representing differences between reference blocks 3702 and data blocks may be determined. Reference blocks 3702 may be received and stored in a first portion 3714 of a cache data storage system 3710. Difference data 3704 representing differences between reference blocks 3702 and data blocks may be provided to the cache system 3700 as a packed delta block 3708 for storage in a second portion 3712 of the cache memory 3710 that does not comprise SSD memory. Although the embodiment of FIG. 37 depicts the first portion 3714 as SSD type memory, this first portion may be SSD, RAM, HDD, or any other type of memory suitable for high performance caching. Also, although the embodiment of FIG. 37 depicts the second portion 3712 as RAM type memory, the second portion may be RAM, HDD or any other type of memory that is suitable for high performance caching except for SSD type memory.

Figure 38:
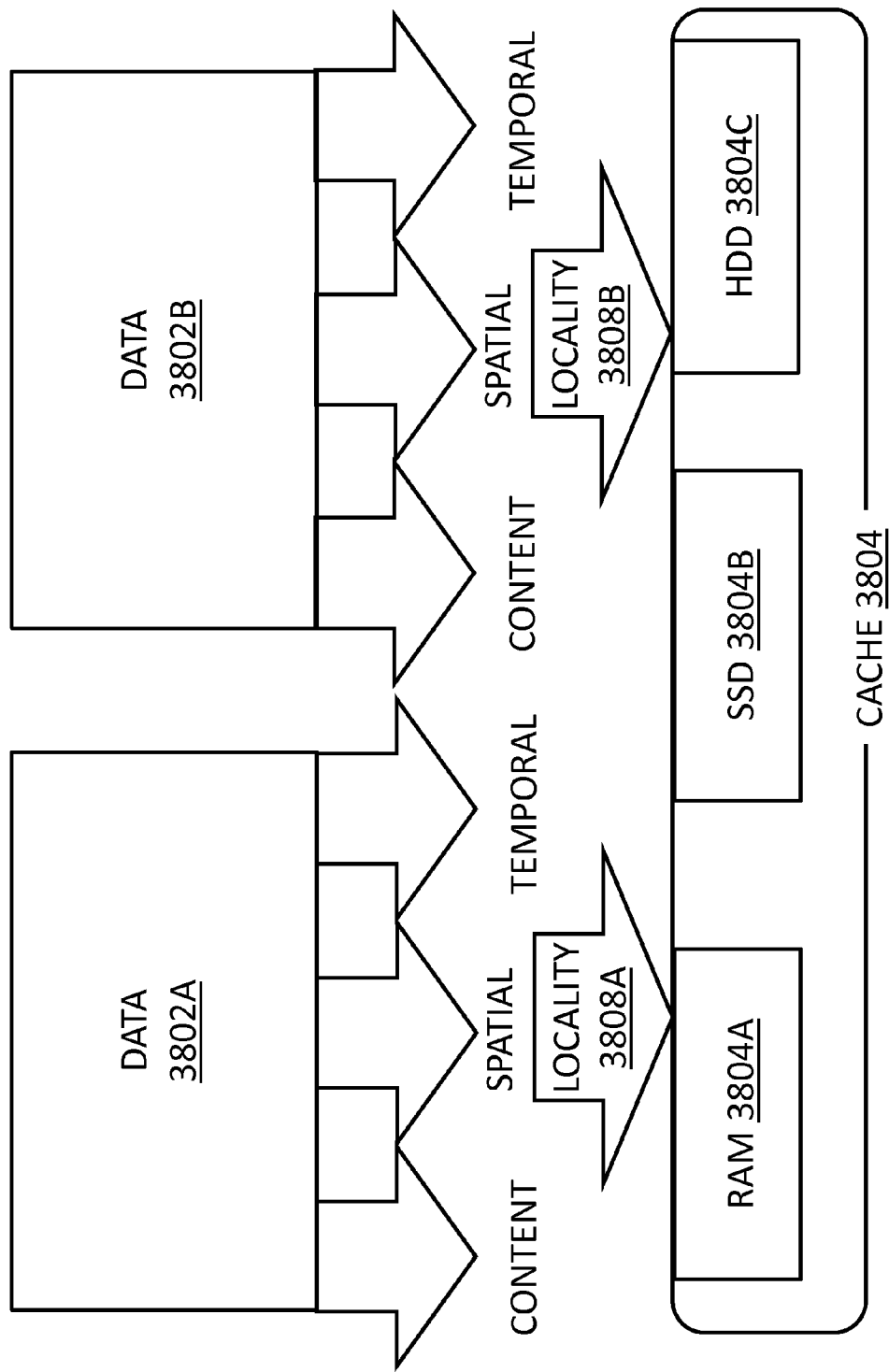
FIG. 38 depicts a method of caching data based on at least one of data content locality and data temporal locality.

Referring to FIG. 38, a method of caching data based on at least one of data content locality, spatial locality, and data temporal locality is presented. Data may be presented to a cache system that is capable of determining content locality, spatial locality and/or temporal locality of the data. Based on the determined content locality, spatial locality and/or the determined temporal locality, data may be placed in various portions of a cache memory system, such as HDD portion, SSD portion, RAM portion, and the like. In the example of FIG. 38, data 3802A and data 3802B may be presented to a cache memory system that is capable of determining content, spatial and/or temporal locality of the data. Determined content, spatial, and/or temporal locality 3808A of data 3802A may indicate that data 3802A may be suitable for being stored in a RAM 3804A portion of a cache 3804. Likewise, determined content spatial, and/or temporal locality 3808B of data 3802B may indicate that data 3802B may be suitable for being stored in an SSD 2904B portion of a cache 3804. Determination of which portion of cache 3804 to use for storing data 3802A or 3802B may be based on the methods and systems described herein for spatial, temporal and/or content locality-based caching. Further in an example, data that has any combination of high spatial, temporal or content locality may be stored in RAM or SSD, whereas data that has average spatial, temporal and content locality may be stored in SSD, HDD or another portion of cache 3804 or may not be stored in the cache 3804 at all. Although content, spatial, and temporal locality are used to indicate which portion of a cache is suitable for storing data, other techniques described herein may also be used to indicate which portion of a cache is suitable for storing data.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with certain preferred embodiments shown and described in detail, various modifications and improvements thereon may become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A method comprising: processing a data block in a data storage system with a processor, producing a plurality of signatures, wherein processing the data block comprises generating a signature for every two or more consecutive bytes of the data block; determining similarity of the data block to at least one reference data block using at least a portion of the plurality of signatures; and generating, with the processor, cache data that represents differences between the data block and the at least one reference data block; wherein generating the signature for every two or more consecutive bytes of the data block comprises generating the signature for every three consecutive bytes of the data block, wherein the data block comprises a four kilo-byte (4 KB) block, and wherein a number of signatures from the data block is the plurality of signatures is 4K−2.

2. The method of claim 1 wherein the determining similarity includes comparing signature occurrence data for the data block to signature occurrence data for the reference block.

3. The method of claim 1 wherein the determining similarity includes generating a wavelet transform for each data block and comparing a plurality of sub-signatures and wavelet transform coefficients of the wavelet transform for at least one data block and at least one reference block.

4. The method of claim 1 wherein the determining similarity includes producing a histogram of a portion of the plurality of signatures.

5. The method of claim 1 wherein the reference block comprises a block of data for which a calculated signature popularity exceeds a threshold.

6. The method of claim 5 wherein the threshold IS a reference block popularity threshold.

7. The method of claim 1 wherein the generating the cache data includes generating a delta block that includes differences between a plurality of data blocks and the at least one reference block and meta data that maps each data block to the at least one reference block.

8. The method of claim 1 wherein the generating the cache data includes generating a set of delta blocks that define differences between a plurality of data blocks and the at least one reference block and meta data that maps each data block to at least one reference block.

9. A method comprising: processing a plurality of data blocks with a processor to produce a plurality of signatures that facilitate determining similarity of the plurality of data blocks in a data storage system; calculating with the processor a signature heat map of a portion of the plurality of signatures to facilitate determining a reference block for similarity-based delta compression of pre-cache data; and generating, with the processor, cache data that represents differences between a portion of the plurality of data blocks and the determined reference block; wherein generating the signature for every two or more consecutive bytes of the data block comprises generating the signature for every three consecutive bytes of the data block, wherein the data block comprises a four kilo-byte (4 KB) block, and wherein a number of signatures from the data block is the plurality of signatures is 4K−2.

10. The method of claim 9 wherein the signature heat map is a two-dimensional array of signature related data.

11. The method of claim 10 wherein the signature heat map is the two-dimensional array wherein a first dimension is the number of possible signature values and a second dimension is a number of sub-signatures.

12. The method of claim 10 wherein the signature heat map is the two dimensional array wherein a first dimension is the number of possible signature values and a second dimension is a number of active input/output (I/O) accesses associated with each possible signature value during a period of time.

13. The method of claim 9 further comprises storing the reference block in a cache memory of the data storage system.

14. The method of claim 9 further comprises storing the reference block in an SSD portion of a cache memory of the data storage system.

15. The method of claim 9 further comprises storing the reference block in a RAM portion of the cache memory of the data storage system.

16. The method of claim 9 further comprises storing the reference block in a HDD portion of the cache memory of the data storage system.

17. The method of claim 9 further comprises storing in an SSD portion of a cache memory of the data storage system a delta block comprising cache data that represents difference between a plurality of pre-cache data blocks and the determined reference block.

18. The method of claim 9 further comprises storing in a RAM portion of a cache memory of the data storage system a delta block comprising cache data that represents difference between a plurality of pre-cache data blocks and the determined reference block.

19. The method of claim 9 further comprises storing in an HDD portion of a cache memory of the data storage system a delta block comprising cache data that represents difference between a plurality of pre-cache data blocks and the determined reference block.

20. The method of claim 1, further comprising selecting the portion of the plurality of signatures based on a frequency of the signatures in the data block.

* * * * *